(12) United States Patent
McKay

(10) Patent No.: US 9,389,007 B1
(45) Date of Patent: Jul. 12, 2016

(54) TRANSPORTATION REFRIGERATION SYSTEM WITH INTEGRATED POWER GENERATION AND ENERGY STORAGE

(71) Applicant: New West Technologies, LLC, Englewood, CO (US)

(72) Inventor: Daniel Lee McKay, Washington, DC (US)

(73) Assignee: New West Technologies, LLC, Greenwood Village, CO (US)

( * ) Notice: Subject to any disclaimer, the term of this patent is extended or adjusted under 35 U.S.C. 154(b) by 0 days.

(21) Appl. No.: 14/266,828

(22) Filed: May 1, 2014

Related U.S. Application Data

(63) Continuation-in-part of application No. 14/151,653, filed on Jan. 9, 2014.

(60) Provisional application No. 61/750,789, filed on Jan. 9, 2013.

(51) Int. Cl.
  *F25B 27/02* (2006.01)
  *F25B 27/00* (2006.01)

(52) U.S. Cl.
  CPC .............. *F25B 27/00* (2013.01); *F25B 27/002* (2013.01)

(58) Field of Classification Search
  CPC ......... F25B 27/00; F25B 27/02; F25B 27/002
  USPC .................. 180/53.1, 53.4, 53.5, 53.6, 53.61, 180/53.62, 53.8, 65.31, 65.51, 65.6; 62/241, 242, 515, 236, 238.1; 165/10, 165/42, 43, 44, 104.21
  See application file for complete search history.

(56) References Cited

U.S. PATENT DOCUMENTS

| | | | |
|---|---|---|---|
| 2,949,540 A | 8/1960 | Clayton | |
| 3,156,101 A | 11/1964 | McGuffey | |
| 4,402,188 A | 9/1983 | Skala | |
| 4,879,501 A | 11/1989 | Haner | |
| 5,178,403 A | 1/1993 | Kemner et al. | |
| 5,226,294 A | 7/1993 | Mayer | |
| 5,253,700 A | 10/1993 | Early, Jr. | |
| 5,680,907 A | 10/1997 | Weihe | |
| 5,767,663 A | 6/1998 | Lu | |
| 5,921,334 A | 7/1999 | Al-Dokhi | |
| 5,994,669 A * | 11/1999 | McCall | H05B 1/0236 219/202 |
| 6,112,543 A * | 9/2000 | Feuerecker | B60H 1/005 62/201 |
| 6,223,546 B1 | 5/2001 | Chopko et al. | |
| 6,427,472 B1 * | 8/2002 | Nakagawa | B60H 1/00492 165/42 |
| 6,606,877 B2 * | 8/2003 | Tomita | B60H 1/005 165/10 |
| 7,089,756 B2 | 8/2006 | Hu | |

(Continued)

*Primary Examiner* — John Walters
(74) *Attorney, Agent, or Firm* — Michael M. McGaw; McGaw Law, P.C.

(57) ABSTRACT

A thermal energy storage system (TESS) that enables the discharge of refrigerated air for cooling cargo or passengers in large compartments, such as the trailer of a semi-truck, for a period of time well in excess of several hours. The TES system is able to provide refrigeration without operating a conventional VCC unit, the truck engine, or the TRU diesel APU engine during all or a significant portion of the period of the typical range of time that a 53 foot refrigerated the truck is traveling over the road. The TES system includes a phase change material (PCM) reservoir, a cooling system-to-WF heat exchanger in fluid communication with the PCM reservoir, and a PCM-to-target heat exchanger in fluid communication with the PCM reservoir. The PCM reservoir contains a phase change material, a working fluid (WF) and a working fluid-to-PCM heat exchanger.

77 Claims, 30 Drawing Sheets

(56) References Cited

U.S. PATENT DOCUMENTS

| | | |
|---|---|---|
| 7,093,458 B2 | 8/2006 | Hu |
| 7,102,245 B2 | 9/2006 | Duggan et al. |
| 7,108,088 B2 | 9/2006 | Muta |
| 7,147,070 B2 | 12/2006 | Leclerc |
| 7,246,496 B2 | 7/2007 | Goenka et al. |
| 7,514,803 B2 | 4/2009 | Wilks |
| 7,547,980 B2 * | 6/2009 | Harrison ............ F03G 7/08 290/1 R |
| 7,665,553 B2 | 2/2010 | Tabe |
| 7,685,838 B2 | 3/2010 | Hutton |
| 7,827,816 B2 | 11/2010 | Khan et al. |
| 7,891,575 B2 | 2/2011 | Sami |
| 7,980,293 B2 | 7/2011 | Jensen |
| 8,220,570 B1 | 7/2012 | Knickerbocker |
| 8,479,803 B2 | 7/2013 | Lim et al. |
| 2002/0014329 A1 | 2/2002 | Carr et al. |
| 2007/0187957 A1 | 8/2007 | Harrison |
| 2010/0000707 A1 | 1/2010 | Tsubone et al. |
| 2010/0154449 A1 | 6/2010 | Stover, Jr. et al. |
| 2012/0055425 A1 * | 3/2012 | Mueller ............ F01P 11/20 123/41.55 |
| 2012/0319472 A1 | 12/2012 | Arnold |
| 2013/0002198 A1 | 1/2013 | McCluskey et al. |

* cited by examiner

Advantageous embodiment shown:

Slurry Generator (30)

- ESPCM/WF heat exchanger

Slurry Generator System:

- Cooling from 14 to 42 to 62 to 32
- WF Reverse flow 62, and flow control 42 + ESPCM Flow 20 to 40 to 50 to 20 to prevent ice formation on ESPCM/WF coils. (ESPCM side)

(Alternate Tube Fin Arrangement)

Slurry Generator using direct VCC Cooling (Eliminate WF Loop)

Advantageous embodiment:

Can also use direct VCC Cooling for Slurry Generator:

TRANSPORTATION REFRIGERATION SYSTEM WITH INTEGRATED POWER GENERATION AND ENERGY STORAGE

CROSS REFERENCE TO RELATED APPLICATIONS

This application is a continuation-in-part of U.S. application Ser. No. 14/151,653, filed on Jan. 9, 2014, which claims the benefit of U.S. Provisional Application 61/750,789, entitled, "Flexible Thermal Energy Storage for Transportation Refrigeration", filed Jan. 9, 2013, the contents of which are herein incorporated by reference.

STATEMENT OF GOVERNMENT INTEREST

None.

FIELD OF INVENTION

This invention relates to thermal energy storage devices, refrigeration systems and methods. More specifically, this invention relates to thermal energy storage and power systems for transport cooling and refrigeration at a desired temperature range or set-point over extended periods of time.

BACKGROUND OF THE INVENTION

A number of systems have been developed over the years to provide multi-temperature refrigeration for the transport of perishable or temperature-sensitive goods in large trailers or containers. The systems are generally designed to work both while the trailer is parked and during operation on the road. These systems, referred to as "trailer refrigeration units" (TRU) in the trucking industry, are predominantly vapor compression cycle (VCC) refrigeration units driven by diesel auxiliary power unit (APU) engines (directly or through a gen-set) for large 53-foot trailers. On smaller trucks the refrigeration systems may be powered by truck alternator-produced electrical energy or by APU diesel engines. The temperature ranges required for transport of the most common refrigerated goods generally range from about −20° F. to about 40° F. The cooling capacity must be provided for at least several hours when operating over the road.

Existing VCC TRU systems with diesel APUs have been used for many years. However, APU-powered TRU systems have some significant shortcomings. First, these systems are characterized by high operating costs due to their large consumption of diesel fuel. Second, operation by use of diesel fuel raises a number of regulatory issues, including noise restrictions and proven health critical emissions from the diesel engines.

Electrical trailer refrigeration units powered by truck alternators are another one of the systems providing multi-temperature refrigeration, but these systems have been generally limited to smaller trucks and box trucks. In other applications, such as with a large 53-foot trailer, these systems have proven nonviable because of the constraints of delivering power from the truck to the trailer due to impractical power transfer and operational logistics issues. The impracticalities in power transfer from the truck include the significant power generation cost and issues in packaging the systems on the truck itself. There are also significant concerns with transferring high voltage or current from the truck to the trailer. In the shipping industry there is often a split in the ownership of the vehicle and the container it is transporting. For example, with semi-trucks, one party often owns the truck, or tractor, while another party owns the trailer. This split ownership creates operational logistics problems for the delivery of power from the truck to the trailer. And trailers outnumber trucks by a factor of two or three to one. Therefore, implementing truck to trailer power becomes impractical, as the truck must be properly equipped to power the refrigeration system employed by the trailer. And there would need to be sufficient numbers of trucks to power all trailers needing power.

Eutectic solid plate, or cold plate, refrigeration systems are another type of system employed by smaller delivery trucks. Cold plate systems rely on heat transfer to large, solid plates, with the heat absorbed by the cold plate cooling the surrounding air. Cold plate systems are charged by shore power-driven (i.e. electric plug) vapor compression cycle refrigeration systems. These systems are often used for trucks designed for local delivery and are characterized by much less precise temperature control. These systems have many short-comings, including their limited heat absorbance capacity, long recharge times for the eutectic plates, the limited temperature control features of the systems and the excessively heavy weights of the plates. This has generally limited the application of cold plates systems to smaller, local delivery trucks.

Battery-powered trailer refrigeration units represent a third type of system, though with more limited application than the truck alternator-powered TRU or cold plates. Battery-powered trailer refrigeration units could be charged by shore power and many other means, including power provided by the truck APU. While these systems enable diesel-free operation over the road, their initial cost is prohibitively expensive, they are impractically heavy to use for large refrigerated trailer systems, and battery replacement cost further limit their economic feasibility.

Large refrigerated containers, such as sea containers, generally utilize VCC refrigeration units that are powered by high voltage electricity supplied by the vessel when aboard ships and can be powered from shore power during transit at ports. Sea containers using electrically-powered VCC place a particularly large current demand on the system's electrical grid aboard ship or from shore power when the unit cycles. The sea container systems also require significant steady state power requiring oversized power networks or very complex systems to manage the number of units operating and the timing of the cycling.

The considerations described above highlight the economic importance of developing more efficient cooling systems. In addition to these economic factors, regulatory restrictions will create additional incentives to adopt more efficient systems. Recent regulatory activity in the U.S. relating to the diesel engine on TRU units has resulted in additional administrative and economic burdens for fleets operating diesel-powered TRU units. Specifically, the environmental protection agency (EPA) and the Air Resources Board of California (CARB) have enacted legislation requiring reporting and upgrading the diesel engines and or emission after treatment equipment used on trailer refrigeration units. California law, as adopted in the CARB/EPA tier IV requirements of 2013, requires the business entities that arrange, hire, contract for, or dispatch TRU-equipped trucks, trailers, shipping containers, or railcars for transport of perishable goods on California highways and railways to require the motor carriers to dispatch only TRUs that comply with the TRU Regulation. This legislation, in addition to the direct operational fuel costs and indirect emission and noise impacts, provide significant incentives for the elimination of the diesel engine from the TRU.

Given the number of short-comings of the systems currently in operation, including the reliance of many systems on diesel power, the coupling of the trailer to the truck for power generation, and the high weight of some systems, there exists a strong and well-defined need for more efficient cooling systems for the transport of perishable or temperature sensitive goods in large trailers or containers. The present invention provides systems to meet these important needs as detailed in the following disclosure.

SUMMARY OF INVENTION

The present invention provides a hybrid refrigeration and thermal energy storage system that enables the elimination of the diesel engine or auxiliary power unit (APU) from a TRU or other refrigeration unit in a refrigerated trailer, boxcar or other cooled air transport space. The hybrid refrigeration and thermal energy storage system provides the required discharge of refrigerated air for cooling of cargo or passengers in large compartments. The system can be employed in a large compartment, such as the trailer of a semi-truck, without the need for a dedicated TRU diesel engine or other APU. The system can directly power a conventional VCC unit, such as an electric only TRU with high voltage, over the road to cool the refrigerated space. The system can simultaneously power the VCC unit and charge a battery energy storage (BES) and/or thermal energy storage (TES) systems over the road. The present invention also as provides cooling capability when the vehicle is stationary or parked using its TES and BES sub-system. For extended periods when the vehicle is not in motion, plug-in grid power provides the power for VCC cooling and can also provide TES/BES charging.

While TESS and BESS systems provide the potential to eliminate the diesel engine from the TRU, the present invention in the form of hybrid refrigeration thermal storage or hybrid thermal storage system (HTESS) is particularly advantageous as it provides capability to minimize the size of the TESS and BESS systems, minimize or eliminate the grid power plug in requirement and at the same time avoids the cost, weight, emission, and regulatory impacts of the diesel APU.

The present invention employs a unique combination of components in a system that derives power from the rotational motion of the wheels of a vehicle and directly uses this high voltage energy for cooling a compartment, while simultaneously enabling the storage of energy from the motion in the form of chemical and thermal storage. The generated power may be produced in various forms. In one embodiment high voltage i.e. over 60 volts) alternating current (AC) or high voltage direct current (DC) and low voltage (i.e. below 60 volts) DC are produced. The dynamically-produced energy that is not used directly by the electric-powered VCC unit to cool the space can be stored as chemical energy in the low voltage DC BESS and/or stored as thermal energy capacity produced through a secondary loop of the onboard VCC or TRU cooling system. The high voltage power electrical energy can be produced through a novel constant velocity output wheel/axle power generation system of the present invention, or by more conventional means such as a hybrid vehicle wheel motor or conventional direct drive gen-set.

In one embodiment, the high voltage AC or DC can be used to power an electric-only TRU VCC or other refrigeration system to directly cool the cargo area, while at the same time providing power and refrigeration capacity into the novel thermal energy storage TES and chemical battery energy storage BES systems of the present invention. Additionally, the primary electromagnetic electricity generating system provided by the trailer axle wheel rotation may be complemented by a supplementary secondary power generating system that converts solar energy into electricity. This provides renewable electrical power to charge the BESS or to power the TESS electrical systems directly when the vehicle is not in motion and cannot generate primary power. When these primary and secondary power elements are combined with chemical and thermal energy storage elements, the systems can be coupled together in such a way that a significant synergistic benefit is derived. More simply put, both the primary and secondary electricity generators, as well as VCC refrigeration, TESS, and BESS, work together to produce a sum of directly available electrical power and refrigeration capacity that may be more advantageously utilized than the systems considered on an individual and separate basis. The inclusion of the primary and secondary electrical power systems facilitate significant reductions in the thermal energy storage (TES) system and the chemical or battery energy storage (BES) system size; weight, and cost. Further, the inclusion of the primary and secondary power systems integrated with onboard VCC, BESS and TESS reduces; and in most transport use cases can eliminate, the need for grid based charging of the BESS and TESS systems. For example, trailers in continuous duty would remain thermally and electrically charged or could be quickly restored to full charge on the road without plugging in to the grid. This over-the-road charging capability for the TESS and BESS is especially effective for refrigerated transport logistics, where vehicle wait time can be limited and where providing multiple grid power points is operationally prohibitive or expensive.

As discussed above, the present invention provides significant synergistic benefits through the application of the primary wheel or axle power to directly power the electric VCC while in motion. Due to the novel combination of components and supply of power, and its availability over-the-road, the TES and BES system size and weight can be minimized and the diesel APU engine and fuel tank can be eliminated from the TRU. Eliminating the diesel APU reduces weight and the need for diesel APU emissions compliance reporting and regulated engine and engine emission system upgrades. Since the primary electric power system supports the use of conventional or other electric-only TRU VCC systems while in motion, the BES and TES can be sized to support only the refrigeration and electrical power needs of the transport refrigeration vehicle when the vehicle is not in motion or not plugged into the grid. The HTESS therefore minimizes the TESS and BESS size and eliminates the diesel APU engine and fuel tank to facilitate reduced weight and space envelope, which results in higher fuel and freight efficiently for the trailer system. Further, with the use of secondary solar power, the BES system size, weight and cost can be further minimized and energy efficiency improved through the use of renewable power.

In addition to the weight and package envelope reductions achieved through eliminating the diesel TRU APU engine, significant cost and administrative advantages to refrigerated trailer operators are also realized. For example the HTESS TRU would no longer be subject to Environmental Protection Agency and California Air Resources Board stipulated upgrades and reporting on diesel engines providing a significant operational cost advantage over and beyond the diesel fuel savings.

An additional synergistic advantage of the HRTESS system is the use of the available ABS brake communication or other signal inputs to identify conditions for charging the TESS and BESS systems, which, much like a hybrid car, can recover otherwise wasted deceleration energy. Unlike many battery hybrid systems, however, the HRTESS system can absorb high levels of energy and power during deceleration or braking events. Over the road, the thermal and chemical energy TESS and BESS can be controlled to be fully-charged quickly for maximum coverage of idle periods, or can be partially discharged and recharged over the road to take advantage as much as possible of the recovered vehicle deceleration energy events. The discharge/recharge feature, while broadly applicable, can be especially useful for city transit busses which start and stop frequently and even on hybrid electric busses may have limits on what electrical energy is recoverable during braking events due to limited battery capability to absorb the power quickly. The HTESS, even when applied to a non-hybrid bus for air conditioning can provide significant energy recovery fuel savings as air conditioning loads can contribute to over 40% of hot weather fuel consumption. For critical refrigeration cargo, on the other hand, it may be desirable to maintain TESS and BESS fully-charged and take less advantage of energy recovery deceleration events. In this scenario, the HTESS still provides significant fuel savings because the incremental power increase needed from the truck engine to power an active HTESS primary power generation system is a very small load compared to the amount of power used to pull the loaded trailer. Accordingly, the incremental increase in power needed from the truck engine does not significantly impact its overall fuel consumption.

The TES system can charge quickly and provide multi-temperature cooling over the road without diesel APU noise and undesirable emissions. The system operates at a reduced weight and cost compared to eutectic or battery-only powered systems. The HTESS is not applicable to seagoing vessels in the same manner as road vehicles, however, in sea-going applications, a TES system according to aspects of the invention can extend the window in which sea-container refrigeration systems must be operated with high-power VCC, thereby reducing the complexity of the control systems, the peak power demand and the ultimate capacity of the power supply system.

In further aspects, the present invention provides defrost systems with a novel, reverse-flow approach to minimize defrost energy while maintaining the cooling power delivered to the refrigerated space.

In a first aspect the present invention provides an integrated power generation, energy storage and refrigeration system. The integrated power generation, energy storage and refrigeration system of the first aspect includes a plurality of wheels, an axle affixed to at least one of the plurality of wheels, an electric power generator that converts the rotational motion of the wheels into electric power, a thermal energy storage unit. The thermal energy storage units has a heat exchanging fluid and a cooling unit to thermally charge the fluid. The cooling unit is powered by the electric power generator.

The integrated system according to the first aspect can include a constant output velocity device coupled at a first end to the axle and at a second end to the electric power generator. The constant output velocity device maintains the rotational power delivered to the generator within a prescribed rotational velocity range according to the efficient operating parameters of the generator. In other words, the generator may operate most effectively within a range of revolutions per minute or some similar parameter. The constant output device adjusts the rotational speed delivered to the generator accordingly to meet the demands of the generator. In certain embodiments the constant output velocity device can be a constant velocity continuously variable transmission or a hydraulic pump and motor set. In alternative embodiments, of the integrated system the electric power generator can be a wheel motor generator.

The integrated system according to the first aspect can include a DC-DC converter or an AC-DC inverter and a TES low power battery electric system. The converter or inverter facilitates the powering of TES components and charging of the TES low power battery electric system by the electric power generator. The TES low power battery electric system is implemented to supply auxiliary power to components of the thermal energy storage unit or an auxiliary low voltage cooling unit to charge the TESS.

In certain embodiments the system can include an electronic control unit adapted to regulate the thermal energy storage unit, a temperature sensor adapted to monitor the temperature of the heat exchanging fluid, a fan adapted to circulate air in a cargo or passenger space, one or more pumps adapted to circulate the heat exchanging fluid and diverters adapted to route the flow of the heat exchanging fluid through a heat exchanger. These additional components can be powered by the TES low power battery electric system.

The integrated system according to the first aspect can also include a solar energy collecting unit. The solar energy collecting unit can be used to supply auxiliary power to the thermal energy storage unit or to supply auxiliary power to an auxiliary low voltage cooling unit configured to charge the TESS or cool a conditioned space. Additionally, the TES low power battery electric system can be adapted to selectively charged by the solar energy collecting unit and the electric power generator, depending upon the status of the trailer or other mobile unit. For example, if the trailer was stationary charging by the solar energy collecting unit would be selected, while in motion might favor charging by the electric power generator. The TES low power battery electric system is implemented to supply auxiliary power to components of the thermal energy storage unit. The integrated power system can include a controller module adapted to manage the supply of power between to the solar energy collecting unit and the electric power generator. Similarly, the integrated power generation, energy storage and refrigeration system can include a control logic and control unit to manage state of charge of the TES or BES systems based on operational parameters of the vehicle provided from an OBD or general CAN link or other available vehicle data device. Using such a controller with the vehicle data, deceleration energy use can be managed to address charging of the TESS over the road to maintain a base state of charge such that the thermal energy storage unit is charged during deceleration events and partially discharged during normal road use to manage energy conservation.

The integrated power system according to the first aspect can also include resistive heating coils powered by the electric power generator. The heating coils can be implemented to heat an enclosed cargo or passenger space or to defrost the thermal energy storage unit.

In still further embodiments, the integrated power system according to the first aspect can also include a high temperature battery (HTB), an HTB heat exchanger, and a fan. The fan can be employed to circulate air from a cargo or passenger space across the HTB heat exchanger. In advantageous embodiments the high temperature battery is a sodium nickel chloride battery.

The cooling unit of the thermal energy storage unit according to the first aspect can be a vapor compression cycle (VCC) system. Similarly, the heat exchanging fluid of the thermal energy storage unit according to the first aspect can be a phase change material (PCM).

In certain embodiments, the thermal energy storage unit of the integrated power system according to the first aspect can include a phase change material (PCM) reservoir containing a phase change material, a working fluid (WF) and a working fluid-to-PCM heat exchanger, a cooling unit-to-WF heat exchanger adapted to remove heat from the working fluid, and a PCM-to-target heat exchanger in fluid communication with the PCM reservoir. The working fluid-to-PCM heat exchanger is in contact with the PCM and the WF, and the PCM is the "heat exchanging fluid." The cooling system-to-WF heat exchanger is in fluid communication with the PCM reservoir, and the WF circulates between the PCM reservoir and the cooling system-to-WF heat exchanger forming a charging loop. Similarly, the PCM circulates between the PCM reservoir and the PCM-to-air heat exchanger and forms a discharging loop.

In alternative embodiments, the thermal energy storage unit of the integrated power system according to the first aspect can include a phase change material (PCM) reservoir containing a phase change material, a cooling unit-to-PCM heat exchanger adapted to remove heat from the PCM and a PCM-to-target heat exchanger in fluid communication with the PCM reservoir. The PCM is the "heat exchanging fluid." The cooling system-to-PCM heat exchanger is in fluid communication with the PCM reservoir. The PCM circulates between the PCM reservoir and the cooling system-to-PCM heat exchanger to form a charging loop. Similarly, the PCM circulates between the PCM reservoir and the PCM-to-air heat exchanger to form a discharging loop. Thus, these embodiments do not use a separate "working fluid" to charge the PCM.

In a second aspect the present invention provides a second integrated power generation, energy storage and refrigeration system. The system according to the second aspect includes a chassis, a wheel rotatably coupled to the chassis and adapted for contact with a road surface, a constant output velocity unit in rotational communication with the wheel, an electric power generator in rotational communication with the constant output speed drive unit and a thermal energy storage (TES) unit having a heat exchanging fluid and a cooling unit to charge the fluid, the cooling unit powered by the electric power generator. The constant output velocity unit supplies rotational power to the electric power generator within a prescribed range of rotational velocity and the generator converts the rotational motion of the wheels into electric power.

The TES system of the integrated power generation, energy storage and refrigeration system according to the second aspect can include a phase change material (PCM) reservoir containing a phase change material (as the heat exchanging fluid), a working fluid (WF) and a working fluid-to-PCM heat exchanger, a PCM-to-target heat exchanger in fluid communication with the PCM reservoir, a first pump to circulate the PCM between the PCM reservoir and the PCM-to-target heat exchanger, a vapor compression cycle (VCC) system, a VCC-to-WF heat exchanger adapted to remove heat from the working fluid and in fluid communication with the PCM reservoir, a second pump to circulate the WF between the PCM reservoir and the VCC-to-WF heat exchanger, and a state of charge detection system to monitor the charge of the PCM. The working fluid-to-PCM heat exchanger of the PCM reservoir is in contact with the PCM and the WF. The PCM circulates between the PCM reservoir and the PCM-to-air heat exchanger, which enables cooling of a conditioned space as the PCM absorbs heat form the surroundings across the PCM reservoir. Similarly, the WF circulates between the PCM reservoir and the cooling system-to-WF heat exchanger, allowing the working fluid to absorb heat form the PCM. The chassis can be a trailer chassis adapted to be pulled by a tractor. The heat exchanging fluid can be a phase change material (PCM). Similarly, the cooling unit of the thermal energy storage unit can be a vapor compression cycle (VCC) system.

The integrated power generation, energy storage and refrigeration system according to the second aspect can include a solar energy collecting unit adapted to supply auxiliary power to the thermal energy storage unit or to supply auxiliary power to an auxiliary low voltage cooling unit configured to charge the TESS or provide cooling to a conditioned space. In an advantageous embodiment, the integrated power system according to the second aspect can include a TES low power battery electric system adapted to be selectively charged by the solar energy collecting unit and the electric power generator. The TES low power battery electric system is implemented to supply auxiliary power to components of the thermal energy storage unit.

The integrated power generation, energy storage and refrigeration system according to the second aspect can further include an electronic control unit adapted to regulate the thermal energy storage unit, a temperature sensor adapted to monitor the temperature of the heat exchanging fluid, a fan adapted to circulate air in a cargo space, one or more pumps adapted to circulate the heat exchanging fluid and/or diverters adapted to route the flow of the heat exchanging fluid through a heat exchanger. These components can be powered by the TES low power battery electric system.

The integrated power system according to the second aspect can also include resistive heating coils powered by the electric power generator. The heating coils can be implemented to heat an enclosed cargo or passenger space or to defrost the thermal energy storage unit.

In a third aspect the present invention provides a hybrid-powered regenerative mobile thermal energy storage system. The hybrid-powered regenerative mobile thermal energy storage system includes a chassis, a wheel rotatably coupled to the chassis and a thermal energy storage unit. The wheel is adapted for contact with a road surface and the wheel has a wheel motor generator for the conversion of rotational mechanical energy of the wheel into electrical power. The thermal energy storage unit has a heat exchanging fluid and a cooling unit to charge the fluid. The cooling unit is powered by the wheel motor generator. The cooling unit can be a vapor compression cycle (VCC) system.

In certain embodiments the hybrid-powered regenerative mobile thermal energy storage system according to the third aspect can include a DC-DC converter or an AC-DC inverter and a TES low power battery electric system. The converter or inverter is adapted to facilitate powering of TES components and charging of the TES low power battery electric system by the wheel motor generator. The TES low power battery electric system is adapted to supply auxiliary power to components of the thermal energy storage unit or an auxiliary low voltage cooling unit to charge the TESS.

In further embodiments the hybrid-powered regenerative mobile thermal energy storage system according to the third aspect can include an electronic control unit adapted to regulate the thermal energy storage unit, a temperature sensor adapted to monitor the temperature of the heat exchanging fluid, a fan adapted to circulate air in a cargo space, one or more pumps adapted to circulate the heat exchanging fluid and/or diverters adapted to route the flow of the heat exchanging fluid through a heat exchanger. These components can be powered by the TES low power battery electric system.

In still further embodiments the thermal energy storage unit of the hybrid-powered regenerative mobile thermal energy storage system according to the third aspect can include a phase change material (PCM) reservoir (containing a phase change material as the "heat exchanging fluid", a working fluid (WF) and a working fluid-to-PCM heat exchanger), a cooling unit-to-WF heat exchanger adapted to remove heat from the working fluid, and a PCM-to-target heat exchanger in fluid communication with the PCM reservoir. The PCM circulates between the PCM reservoir and the PCM-to-air heat exchanger forming a discharging loop. The working fluid-to-PCM heat exchanger of the PCM reservoir is in contact with the PCM and the WF. The cooling system-to-WF heat exchanger is in fluid communication with the PCM reservoir, and the WF circulates between the PCM reservoir and the cooling system-to-WF heat exchanger forming a charging loop.

In a fourth aspect the present invention provides a second hybrid-powered regenerative mobile thermal energy storage system. The hybrid-powered regenerative mobile thermal energy storage system according to the second aspect includes a wheel adapted for contact with a road surface, an axle affixed to the wheel, a constant output velocity unit coupled to the axle, an electric power generator coupled to the constant output velocity unit that converts the rotational motion of the wheel into electric power, and a thermal energy storage unit having a heat exchanging fluid and a cooling unit to charge the fluid. The cooling unit can be powered by the electric power generator. In certain embodiments, the constant output velocity mechanical device is a constant velocity continuously variable transmission or a hydraulic pump and motor set.

In a fifth aspect the present invention provides an integrated power generation, energy storage and temperature control. The system according to the fifth aspect includes a chassis, a wheel rotatably coupled to the chassis and adapted for contact with a road surface, a constant output velocity unit in rotational communication with the wheel, an electric power generator in rotational communication with the constant output velocity unit, and a high temperature battery (HTB). The constant output velocity unit adjusts the rotational velocity delivered from the wheel to a prescribed rotational velocity range and supplies rotational power to the electric power generator within a prescribed range of rotational velocity. The generator then converts the rotational motion of the wheels into electric power. The high temperature battery can be a sodium nickel chloride battery.

In certain embodiments, the integrated power generation, energy storage and temperature control system according the fifth aspect can also include an HTB heat exchanger and a fan. The fan can be employed to circulate air from a cargo or passenger space across the HTB heat exchanger. In still further embodiments of the fifth aspect a battery heater can be included to warm up the HTB battery. Additionally, a HTB resistance heater adapted to heat a conditioned space can be included in embodiments of the fifth aspect.

In still further embodiments, the integrated power generation, energy storage and temperature control system according to the fifth aspect can include a thermal energy storage (TES) unit having a heat exchanging fluid and a cooling unit to charge the fluid. The cooling unit can be powered by the electric power generator.

These and other features, aspects and advantages of the present invention will become better understood with reference to the following drawings, descriptions and claims.

BRIEF DESCRIPTION OF THE DRAWINGS

For a fuller understanding of the invention, reference should be made to the following detailed description, taken in connection with the accompanying drawings, in which:

FIG. 13 illustrates the discharging, cargo cooling, portion of the mobile TES system with VCC supplemental cooling using an external evaporator.

FIG. 14 shows the standard flow through the discharge loop under the control of the defrost system. In particular, the flow through the reversing valve and the heat exchanger are routed as in standard operating conditions of the discharge loop.

FIG. 15 shows the defrost flow through the discharge loop under the control of the defrost system when frost has been detected. In particular, the flow through the reversing valve and the heat exchanger are routed as in defrost operating conditions of the discharge loop.

FIG. 16 adds the element of a supplemental electric heat defrost system to the system shown in FIG. 15.

DETAILED DESCRIPTION OF THE PREFERRED EMBODIMENT

Figure 1:
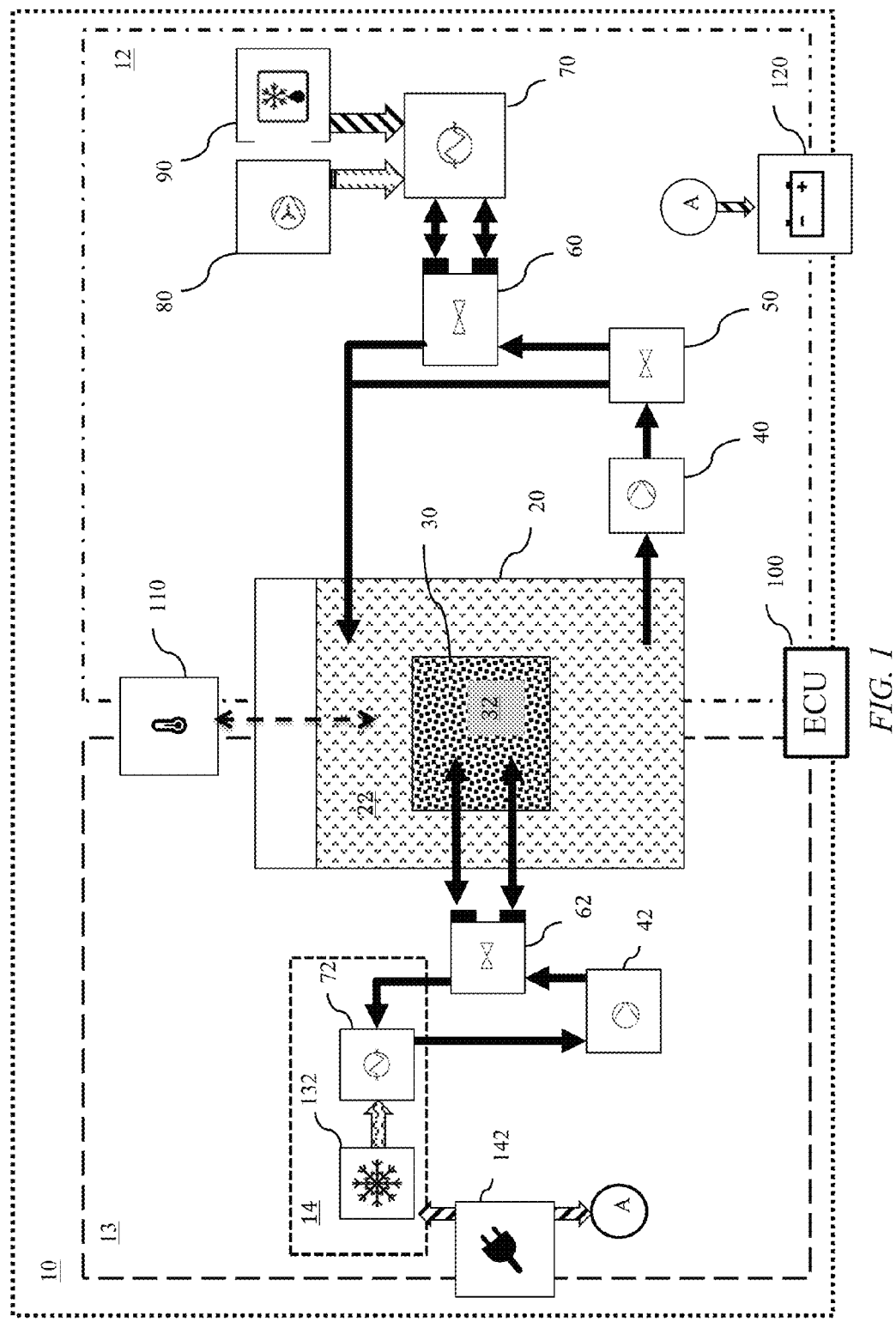
FIG. 1 is a schematic illustration of a mobile thermal energy storage system (TESS) according to one aspect of the invention.

The present invention provides a hybrid-powered thermal energy storage system (HTESS) that enables the discharge of refrigerated air for cooling cargo or passengers in large compartments, such as the trailer of a semi-truck a transit bus or a rail-container, for typical shift service life periods and indefinitely while in motion over the road or while plugged into shore power. The HTESS system is able to provide refrigeration without the use of a conventional TRU diesel APU engine during the entire service use, or the entire time a 53-foot refrigerated the truck or transit bus is traveling over the road. Additionally, HTESS can provide cooling without operating the VCC system or the truck/bus engine for several hours while the trailer or bus is parked or is idling in traffic.

The HTES system can charge quickly via shore power or trailer wheel/axle motor power over the road and provide multi-temperature cooling over the road and while stationary, thereby eliminating the diesel APU and associated undesirable noise and emissions. The system operates at a net zero or at a reduced weight when compared to conventional TRU systems and at a substantially lower weight than current eutectic or battery-only powered systems. In sea-going applications, only the TES system is applicable and according to aspects of the invention can extend the window in which sea-container refrigeration systems must be operated with high-power VCC, thereby reducing the complexity of the control systems, the peak power demand and the ultimate capacity of the power supply system.

In further aspects, the present invention provides constant speed mechanical output power to a high-power onboard alternating current (AC) gen-set through a constant output velocity mechanical device (CVMD) such as a constant velocity continuously variable transmission (CVCVT), or a hydraulic pump and motor set powered by the trailer or bus axles. This is advantageous in that high power AC gensets employed to power VCC systems are very efficient means to power electric motor driven VCC systems and are most efficient operating at a specific operating speed. While it can be seen that the HTESS CVCVT design could be used without a TESS in a battery-only trailer application, the battery-only application suffers from higher initial cost and higher battery replacement maintenance costs. In another advantageous embodiment, high power direct current is provided by a hybrid wheel motor as developed originally for passenger cars. The advantage of applying the wheel motor/wheel motor generator developed for hybrid cars and light trucks to the TESS system is that the controls and safety systems for managing power are designed and verified.

In still further aspects, the present invention provides low-power charging through the aforementioned high-power sources converted or inverted to low-power to charge the TESS low power battery electric system (BES) and to power its low-power pumps and fans over the road. In further aspects, a solar power unit or low power APU provides low power charging and TES system power during idle periods on the road or while parked staging.

In yet further aspects, the present invention provides for novel heating of the conditioned space while the high-power systems are not available through thermo-chemical battery/dc electric heating or, in another embodiment, more conventional heating methods, such as propane gas or high power electric-only heat. Over the road the HTESS AC or DC power facilitates conventional high-powered heating methods, such as AC or DC high power resistive heating coils.

In another aspect, the HTESS can also provide non-HPS (high power system) heating via more conventional means such as direct gas (lpg, gasoline, diesel) heating or thermal storage of electrical or otherwise generated heat in the PCM reservoir.

The present invention provides systems and methods for a Hybrid Thermal Energy Storage System ("HTES system" or "HTESS") that is characterized by rapid charging of the TESS and then providing portable, self-powered, multi-temperature refrigeration control for large, mobile transport enclosures without the use of diesel APU. The TES system of the invention is capable of providing efficient refrigeration control across a wide range of temperatures including the temperature range of 40° F. to −20° F., as required in many important refrigerated cargo applications and also has application for passengers or other cooling in large compartments, such transit bus or a sea-container. HTESS provides cooling confidently for typical shift service life periods and indefinitely while in motion over the road or while plugged into shore power. The HTES system is able to provide refrigeration without operating a conventional TRU diesel APU engine during the entire portion of the period of the typical range of time that a 53-foot refrigerated the truck or transit bus is traveling over the road, allowing the elimination of the diesel engine and fuel tanks from the TRU. Additionally, HTESS can provide cooling without operating the VCC system for several hours while the trailer or bus is parked or is idling in traffic. To accomplish this, the HTESS is thermally charged via a VCC which is powered by high-voltage shorepower or over the road with a novel constant velocity mechanical device (CVMD) such as a constant velocity continuously variable transmission or a hydraulic pump and hydraulic motor set driven by the truck through the trailer wheels or axle and regulated to provide constant speed to a alternating current gen-set. The HTESS is thermally charged by shore power or the CVMD. The CVMD of the HTESS provides power to the VCC motor for VCC direct load cooling over the road with the AC genset power. The CVMD and VCC also thermally charges the TESS to maintain maximum TESS capacity. The low-power TESS battery system is also charged by the CVMD and AC genset through power supplies, which step down the voltage and convert AC to DC Power. In an advantageous embodiment this DC power is configured to be compatible with solar power units such that while parked or in motion, solar panels on the top of the truck can augment charging of the TESS BES system and to provide power for TESS functions such as fans and pumps directly. Solar or other battery charge controllers are used to manage the interface power needs and charging of TESS pump/fan loads and BES system charging.

In an exemplary configuration the HTES system employs a high power source (HPS) from both high voltage shorepower (SPHPS) and over the road high power (OTRHPS) through the application of a novel on board constant velocity mechanical device (CVMD) such as a constant velocity continuously variable transmission (CVCVT) or a hydraulic pump and hydraulic motor set. The CVMD is powered by energy derived from the truck engine through the trailer wheels or axle and speed regulated to provide constant speed for efficient power from typical OTRHPS alternating current (AC) gen-sets. The OTRHPS or shorepower high power source (SPHPS) provides direct power to the HTESS onboard VCC motor, fans, heaters, and controls to thermally and electrically charge the TESS system and/or provide direct heating/cooling to the conditioned space. While parked and plugged into SPHPS, or moving over the road using (OTRHPS), (HPS) is available to power the high power VCC functions. The HTESS system also employs a low power system, for providing TESS electrical needs and recharging the TESS battery electric system (BES). The TESS BES system is recharged over the road through OTRHPS or while plugged in using SPHPS through power supply conversion of high voltage AC to the appropriate level of low power DC. Additionally, the TESS battery energy storage (BES) system can be recharged or TESS low power functions directly powered through solar panels on the top of the trailer or alternately, if desired, via a small low power APU.

The HTESS has an advantage over the TESS system due to the OTRHPS availability to provide a large share of the cooling needs such that the HTESS thermal storage size and BES size can be sized only for the vehicle-idle portions of the duty cycle, such as staging or idling in traffic. Additionally, with the HTESS the TESS thermal charging need not be fully completed using shore power as the OTRHPS can thermally and electrically charge the TESS over the road.

The HTESS can further employ overhead solar panels and solar power controllers (ECU) to power the TESS and continuously charge the BES system allowing further reduction in BES size. For example, the system can employ a "solar controller/battery charger" which "thinks" the inverted, low-voltage (24 volts) from the OTRHPS is a solar panel. This is advantageous because photovoltaic (PV) solar panel system's "controller/battery chargers" have been developed and optimized to manage the direct use of the power and the battery charging/storage will likely have a different optimization based on the battery type. The PV panels put out 24 volts generally. For the TESS, the solar-provided 24 volts can be used while parked and driving to run the TESS fans and/or pumps directly and to charge the batteries of the TES system. Additionally, the over-the-road system can also be used do this to direct drive the TESS system as needed (running pumps to charge) or with special controls as described herein to manage use of deceleration energy to charge.

The present HTESS invention further proposes the use of an a novel heating system to provide heating when HPS is not immediately available, such as when idling or staging in cold weather and not plugged in. The novel HTESS heating system uses a combined electrical and chemical heating system or a battery-based combined heat and power system. In cold weather when non-HPS heating is anticipated, the HTESS employs high temperature batteries (HTB) (such as sodium nickel chloride batteries (Zebra)) in a high temperature battery heating system (HTBHS) to provide heating. When use is anticipated, such as ambient temperatures dropping below a set point, electric heater driven by the OTRHPS, the SPHPS or the HTB itself is commanded by the ECU to preheat or maintain heat of the HTESS (HTB) cooling reservoir of the HTBHS to achieve operating temperature of the battery (which is otherwise inert as it begins electrical operation at 300° C.). During non-HPS operating periods, the HTB provides direct air heating to the conditioned space through a DC resistance heater and its own exothermic reaction to the HTB cooling reservoir and heat exchanger. The HTB, stores electrical and heat energy at a significantly higher energy density (KJ/KG), (KJ/m3) than any known "hot PCM" material. It has several key advantages in addition to the energy storage density. Unless preheated, it is inert and retains a charge for very long periods of time, so for example, during hot seasonal periods of time when the HTB heating energy is not required to heat the conditioned space, the HTB remains off. During heating season, the HTB takes several days to cool off and can maintain its own temperature reducing the need for active charging. In an advantageous embodiment, a zebra HTB converts electrical to heat energy at 100% efficiency and although electrical discharge efficiencies are in the 75% range, when used as a combined heat and power device, an HTB can provide well over 85% efficiency.

The operation of large cargo/shipping containers, whether they are trucks, trains, planes, buses, ships, etc., can be divided into two phases: (1) time spent actually in transit and (2) time spent with the cargo, goods or passengers where the vehicle is not in transit but the cargo is nevertheless under the control of the vehicle, such as a ship in dock or a truck at a truck stop. During these non-transit times, external power sources, or shorepower high power source (SPHPS), will often be available that can be used to re-charge the systems, and at a fraction of the cost of using the on-board power systems. These non-transit power sources are referred to herein as "shorepower," which includes the traditional definition of the provision of shoreside electrical power to a ship at berth while its main and auxiliary engines are turned off, but applies more generally to the provision of power by an external power source to recharge the cooling system of the vehicle.

While these shorepower high power source (SPHPS) occasions often are presented in trucking and other operations, making this a requirement, for example for a diesel-free TESS system, does present a significant logistical constraint for the use of TESS in various applications. For example, recharge time may be prohibitively short, or travel time may become too long for TESS to be practical without over the road high power system (OTRHPS) availability for refrigeration and recharging The Hybrid TESS (HTESS) overcomes the need for the diesel backup TRU to cover all conditions by providing a practical over the road high power source (OTRHPS) to power VCC, heating functions, and fully charge the TESS for occasions when shorepower time will not be adequate. The system further provides a low power solar or other system to extend the TESS electrical system operating period when not powered by a high power system (HPS), such as shorepower or OTRHPS. With the OTRHPS and solar power of the HTESS, the TESS system and its associated battery system may be also downsized significantly, making it more attractive for significantly broader customers in markets of mobile transportation heating/refrigeration and climate control. With the displacement of the diesel engine and its associated 60-120 gallon tank, the HTESS also offers a net zero or net negative (lower weight) than a conventional TRU unit.

Turning to the figures, FIG. 1 provides an overview of an exemplary TES mobile refrigeration system 10. The TES system 10 includes a discharging loop 12 and a charging loop 13. The discharging loop 12 and the charging loop 13 share an insulated ESPCM reservoir 20, containing an ESPCM 22, which is stored as a slurry in the ESPCM reservoir 20. By "ice slurry" or "slurry" it is meant a mixture of small ice particles and carrier liquid. Ideally, the slurry is a homogenous mixture of small ice particles and carrier liquid dispersed throughout the reservoir, but in practice the mixture is often stratified with the ice tending towards the top of the reservoir. The liquid can be either pure freshwater or a binary solution consisting of water and a freezing point depressant. Sodium chloride, ethanol, ethylene glycol and propylene glycol are four most commonly used freezing point depressants in industry. The generation and application of ice slurries is discussed in more detail by Kauffled, M. et al., Int J Refrig. 2010 Dec. 1; 33(8): 1491-1505. The ESPCM will be in a semi-liquid state due to a temperature at roughly the transition point between solid and liquid. The discharging loop 12 uses the ESPCM 22 to absorb heat from the surroundings thereby allowing the ESPCM to effect the cooling of a cargo during shipment, while the charging loop 13 absorbs heat from the ESPCM 22, usually while the system is plugged into shorepower, or otherwise not in transit, to facilitate the further use of the ESPCM 22 in the discharging loop 12. The ESPCM 22 in the reservoir 20 surrounds, and is in contact with, an ESPCM slurry generator 30, also referred to as a working fluid reservoir, and contains a working fluid 32. Facilitating heat transfer from the WF to the ESPCM, and consequent charging of the ESPCM within the ESPCM reservoir is a WF-to-ESCPM heat exchanger, also referred to as the PCM/WF heat exchanger, which maintains separation of the PCM and WF and increases the surface area over which heat exchange between the two can occur.

The ESPCM reservoir 20 forms a starting point of reference for moving through the discharging loop 12. The ESPCM reservoir 20 is in fluid communication with an ESPCM fluid pump 40, a bypass valve 50, a reversing valve 60, and an ESPCM/AIR heat exchanger 70. A fan system 80 and a defrost system 90 are located in proximity to the ESPCM/AIR heat exchanger 70. The components of the discharging loop are powered by a battery electric system 120 or other appropriate source of power. The details of the discharging loop 12 are described in more detail with reference to FIG. 9, below.

The ESPCM slurry generator 30, forms a starting point of reference for the charging loop 13 and the generator in fluid communication with a reversing valve 62, a VCC-to-working fluid heat exchanger 72, a conventional on-board VCC system 132 and a working fluid charging pump 42. The VCC-to-working fluid heat exchanger 72 and the conventional on-board VCC system 132 in combination form the TESS VCC loop 14. Power is provided to the charging loop 13 by electrical shore power 142, or other suitable electrical source, such as via truck alternator power, a small auxiliary power unit or through a wheel motor generator. Shore power 142, also recharges the battery electric system 120 while the TES system 10 is in charging mode. The details of the charging loop 13 are described in more detail with reference to FIG. 10, below.

Both the discharging loop 12 and the charging loop 13 are under the control of an electronic control unit 100. Additionally, a state of charge detection module 110 monitors the temperature and/or pressure of the ESPCM 22 in the ESPCM reservoir 20 during both the charging mode and the discharging mode.

Figure 2:
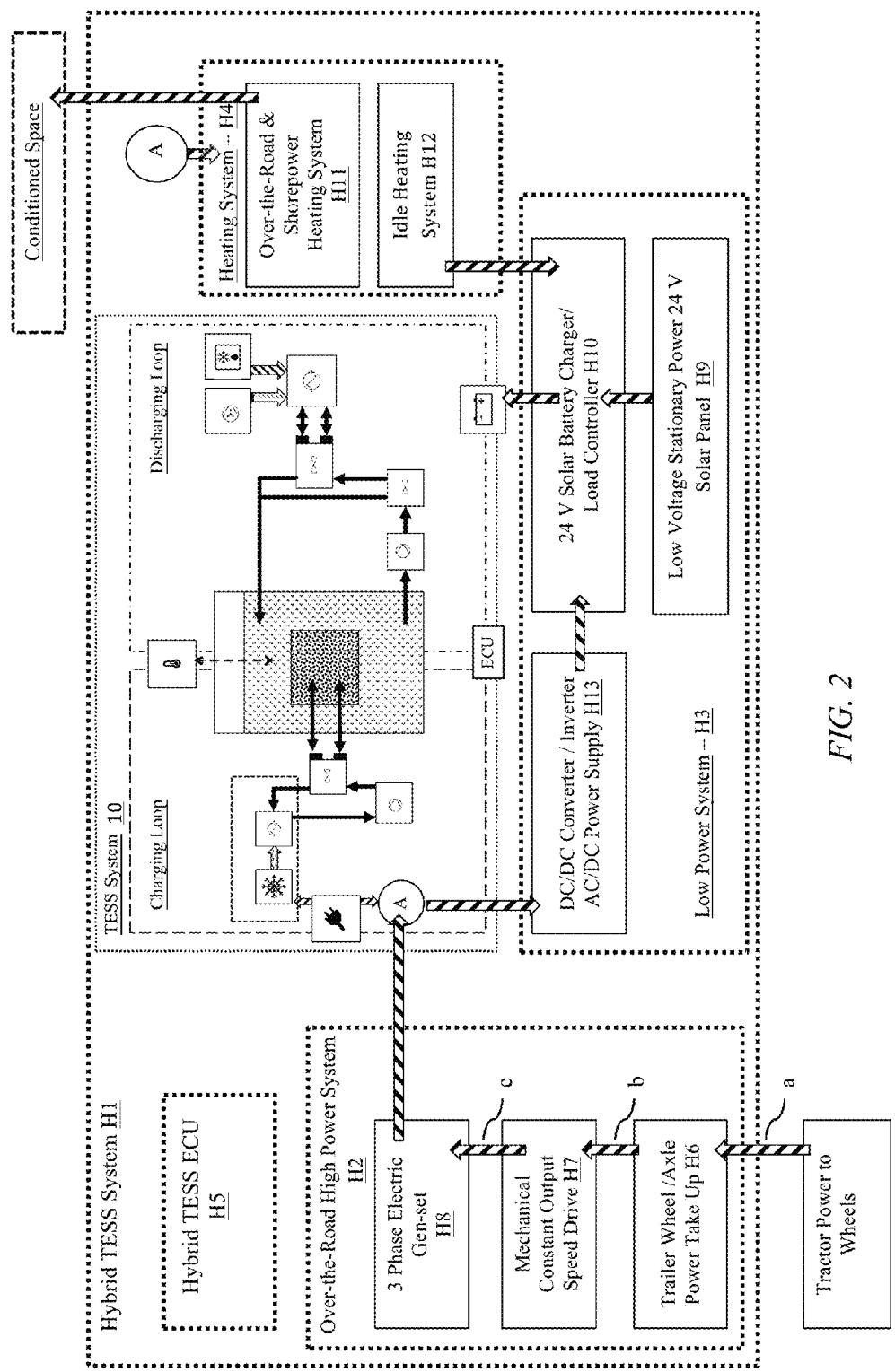
FIG. 2 is a schematic illustration of a mobile hybrid thermal energy storage system (HTESS).

FIG. 2 provides an overview of an exemplary HTESS mobile refrigeration system H1 which includes the TES system 10 (as shown for instance in FIG. 1). The Hybrid TES HTESS system H1 includes the TESS system 10, an over-the-road high-power system (OTRHPS) H2, a low-power system H3, a heating system H4, and a hybrid TESS controller H5. The over-the-road hybrid system H2 is comprised of a trailer wheel/axle power take up H6, a mechanical constant output speed drive H7 and a three-phase high power electric gen set H8. High power over-the-road is generated in this OTRHPS and can be directly used by the high power elements of the VCC system disclosed in the TESS 10. Additionally, while in motion over the road, the high power from the OTRHPS H2 is converted to DC low power in the low power system H3 by an AC-to-DC converter H13 and used to charge the battery energy storage system (BES) 120 of the TESS 10 or directly drive low power systems of the TESS 10 such as pumps 40 and fans 80. Also included in the low power system, is a low voltage independent stationary power source H9, such as solar panels, which can be used to power the low power TESS 10 functions or charge the BES 120 of the TESS 10. A low power battery charger load controller H10, such as a solar battery charger load controller, is provided in the low power system H3 to manage the loads and the battery charging efficiently.

The heating system H4, uses high power OTRHPS power to power conventional resistive heaters directly when traveling over the road and employs a novel high temperature battery (HTB) heating system to provide heating power while high power systems OTRHPS and shore power high power system SPHPS are not available.

Figure 3:
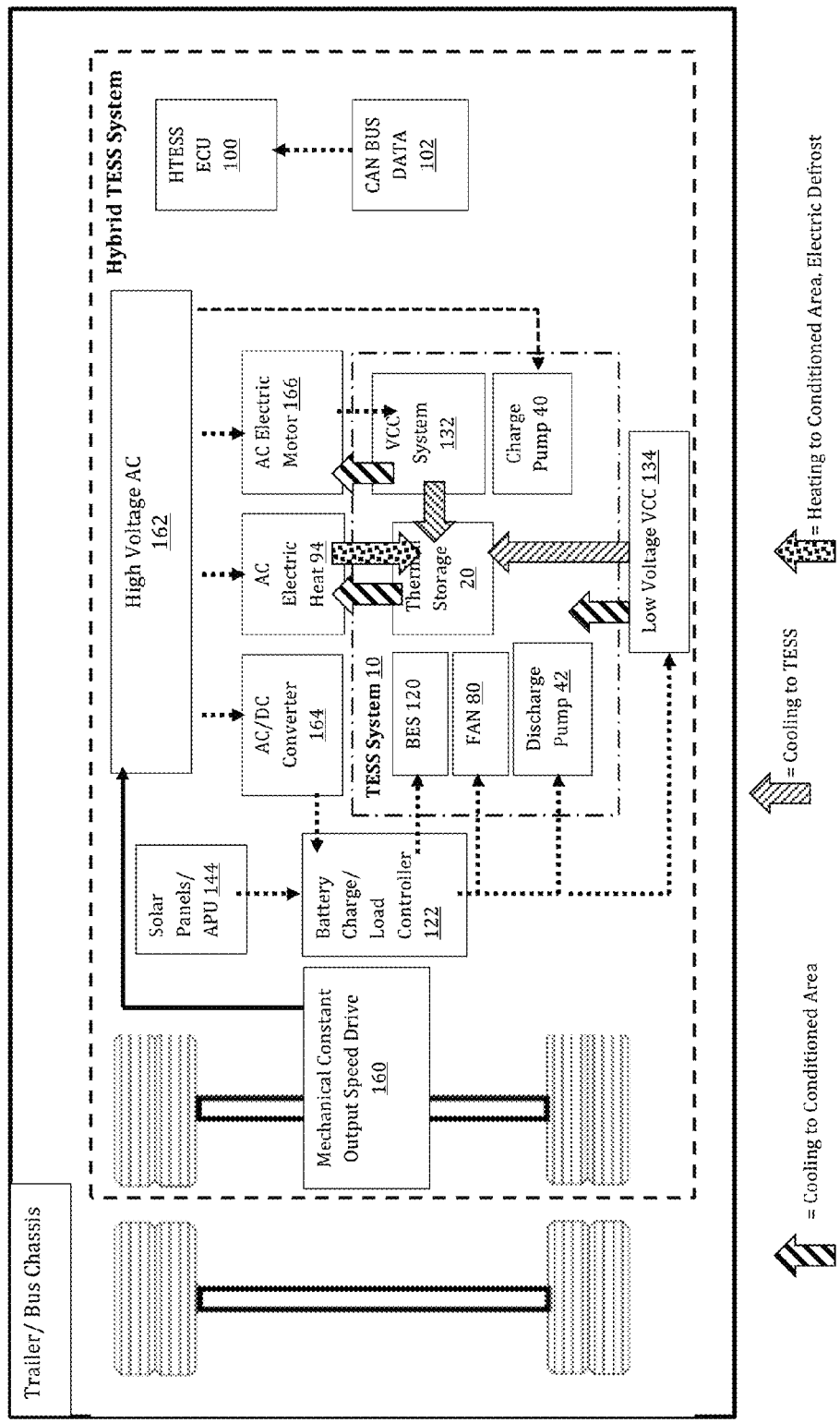
FIG. 3 is a schematic illustration of a mobile hybrid thermal energy storage system (HTESS) according to one aspect of the invention where high voltage AC power is provided by wheel/axle powered gen-set through constant output speed mechanical device.

FIG. 3 is a schematic illustration of a mobile hybrid thermal energy storage system (HTESS) where high voltage AC power is provided by wheel/axle powered gen-set through a mechanical constant output speed mechanical device 160. The mechanical constant output speed mechanical device 160 provides high voltage AC 162 to an AC/DC converter 164, an AC electric heater 94, an AC electric motor 166, and a charge pump 40. The AC/DC converter 164 can then supply power to the battery charge/load controller 122, which in turn provides power to the battery electric system 120, the fan 80 and the discharge pump 42 of the TESS system 10. The battery charge/load controller 122 can also supply power to a low voltage VCC system 134, which can be used to provide back-up cooling to both the TESS system 10 and the conditioned space (i.e. the space containing the cargo). The AC electric heater 94 provides heat to the conditioned space and provides electric defrosting for the TESS system 10, including the TESS system's heat exchangers. The AC electric motor 166, powers the primary VCC system 132, which is used to provides cooling for the TESS system 10 and can be used to directly cool the conditioned space when needed. The system of FIG. 3 also includes a CAN Bus data module 102 that interfaces with the HTESS electronic control unit 100. The identification of decelerations or "energy recovery mode" events can be accomplished using CAN Bus data, that data including vehicle speed, acceleration/deceleration events, and brake applications. The HTESS ECU 100 can use the data to switch between "energy recovery mode" from deceleration events and energy supply from the mechanical constant output speed mechanical device 160.

The system shown in FIG. 3 also includes solar panels 144 as an auxiliary power unit, supplying auxiliary power to the battery charge/load controller 122, which in turn can charge the battery electric system 120 and enable the powering of critical systems including the fan 80 and the discharge pump 42 of the TESS system 10, and the low voltage VCC system 134. At the heart of the system shown in FIG. 3 is the thermal storage device 20 (ESPCM reservoir) of the TESS system 10, which provides cooling for the conditioned space.

Figure 4:
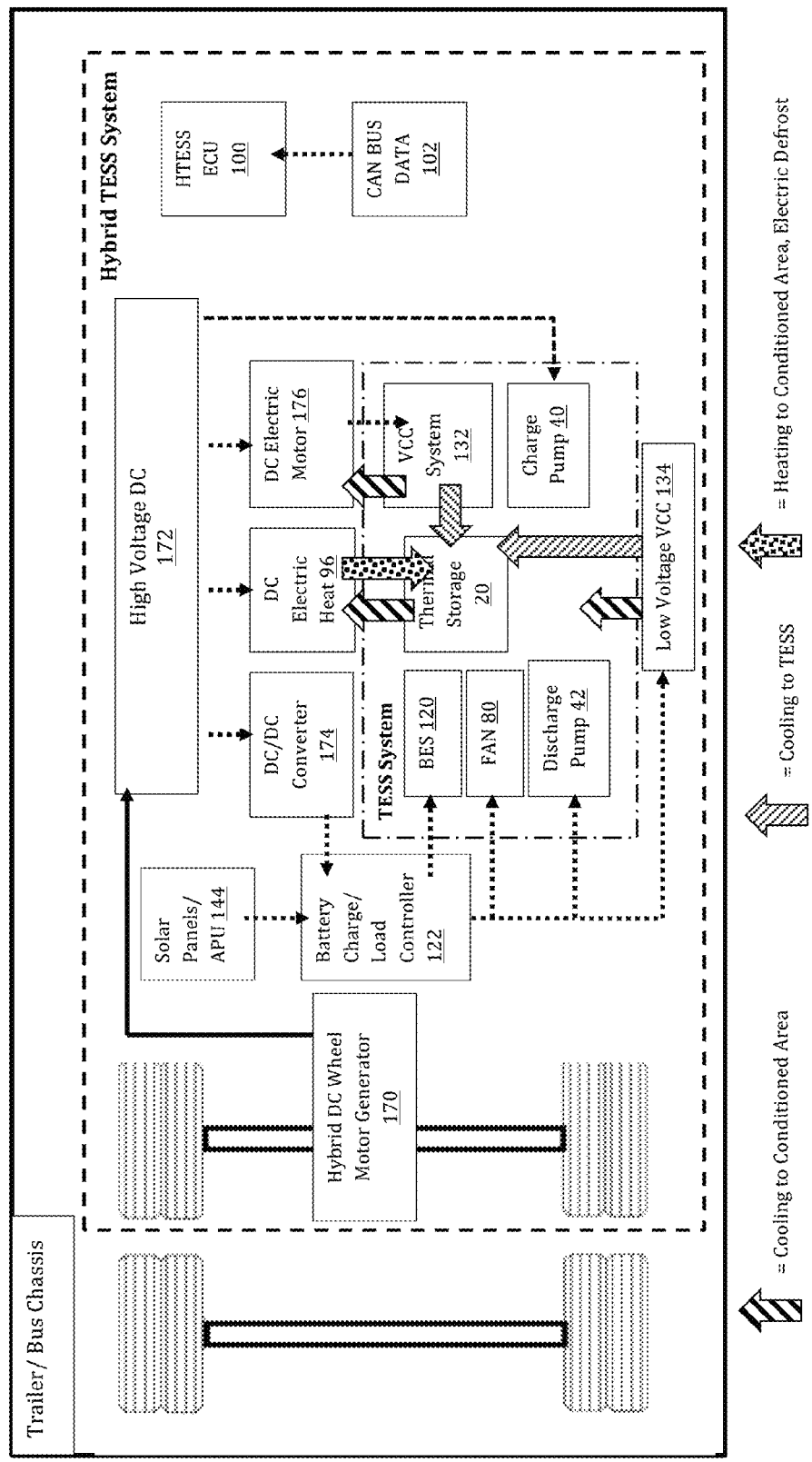
FIG. 4 is a schematic illustration of a mobile hybrid thermal energy storage system (HTESS) according to one aspect of the invention where high voltage DC power is provided by wheel motor power.

FIG. 4 is a schematic illustration of a mobile hybrid thermal energy storage system (HTESS) where high voltage DC power is provided by a hybrid DC wheel motor generator 170. The hybrid DC wheel motor generator 170 provides high voltage DC 172 to a DC/DC converter 174, a DC electric heater 96, a DC electric motor 176, and a charge pump 40. The DC/DC converter 174 can then supply power to the battery charge/load controller 122, which in turn provides power to the battery electric system 120, the fan 80 and the discharge pump 42 of the TESS system 10. The battery charge/load controller 122 can also supply power to a low voltage VCC system 134, which can be used to provide back-up cooling to both the TESS system 10 and the conditioned space (i.e. the space containing the cargo). The DC electric heater 96 provides heat to the conditioned space and provides electric defrosting for the TESS system 10, including the TESS system's heat exchangers. The DC electric motor 176, powers the primary VCC system 132, which is used to provides cooling for the TESS system 10 and can be used to directly cool the conditioned space when needed. The system of FIG. 4 also includes a CAN Bus data module 102 that interfaces with the HTESS electronic control unit 100. The identification of decelerations or "energy recovery mode" events can be accomplished using CAN Bus data, that data including vehicle speed, acceleration/deceleration events, and brake applications. The HTESS ECU 100 can use the data to switch between "energy recovery mode" from deceleration events and energy supply from the hybrid DC wheel motor generator 170.

The system shown in FIG. 4 also includes solar panels 144 as an auxiliary power unit, supplying auxiliary power to the battery charge/load controller 122, which in turn can charge the battery electric system 120 and enable the powering of critical systems including the fan 80 and the discharge pump 42 of the TESS system 10, and the low voltage VCC system 134. At the heart of the system shown in FIG. 4 is the thermal storage device 20 (ESPCM reservoir) of the TESS system 10, which provides cooling for the conditioned space.

Figure 5:
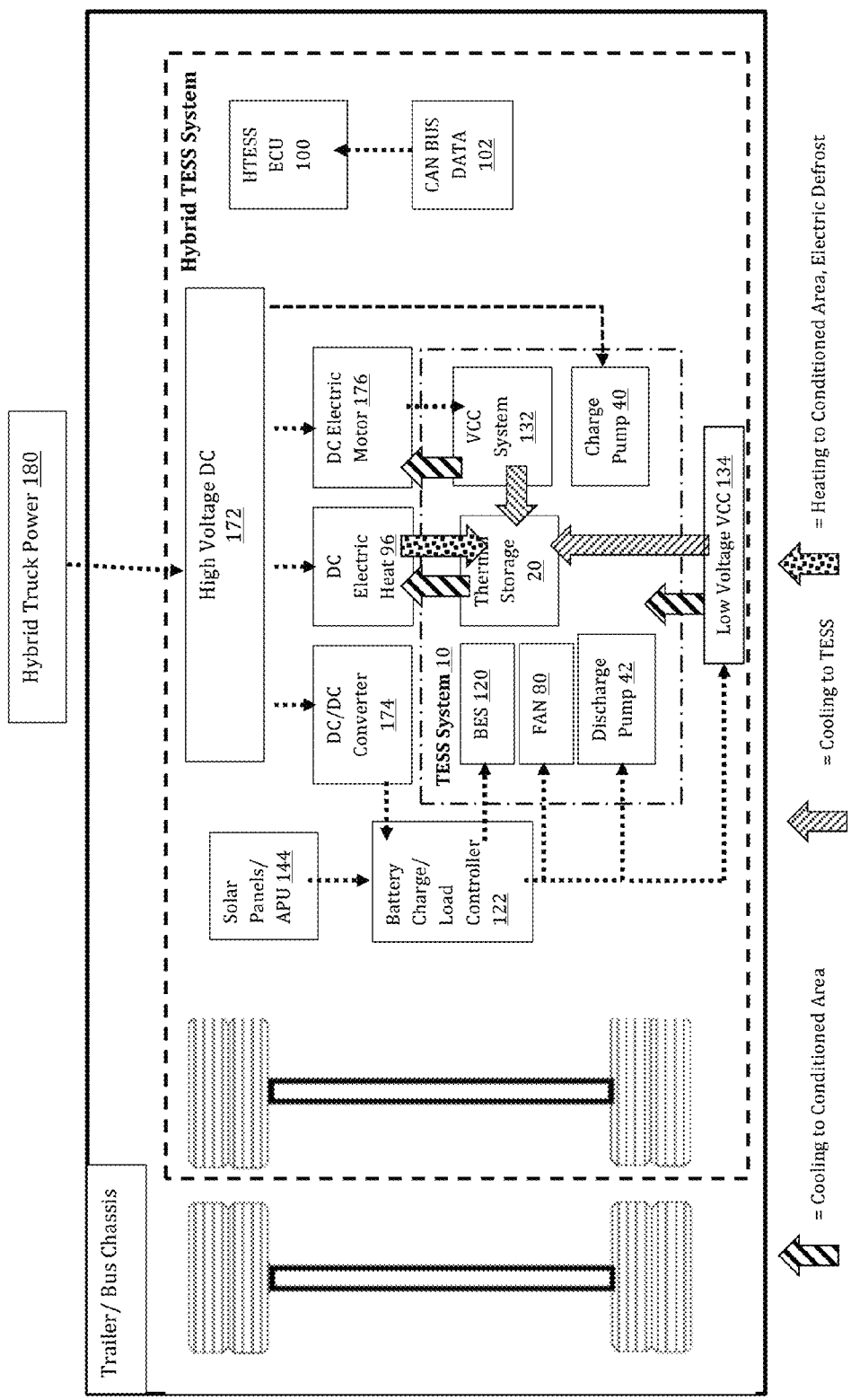
FIG. 5 is a schematic illustration of a mobile hybrid thermal energy storage system (HTESS) according to one aspect of the invention where hybrid truck power is provided.

FIG. 5 is a schematic illustration of a mobile hybrid thermal energy storage system (HTESS) where hybrid truck power is utilized to provide high voltage DC 172 to a DC/DC converter 174, a DC electric heater 96, a DC electric motor 176, and a charge pump 40. The DC/DC converter 174 can then supply power to the battery charge/load controller 122, which in turn provides power to the battery electric system 120, the fan 80 and the discharge pump 42 of the TESS system 10. The battery charge/load controller 122 can also supply power to a low voltage VCC system 134, which can be used to provide back-up cooling to both the TESS system 10 and the conditioned space (i.e. the space containing the cargo). The DC electric heater 96 provides heat to the conditioned space and provides electric defrosting for the TESS system 10, including the TESS system's heat exchangers. The DC electric motor 176, powers the primary VCC system 132, which is used to provides cooling for the TESS system 10 and can be used to directly cool the conditioned space when needed. The system of FIG. 5 also includes a CAN Bus data module 102 that interfaces with the HTESS electronic control unit 100. The identification of decelerations or "energy recovery mode" events can be accomplished using CAN Bus data, that data including vehicle speed, acceleration/deceleration events, and brake applications. The HTESS ECU 100 can use the data to switch between "energy recovery mode" from deceleration events and energy supply from the hybrid DC wheel motor generator 170.

The system shown in FIG. 5 also includes solar panels 144 as an auxiliary power unit, supplying auxiliary power to the battery charge/load controller 122, which in turn can charge the battery electric system 120 and enable the powering of critical systems including the fan 80 and the discharge pump 42 of the TESS system 10, and the low voltage VCC system 134. At the heart of the system shown in FIG. 4 is the thermal storage device 20 (ESPCM reservoir) of the TESS system 10, which provides cooling for the conditioned space.

Figure 6:
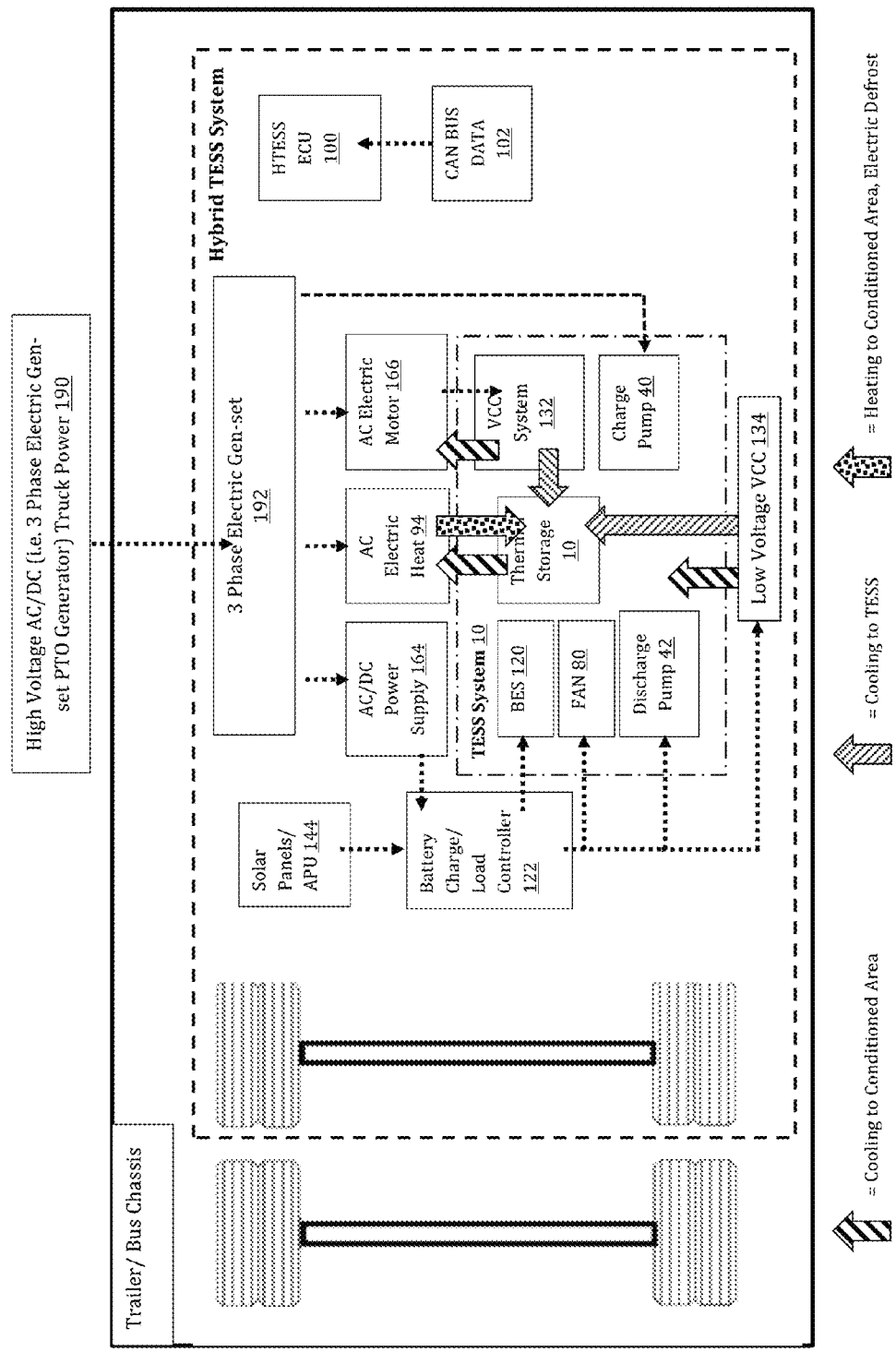
FIG. 6 is a schematic illustration of a mobile hybrid thermal energy storage system (HTESS) according to one aspect of the invention where high voltage AC/DC power is provided directly from the truck power takeoff device (PTO) generator.

FIG. 6 is a schematic illustration of a mobile hybrid thermal energy storage system (HTESS) where high voltage AC/DC power is provided directly from the truck power takeoff device (PTO) generator 190 via the 3-phase electric gen-set 192.

The 3-phase electric gen-set 192 provides high voltage AC to an AC/DC power supply 164, an AC electric heater 94, an AC electric motor 166, and a charge pump 40. The AC/DC converter 164 can then supply power to the battery charge/load controller 122, which in turn provides power to the battery electric system 120, the fan 80 and the discharge pump 42 of the TESS system 10. The battery charge/load controller 122 can also supply power to a low voltage VCC system 134, which can be used to provide back-up cooling to both the TESS system 10 and the conditioned space (i.e. the space containing the cargo). The AC electric heater 94 provides heat to the conditioned space and provides electric defrosting for the TESS system 10, including the TESS system's heat exchangers. The AC electric motor 166, powers the primary VCC system 132, which is used to provides cooling for the TESS system 10 and can be used to directly cool the conditioned space when needed. The system of FIG. 6 also includes a CAN Bus data module 102 that interfaces with the HTESS electronic control unit 100. The identification of decelerations or "energy recovery mode" events can be accomplished using CAN Bus data, that data including vehicle speed, acceleration/deceleration events, and brake applications. The HTESS ECU 100 can use the data to switch between "energy recovery mode" from deceleration events and energy supply from the mechanical constant output speed mechanical device 160.

The system shown in FIG. 6 also includes solar panels 144 as an auxiliary power unit, supplying auxiliary power to the battery charge/load controller 122, which in turn can charge the battery electric system 120 and enable the powering of critical systems including the fan 80 and the discharge pump 42 of the TESS system 10, and the low voltage VCC system 134. At the heart of the system shown in FIG. 3 is the thermal storage device 20 (ESPCM reservoir) of the TESS system 10, which provides cooling for the conditioned space.

Figure 7:
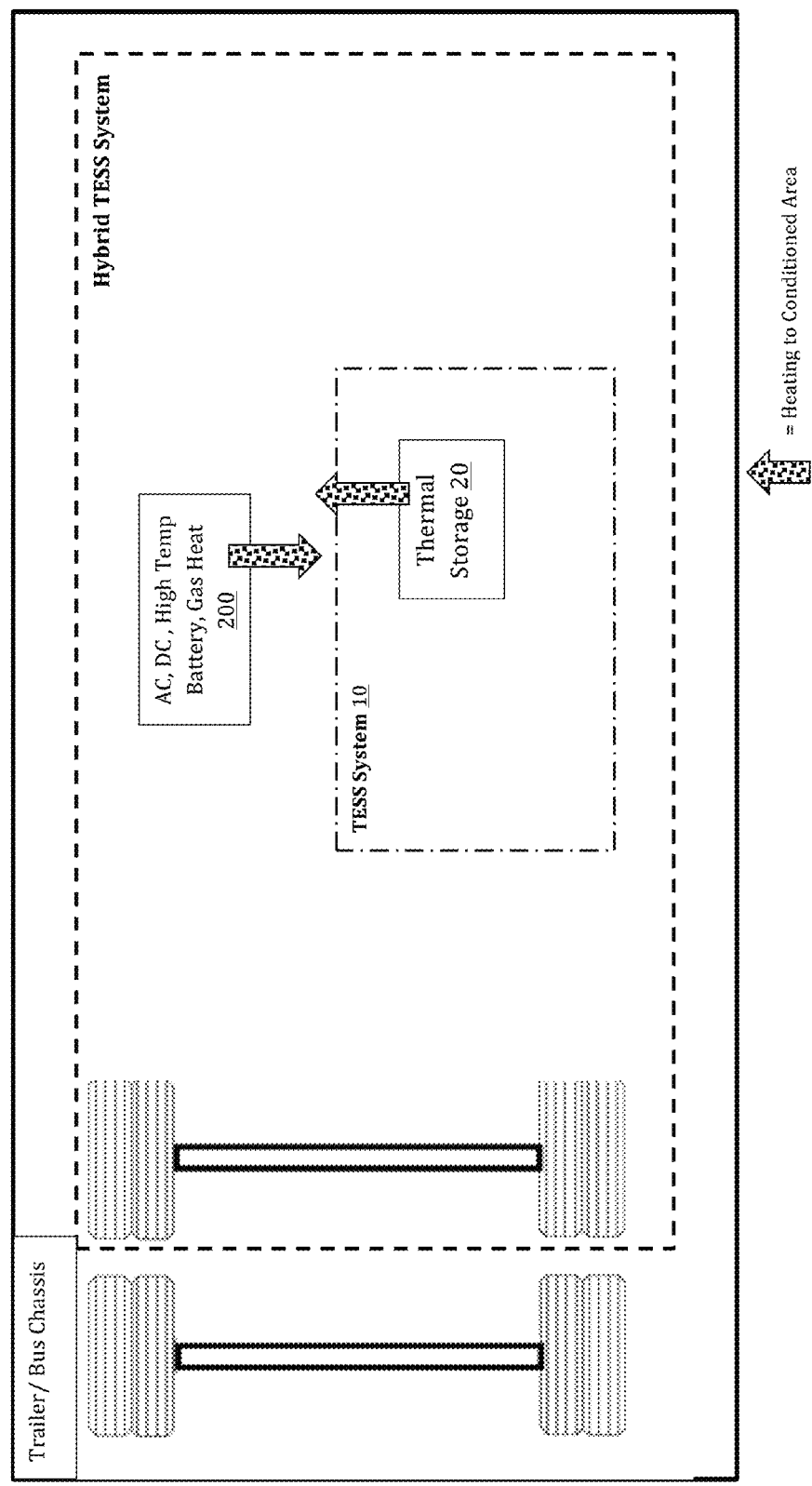
FIG. 7 is a schematic illustration of a mobile thermal energy storage system (HTESS) heating system options including DC electric, AC electric, gas fired and a DC heater battery chemical heat.
Figure 8:
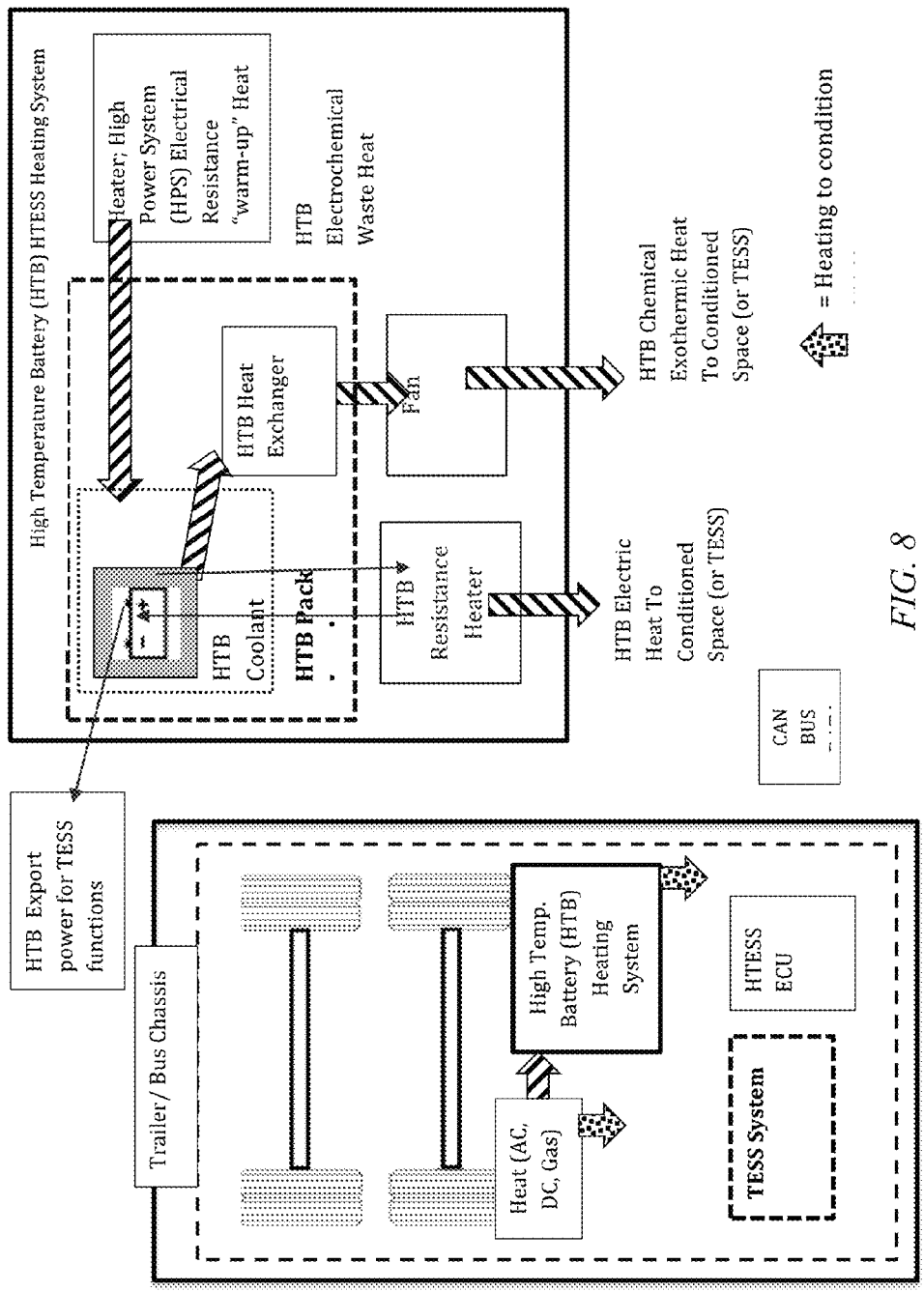
FIG. 8 is a schematic illustration of a novel mobile thermal energy storage system (HTESS) heating option combining chemical storage and thermal storage.

Turning to FIGS. 7 and 8, heating systems are shown in more detail. In FIG. 7 the high-power over-the-road and shorepower portion of the heating system is presented. The OTRHPS or SPHPS provide power to resistive heaters and provide direct heating to the conditioned space over the road or while plugged in.

In FIG. 8, the novel idle heating system is presented. To provide heating when HPS is not immediately available, such as when idling or staging in cold weather and not plugged in, the novel HTESS idle heating system uses a combined electrical and chemical heating system, also called a battery-based combined heat and power system. This combined heat and power battery system is shown at the high temperature battery pack level. In cold weather when non-HPS heating is anticipated, the HTESS controller employs high temperature batteries (HTB) (such as sodium nickel chloride batteries (Zebra) in a high temperature battery heating system (HT-BHS) to provide heating. When use is anticipated, such as ambient temperatures dropping below a set point, the electric heater driven by the OTRHPS, the SPHPS or the HTB itself is commanded by the ECU to preheat or maintain heat of the HTESS (HTB) cooling reservoir of the HTBHS to achieve operating temperature of the battery (which is otherwise inert as it begins electrical operation at 300 C). A sodium nickel chloride battery, for example, has to be maintained at an internal operating temperature of between 270° C. and 350° C. for efficient operation. While the battery is being used, this causes no energy penalty since the internal resistance of the Zebra battery coverts resistive losses to heat with 100% efficiency. All batteries have internal resistance and in all batteries, this internally generated heat has to be removed by a cooling system to prevent overheating. Therefore in the case of the Zebra battery, the heat generated during operation can be used to maintain the temperature as well as external heating. During non-HPS operating periods, the HTB provides direct air heating to the conditioned space through a dc resistance heater and its own exothermic reaction to the HTB cooling reservoir and an air (or other) heat exchanger. The HPS, stores electrical and heat energy at a significantly higher energy density (KJ/KG), (KJ/m3) than any known "hot PCM" material. The HTB also has several key advantages in addition to the energy storage density. Unless preheated, it is inert and retains a charge for very long periods of time, so for example, during hot seasonal periods of time when the HTB heating energy is not required to heat the conditioned space, the HTB remains off. During heating season, the HTB takes several days to cool off and can maintain its own temperature eliminating the need for any active charging. In an advantageous embodiment a zebra HTB converts electrical to heat energy at 100% efficiency and although discharge efficiencies are in the 75% range, when used as a combined heat and power device, an HTB can provide well over 85% efficiency. While not completely ideal, it can be seen that the SPHPS and OTRHPS heating element could also be provided to the TESS reservoir for use as thermal storage in a more conventional fashion.

The HTESS offers numerous advantages over a system using only a TESS. The HTESS fully eliminates the diesel engine from TRU while maintaining virtually unlimited range over the road. The HTESS also provides a net zero or net reduction in trailer weight and consumed volume. While stationary, HTESS provides a 1-3 hr. cooling (and heating) window where the TRU or VCC power does not need to be plugged in. For continuous operations with short duration loading, no plug in is needed. For extended shorepower refrigeration periods, the HTESS extends the range whereby the compressor does not need to cycle on. This simplifies the shorepower load demand management. The HTESS allows practical over-the-road electrical heating function for trailers during cold weather. (TESS BES System is capable to provide only defrost) Advantages over systems prior to the development of the TES system herein include that the HTESS does not require diesel APU. It also does not require expensive, heavy, large battery systems or a connection to the truck. The HTESS provides heating and cooling functions for the necessary entire service period without plugging in. It also provides high voltage and power source over the road capable to drive existing type electric TRU VCC systems.

By adopting an HTESS system as an enhancement to a TES system, the Battery Electric System (BES) can be made smaller due to over-the-road power and solar power. The HTESS also allows for direct power of VCC for charging of the TESS and cooling cabin with conventional VCC. A redesigned compressor system for smaller capacity is also possible due to HTESS capacity. The HTESS also includes additional controls to manage state of charge and power from various sources.

The HTESS provides a novel high voltage over-the-road power source using a wheel/axle motor/generator. In one embodiment, a hydraulic axle pump or driveshaft pump develops hydraulic pressure to drive hydraulic motor, which drives gen-set to power VCC/TESS. Alternatively, a mechanical constant speed drive system for genset through CVCVT can be employed. Constant speed (velocity) output of axle or driveshaft through continuously variable transmission can result in a steady source of power. Also, a commercial wheel motor product for hybrid vehicles (Protein Electric) can be adopted. DC power can be applied to a second DC motor to mechanically drive VCC refrigeration components, such as the compressor TESS. A low voltage system can be provided through a DC/DC inverter to power TESS and BES functions. A high voltage hybrid truck power, or genset power can also be used as a high voltage power source but these are not optimal embodiments as they require tethering to a mating truck at all times for operation.

Hybrid vehicles, such as hybrid automobiles, often recapture energy only upon braking. Under such a scenario power, such as to charge the TES system, would only be made during braking events. The present hybrid TES system would charge the BES batteries and TESS PCM with the truck engine making power. So again, traditional hybrid vehicles will not charge batteries when the engine is making power, only while decelerating.

So for example, according to aspects of the present invention, a TES system could first utilize a grid-based charge-up. Once the system is charged. The TES system could operate in a mixed mode (charge depleting and charge sustaining) or a singular charge-sustaining mode. The charge-sustaining mode could be utilized for critical cargo. It would maintain a fully-charged system over the road and would ignore the possibility for recovering energy due to deceleration. Truck power (or deceleration power) would be used mechanically drive the generator. Some small incremental fuel expense at the truck is used to charge the TESS.

An alternative mixed-mode would have charge-depleting with a charge sustaining setpoint. This would allow for a normal or high efficiency operation.

Under normal efficiency the TES system can be fully charged from grid power. The TESS then cools the conditioned space until 70% charge level is reached, for example. Over the road power would then maintain a minimum target TESS state of charge (e.g. 70%) always. Truck power could be used if needed, but the HTESS can take advantage of deceleration energy between the setpoint (e.g. 70%) and 100%. Deceleration events are allowed to charge the TESS back to 100%. Below 70% the truck power would also charge the HTES system, along with deceleration charging the HTESS. This creates less chance for truck power/fuel to be used.

Under a high efficiency mode, initial charging could occur using grid power and use only deceleration events to charge TESS to lower setpoint under normal operating conditions. The controller would allow the system to deplete the majority of the TESS energy before using truck power to charge the system and to the extent that the deceleration events were not sufficient to maintain the system within the desired range. Such a management scenario should maximize the savings, but with the risk that the TESS storage runs low. Under this scenario a low charge sustaining value could be set (e.g. 20% which can cover normal operational variation), which would require a good knowledge of the operating conditions for a particular application to insure that TESS storage is adequate. This creates a minimal chance for using truck power for the lowest fuel usage and consumption.

The identification of deceleration or "energy recovery mode" from can be accomplished using CAN Bus data, including vehicle speed, acceleration/deceleration events, and brake applications such as are defined in truck/trailer CAN definitions. SAE J1939, ISO 11992-1.

Summary of TESS Case Examples:
Grid-based Charge-up: Once charged, operate in charge depleting or charge sustaining for TESS.
Charge-sustaining Critical Cargo: Fully-charge and maintain the HTESS at full charge immediately over the road so ignores the possibility for recovering energy due to deceleration. Truck power is used to pull the generator and uses some small incremental fuel at the truck.
Charge Sustaining Normal: Maintain a minimum target TESS state of charge (e.g. 70%) always. Uses truck power if needed, but takes advantage of deceleration energy. Allows more efficient operation. (If fully charged from grid power, TESS cools the load until 70% charge is achieved for example. Deceleration events are allowed to charge the TESS back to 100% and below 70% truck power charges the TESS.)
Charge Sustaining High Efficiency: Charge using grid and use only deceleration events to charge TESS. Deplete the Majority of the TESS energy before using truck power to charge. Should maximize the savings with some risk that the TESS storage runs low. Likely to set a low charge sustaining value (e.g. 20% which can cover normal operational variation).

Components are also provided for low voltage stationary and over-the-road power. This can be accomplished via wheel/axle high power conversion or inversion and provides volt power to battery load and charge controller, which charges the BES and directly may power the TESS elements (except generally the VCC refrigeration compressor motor). Solar power can be used to augment the wheel/axle motor power and directly power TESS elements at idle and therefore further minimize BES system size and cost. A small APU can be provided as backup for low voltage functions. Low voltage truck alternator power can also be used, but is not the optimal solution for reasons such as those disclosed herein.

Also provided in the context of the HTES system is a high temperature battery (HTB) system employing a battery [such as zebra battery, sodium-nickel-chloride] whereby electrical energy is taken for use in a resistance heater from the HTB and thermal electrochemical energy is also taken from HTB for heating. An electrochemical combined heat and power system. The sodium-nickel-chloride battery, also known as ZEBRA today is being used successfully in many applications.

ZEBRA has a nominal cell voltage of 2.58 volts and an specific energy of 90-120 Wh/kg, a level comparable with Li-manganese and Li-phosphate. The service life is about eight years and 3,000 cycles. It can be fast-charged, is non-toxic and the raw materials are abundant and low-cost. ZEBRA batteries come in large sizes of 10 kWh or higher and typical applications are forklifts, railways, ships, submarines and electric cars. Over the road high power system (OTRHPS) or SPHPS provides the initial heat energy and the batteries take 2-3 days to cool, which for well-managed fleet use in cold climates means very little cycling. This allows direct heating the air of the container with high voltage coils over the road with traditional TRU methods (high power heating element). Alternatively, electric or gas or other more conventional direct heating of cold PCM or other storage medium can be employed. (Not PCM in Heat Mode).

TES System:

The present invention provides systems and methods for a Thermal Energy Storage System ("TES system" or "TESS") that is characterized by rapid charging of the TESS and then providing portable, self-powered, multi-temperature refrigeration control for large, mobile transport enclosures. The TES system of the invention is capable of providing efficient refrigeration control across a wide range of temperatures including the temperature range of 40° F. to −20° F., as required in many important refrigerated cargo applications. To accomplish this cooling, a fan system passes air over a heat exchanger containing flowing eutectic slurry phase change material (ESPCM), so as to cool the air prior to it being provided into the compartment of the mobile refrigerated transport truck. The ESPCM flow rate is managed by a system of pumps and valves to control the forced convection cooling effect in a closed loop fashion.

The system is presented in the context of a large, refrigerated truck trailer units, which are typically rectangular cuboids 53 feet in length, 99 inches in width and 110 inches in height, with a cubic capacity of 1,050 feet, but the system will find application in a wide variety of large, mobile enclosures requiring efficient cooling, such as sea containers, box trucks, rail systems and buses, and for the transport of cargo and passengers.

In an exemplary configuration the TES system employs a Eutectic Slurry Phase Change Material (ESPCM), at least one air-to-liquid heat exchanger (ESPCM/AIR), at least one ESPCM slurry generator (ESPCM_GEN), a battery energy storage system ("BES system" or "BESS"), a fan system, a working fluid (WF), two circulation pumps for circulating the ESPCM and the working fluid, and an Electronic Control Unit (ECU) to manage the operation of the system.

The TES system employs phase change materials (PCMs) to store and deliver cooling power. The TES system has a "charging" side and a "discharging" side. The charging side "charges" the ESPCM when heat is absorbed by the WF from the PCM. The discharging side "discharges" by cooling the cargo and absorbing heat.

On the discharging side of the TES system, the ESPCM is stored as a slurry in an ESPCM reservoir. The reservoir is in fluid communication with an ESPCM air-to-liquid heat exchanger, allowing ESPCM slurry/liquid to circulate between the reservoir and the heat exchanger. The ESPCM pump drives the circulation of the ESPCM liquid. The return ESPCM liquid from the exchanger to the reservoir is sprayed on top of the ESPCM slurry to provide nearly infinite heat transfer. The fan system and pump systems are powered by the BES system. Temperature control is provided by increasing and decreasing the ESPCM pump flow through the ESPCM/AIR exchanger and by controllably adjusting the fan speed. Defrost energy is minimized by reversing the flow of the ESPCM liquid across the ESPCM/AIR exchanger and managing ESPCM flow rate and direction. A high density battery energy storage (BES) system in combination with an electronic control unit (ECU) can provide electrical power and operational control for the ESPCM pump, air fans, ECU, controls and defrost heat, as necessary.

As mentioned above, the TES system employs phase change materials (PCMs) to store and deliver cooling effect or power. One advantageous aspect of the system is its ability to apply a variety of PCMs, but without ongoing adjustment of PCM materials to achieve various target temperatures once a PCM is applied. When used for a large refrigerated truck trailer unit, where the duration between charges may be around 8 hours, the TES system provides the necessary electric power and thermal cooling to cool the load during shipment without the use of a combustion engine auxiliary power unit (APU). The term "charge", as used herein, refers not only to the more traditional notion of energizing a battery or other electrical storage device by passing a current through it in the direction opposite to discharge, but also to "charging" the thermal energy storage device through the removal of heat from the PCM, which then allows the PCM to remove heat from the surroundings in "discharge" mode by absorbing heat such as from the compartment of a trailer. In the context of longer duration applications, such as found in shipping using sea containers, where goods may be stored for long durations with cooling using electrically powered refrigeration, the TES system enables improved power management during transport and minimizes peak electrical power requirements by providing cooling during interim periods where the electrically-powered refrigeration system is shut down or in stand-by. The duration of cooling for any given TES system will be influenced by a number of factors including the target temperature, the volume of space to be refrigerated, and the amount and state of charge of the ESPCM.

The present invention further proposes the use of efficient slurry systems for trailer and transport refrigeration with the slurry generated onboard via a slurry generator heat exchanger and appropriate PCM material and additives, or a combination heat exchanger mechanical device slurry generator. The slurry generator in an advantageous embodiment of the present invention consists of a PCM to working fluid heat exchanger and associated PCM and working fluid flow controls. To generate slurry during charging of the TESS in this advantageous embodiment, the highly chilled working fluid is passed through the slurry generator, which is a ESPCM-to-WF heat exchanger. The heat exchanger, designed for high levels of heat transfer and slurry ice formation, along with the intrinsic nature of the selected PCM material, work in combination to form ice crystals on the ESPCM side of the heat exchanger. Most of these crystals, due to their buoyancy, float away from the heat exchanger surface into the bulk ESPCM slurry in the ESPCM storage and are held beneath the slurry surface by a mesh screen or other means. Some of the ice crystals will have a tendency to remain on the ESPCM/WF heat exchanger. While some formation is acceptable, large crystal formations will reduce the efficiency of heat transfer between the working fluid and the ESPCM and are therefore undesirable.

The flow control of the slurry generator is designed to manage the systematic removal of sticking ice crystals. This is managed via two flow control paths. On the working fluid side, flow reversal and flow regulation control is performed periodically. On the ESPCM side the flow is managed to cause ice crystals to be removed by the mechanical flow work of the moving ESPCM slurry. The working fluid flow control takes advantage of the intrinsic nature of tube and fin heat exchangers in which the outlet of the exchanger is slightly warmer than the outlet due to heat absorption. When the WF flow is reversed ice crystals forming at one end of the exchanger will have a reduced propensity to stick to the heat exchanger surface due to the slight change in the surface temperature. The WF flow rate can also be managed to insure that the process is effective. The ESPCM flow management in the slurry generator takes advantage of the kinetic energy of the PCM slurry flow to remove the crystals from the surface and to improve the homogeneity of the mixture. In the figures, this flow path of the ESPCM 22 is through the pump 40, across the bypass valve 50 and returning directly to the ESPCM storage 20.

Figure 30:
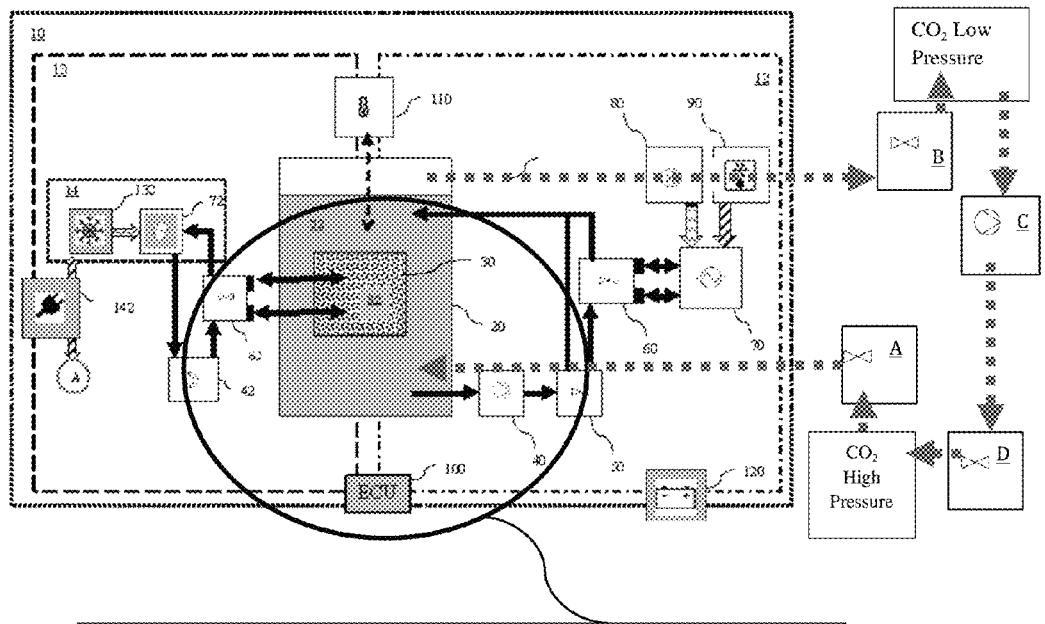
FIG. 30 is a schematic illustration of a TESS with a system to increase/saturate the dissolved gas level (e.g. $CO_2$) in the ESPCM slurry.
Figure 31:
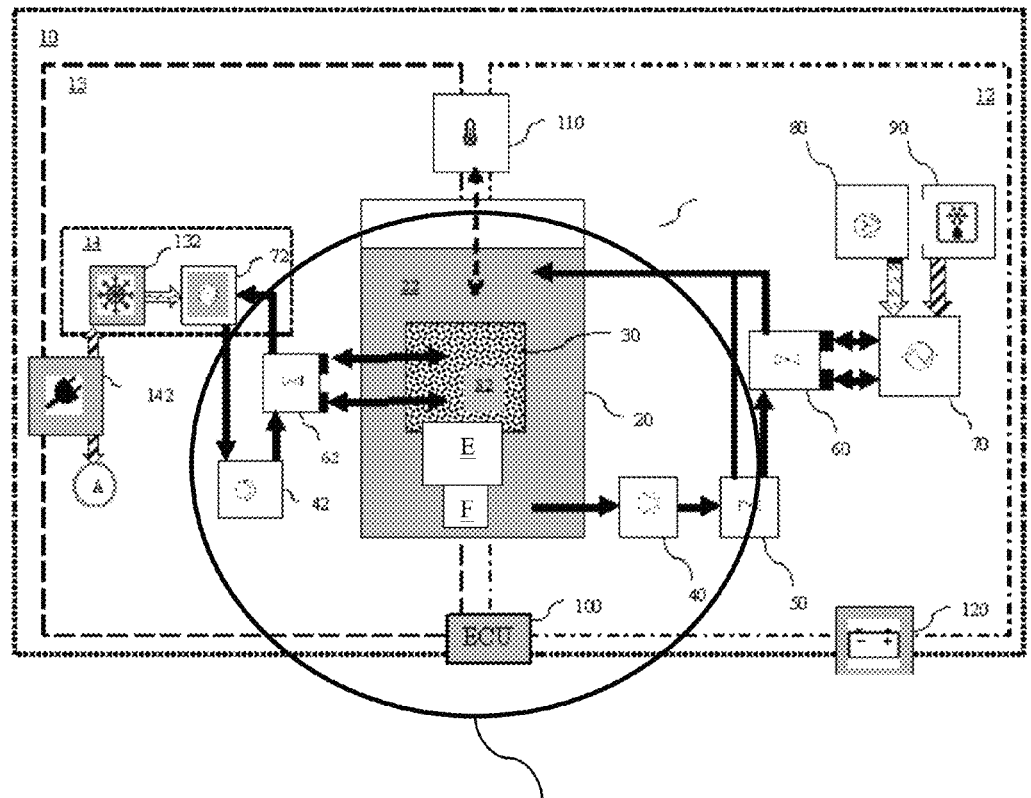
FIG. 31 is a schematic illustration of a TESS with a mechanical scraping slurry system.
Figure 32:
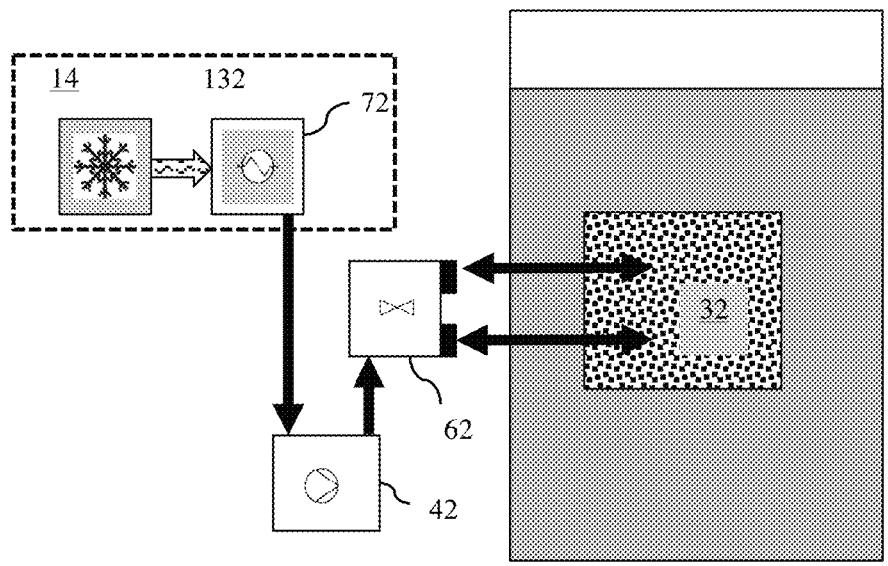
FIG. 32 is a schematic illustration of a slurry generator using direct VCC cooling.
Figure 33:
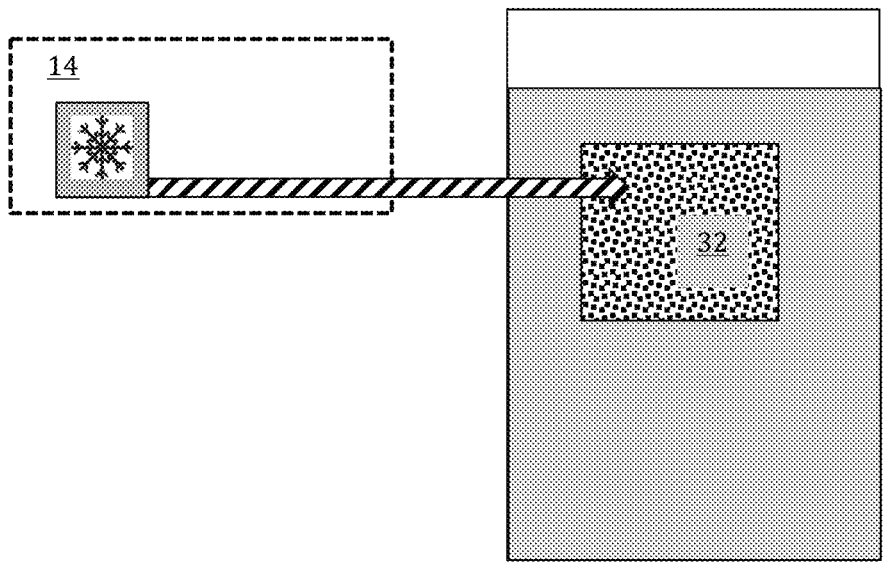
FIG. 33 is a schematic illustration of a slurry generator using direct VCC cooling.

In a possible embodiment of the present invention slurry generator, a dissolved gas system, such as $CO_2$ can be incorporated into the ESPCM slurry generator. (See e.g. FIG. 30) The dissolved gas system would consist of a high pressure and low pressure dissolved gas tank, a compressor and associated valves and controls. When the ESPCM is nearly discharged, the dissolved gas system would expose the ESPCM to high pressure gas to saturate it. Using $CO_2$ and water as an example, the dissolved $CO_2$ gas would provide sub-cooling capability for the water ESPCM due to its physical effect on water and other liquids. $CO_2$ saturated water for example freezes at a lower temperature than non-$CO_2$ saturated water. The sub-cooled ESPCM at high $CO_2$ pressure would then be reduced to a lower pressure causing immediate slurry formation as the sub-cooling effect is lost. The release of the $CO_2$ from the liquid causes this effect. The lower pressure $CO_2$ would be captured in the low pressure $CO_2$ storage and pumped into the high pressure $CO_2$ storage. Alternately, while not the most optimal embodiment, $CO_2$ or $CO_2$ impregnated PCM could be purchased commercially in high pressure containers and vented to atmosphere during slurry generation, eliminating the pumping loop complexity. This dissolved gas slurry generator can also be applied to typical land-based TES systems, which use water to improve their PCM charge density and thus footprint. Most land-based TES freeze water on tubes, leaving much unfrozen water, which reduces the cooling storage density. The dissolved gas slurry system can provide higher thermal charge density as well as higher and more stable heat transfer rates due to the nature of slurry discharge.

Another possible embodiment of the present invention slurry generator is the use of anti-freeze proteins or other sub-cooling additives to the ESPCM to sub-cool and make homogeneous the ESPCM slurry. Antifreeze proteins are used to suppress the freezing temperature of liquids and have been used commercially with FDA approved-ice cream, indicating the food safe nature. By suppressing the freezing temperature, and retaining the melting temperature of liquids, the proteins provide a hysteresis temperature window for charging and discharging the ESPCM, which can improve the cooling state of charge, or charge density, and simplify the cooling state of charge detection.

While ESPCM/WF heat exchangers are generally the smallest and lightest approach to slurry generation, they are also generally more complex and relatively more expensive than other slurry generation systems which employ mechanical ice scraping. In one advantageous embodiment of the present invention slurry generation of the TESS system can justify relatively higher cost slurry generating heat exchangers due to the critical mobile need for minimized weight, high cooling density, charging speed, efficiency, and large cooling capacity. The conventional land and marine-based slurry generation systems generally have the objective of slurry output capacity vs. cost and less focus on weight and slurry state of charge, or slurry density. The non-mechanical slurry generator is therefore is not generally used for ground-based, and ship-based systems, which have much broader space and weight constraints. These land and ship based systems generally use mechanical slurry generators or choose even lower cost non-slurry systems as a conscious trade off for system simplicity.

While the non-mechanical slurry generator is an advantageous embodiment, other mechanical slurry generators are also possible embodiments to the slurry generator of the present invention. Another possible embodiment of the slurry generator is taking the cooling energy to generate slurry directly from the VCC refrigeration 14 instead of through the present inventions working fluid 32 path.

In an alternate embodiment to the present invention, the slurry generator would have a working fluid-to-ESPCM heat exchanger, which also includes a mechanical ice scraper function. In this embodiment, the ice and ice crystal formation on the ESPCM/WF exchanger would be augmented by mechanical ice scraping. The mechanical ice scraper would be driven by an electric motor powered by shore power or other high power system. The mechanical system could also be powered by alternative power systems.

In another embodiment, the slurry generator heat exchanger of the present invention could be directly coupled to the VCC system. This provides the advantage of one less cooling loop temperature drop, but has some potential drawbacks, such as high use of VCC refrigerant, and limited ability to manage ice removal at the evaporator surface without mechanical means. VCC refrigerants are expensive and becoming regulated worldwide to limit their use due to harmful effects to the environment. Large amounts of VCC refrigerant are needed to bring the cooling to the load in multi-zone distributed systems so it is desirable to use a TESS WF approach to minimize the VCC fluid use. Additionally, the need for mechanical work to remove the ice crystals from the VCC evaporator in a direct VCC/ESPCM exchanger adds weight and complexity to the system. Recognizing their disadvantages, these direct VCC-coupled embodiments may be desirable if it is desired to maximize temperature performance by eliminating the working fluid cooling loop. Each heat exchanger loop generally requires a "delta T" or temperature difference to insure heat exchanger efficiency, so more loops in the system results in less usable temperature capacity in the cooled space. A typical minimum delta T is about 10° C.

Ice slurry systems produce small particles of ice within a solution, often using additives, such as glycol and water, in the solution. The resulting ice slurry solution is a slushy mixture that retains aspects of its fluid characteristics such that it can be pumped through a system. Because of its characteristics, ice slurry generators do not suffer from the thermal charging efficiency degradation seen in many other systems that occurs as ice builds up on an evaporator surface.

In ice slurry systems, ice particles are generated by passing a weak glycol/water or other PCM solution through tubing that is surrounded by an evaporating refrigerant, or as in the preferred embodiment of the invention a highly cooled working fluid ice particles form as the glycol/water or other PCM solution is cooled by the evaporating refrigerant or the WF flow The resulting slush can either form in or drop directly into a storage tank or be pumped into a storage tank depending on the system configuration. Ice-free glycol/water or other PCM solution can then be pumped from the storage tank. Discharge is accomplished by pumping the cool solution from the tank either directly through the cooling load or through an intermediate heat exchanger that isolates the cooling load from the ice slurry system. The resulting solution that has been warmed, such as by passing through a heat exchanger, is then returned to the top of the tank and distributed over the ice slurry via multiple spray nozzles.

One characteristic of ice slurry is the small size of the resulting particle. Due to the small size of the particle, the ice slurry can result in better heat transfer between the solution and the ice when compared to either ice harvesting or ice-on-coil systems which are typically used in marine or land-based TES. Like an ice harvester, ice slurry systems have relatively high fixed costs associated with the evaporator or ice generator component, but relatively low incremental costs as storage capacity is added.

A VCC refrigeration system can be used to charge the ESPCM. The VCC refrigeration system can be onboard the trailer for a self-contained system, or use off-board communication with a multistage refrigeration device for higher Coefficient of Performance (COPR) and the possibility to take advantage of off-peak charging. A liquid working fluid (WF) interfaces between the VCC and the ESPCM to charge the ESPCM, thus providing the cooling capacity transfer function between the VCC and the ESPCM. The WF is supplied as a pumped liquid which simplifies and expedites the onboard and off-board charging function, maximizing the flow and heat transfer with forced convection to the ESPCM, while reducing the cost of the pumping system for on and off board systems.

The operation of large cargo/shipping containers, whether they are trucks, trains, planes, buses, ships, etc., can be divided into two phases: (1) time spent actually in transit and (2) time spent with the cargo, goods or passengers where the vehicle is not in transit but the cargo is nevertheless under the control of the vehicle, such as a ship in dock or a truck at a truck stop. During these non-transit times, external power sources will often be available that can be used to re-charge the systems, and at a fraction of the cost of using the on-board power systems. These non-transit power sources are referred to herein as "shorepower," which includes the traditional definition of the provision of shoreside electrical power to a ship at berth while its main and auxiliary engines are turned off, but applies more generally to the provision of power by an external power source to recharge the cooling system of the vehicle. While the system is plugged into shorepower, the BES can rapidly charge and the ESPCM slurry can be quickly produced by the ESPCM slurry generator. Charging cooling capacity is provided by a vapor compression cycle (VCC) refrigeration system or other means on-board (FIGS. 1, 10, and 12) or off-board the trailer (FIG. 11). The fully-charged ESPCM and the BES system can then provide effective multi-temperature cooling to the refrigerated space during transport without the operation of the VCC refrigeration system, or the need for power from the TRU APU.

Many hours of cooling capacity and significant refrigeration temperature control for space cooling can be achieved using a flowing eutectic slurry phase change material (ESPCM) with a very low freezing temperature. The addition of a dedicated high energy density (KJ/KG) BES system, such as Li-ion batteries, can allow for independent operation and multi-temperature control without the need for VCC operation, or truck engine power during over-the-road during transport. The system is practical to use with current PCMs and the high-energy mass and power density lithium-ion BES system can be sized to power fans and accessory electric heating/defrost elements depending upon the application.

Turning to the figures, FIG. 1 provides an overview of an exemplary TES mobile refrigeration system 10. The TES system 10 includes a discharging loop 12 and a charging loop 13. The discharging loop 12 and the charging loop 13 share an insulated ESPCM reservoir 20, containing an ESPCM 22, which is stored as a slurry in the ESPCM reservoir 20. By "ice slurry" or "slurry" it is meant a mixture of small ice particles and carrier liquid. Ideally, the slurry is a homogenous mixture of small ice particles and carrier liquid dispersed throughout the reservoir, but in practice the mixture is often stratified with the ice tending towards the top of the reservoir. The liquid can be either pure freshwater or a binary solution consisting of water and a freezing point depressant. Sodium chloride, ethanol, ethylene glycol and propylene glycol are four most commonly used freezing point depressants in industry. The generation and application of ice slurries is discussed in more detail by Kauffled, M. et al., Int J Refrig. 2010 Dec. 1; 33(8): 1491-1505. The ESPCM will be in a semi-liquid state due to a temperature at roughly the transition point between solid and liquid. The discharging loop 12 uses the ESPCM 22 to absorb heat from the surroundings thereby allowing the ESPCM to effect the cooling of a cargo during shipment, while the charging loop 13 absorbs heat from the ESPCM 22, usually while the system is plugged into shorepower, or otherwise not in transit, to facilitate the further use of the ESPCM 22 in the discharging loop 12. The ESPCM 22 in the reservoir 20 surrounds, and is in contact with, an ESPCM slurry generator 30, also referred to as a working fluid reservoir, and contains a working fluid 32. Facilitating heat transfer from the WF to the ESPCM, and consequent charging of the ESPCM within the ESPCM reservoir is a WF-to-ESCPM heat exchanger, also referred to as the PCM/WF heat exchanger, which maintains separation of the PCM and WF and increases the surface area over which heat exchange between the two can occur.

The ESPCM reservoir 20 forms a starting point of reference for moving through the discharging loop 12. The ESPCM reservoir 20 is in fluid communication with an ESPCM fluid pump 40, a bypass valve 50, a reversing valve 60, and an ESPCM/AIR heat exchanger 70. A fan system 80 and a defrost system 90 are located in proximity to the ESPCM/AIR heat exchanger 70. The components of the discharging loop are powered by a battery electric system 120 or other appropriate source of power. The details of the discharging loop 12 are described in more detail with reference to FIG. 9, below.

The ESPCM slurry generator 30, forms a starting point of reference for the charging loop 13 and the generator in fluid communication with a reversing valve 62, a VCC-to-working fluid heat exchanger 72, a conventional on-board VCC system 132 and a working fluid charging pump 42. The VCC-to-working fluid heat exchanger 72 and the conventional on-board VCC system 132 in combination form the TESS VCC loop 14. Power is provided to the charging loop 13 by electrical shore power 142, or other suitable electrical source, such as via truck alternator power, a small auxiliary power unit or through a wheel motor generator. Shore power 142, also recharges the battery electric system 120 while the TES system 10 is in charging mode. The details of the charging loop 13 are described in more detail with reference to FIG. 10, below.

Both the discharging loop 12 and the charging loop 13 are under the control of an electronic control unit 100. Additionally, a state of charge detection module 110 monitors the temperature and/or pressure of the ESPCM 22 in the ESPCM reservoir 20 during both the charging mode and the discharging mode.

Figure 9:
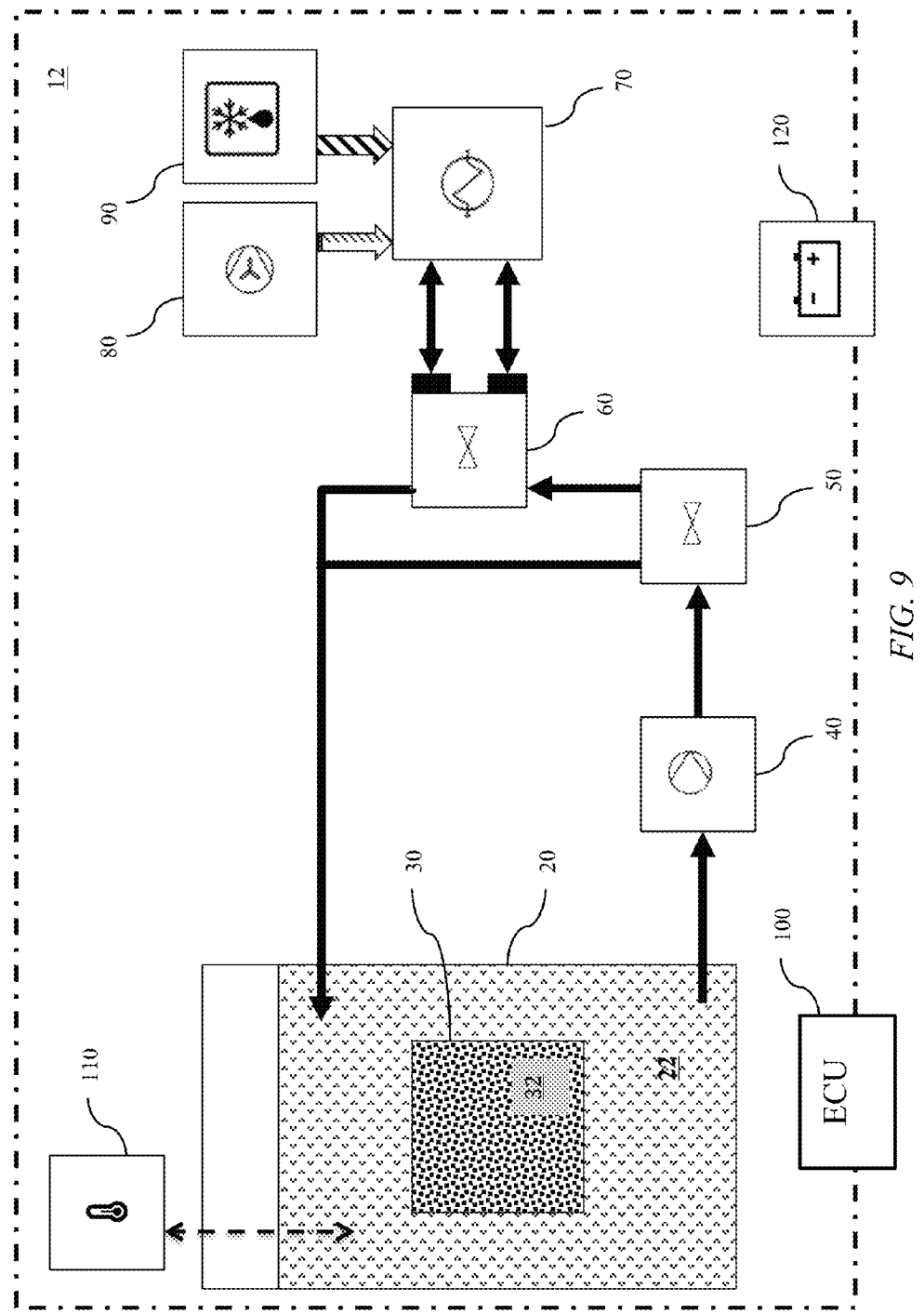
FIG. 9 is a schematic illustration of the discharging loop for cooling an enclosure of the mobile thermal energy storage system shown in FIG. 1. The discharging loop employs a phase change material to cool the space confined by an enclosure transport cargo or other temperature-sensitive payloads.

Turning to FIG. 9, there is shown the discharging loop 12 of the TES system 10 of FIG. 1. The discharging loop 12 includes the ESPCM reservoir 20 containing an ESPCM 22. The ESPCM reservoir 20 is in fluid communication with the ESPCM fluid pump 40. The ESPCM fluid pump 40 pumps the ESPCM slurry/liquid 22 through the discharging loop 12 under the control of the electronic control unit 100 and under the power of the battery electric system 120. The ESPCM fluid 22 is pumped from the ESPCM fluid pump 40 to the bypass valve 50. From the bypass valve 50 the ESPCM 22 is directed to either the reversing valve 60 or back into the ESPCM reservoir 20. The option of flowing back to the ESPCM reservoir is useful when the TESS system is in charging mode. By flowing the ESPCM 22 partially through the discharging loop during charging of the ESPCM 22, solid ice formation on the PCM/WF heat exchanger in the ESPCM reservoir 20 can be minimized. The bypass valve 50 is under the control of the electronic control unit 100.

When the TES system 10 is in cooling/discharge mode, and the discharging loop 12 is active, the ESPCM slurry 22 is pumped from the bypass valve 50 through the reversing valve 60 to the inlet of the ESPCM/AIR heat exchanger 70. The inlets and outlets of the heat exchanger are described in more detail below with reference to FIGS. 14-16. As the ESPCM 22 travels through the ESPCM/AIR heat exchanger 70, the fan system 80 effects the circulation of ambient air from the storage compartment across the large surface area of the heat exchanger. The circulating ESPCM 22 absorbs heat from the air as it passes over the heat exchanger, thereby resulting in a cooling of the air within the storage compartment. By varying the flow of the ESPCM 22 through the heat exchanger 70 and/or the speed fan system 80 using the electronic control unit 100, the TES system, in conjunction with monitoring the temperature in the compartment, is able to control the refrigeration of the space providing multi-temperature control for the trailer or other enclosure.

The ESPCM/AIR heat exchanger 70, can be referred to more generally as an ESPCM-to-target heat exchanger in those situations where the ultimate conditioned space to be cooled is something other than refrigerated cargo air. For example, the target for cooling could be air or liquids for a city bus or boat air conditioner through liquids such as water, and seawater. Additionally the target could be a chilled bulk load such as milk, juice, compressed gasses etc.

The ESPCM 22 therefore enters the ESPCM/AIR heat exchanger 70 at the heat exchanger inlet and supplies cooling effect absorbing heat energy from the air. Under some controlled ESPCM flow conditions and storage compartment temperatures, the ESPCM 22 enters the ESPCM/AIR heat exchanger 70 at a cooler temperature than it exits the exchanger's outlet. The increase in temperature of the ESPCM results in a temperature gradient across the heat exchanger. In cooling/discharge mode the ESPCM 22 is pumped from the outlet of the ESPCM/AIR heat exchanger 70 back through another path of the reversing valve 60 to and is returned to the ESPCM reservoir 20 as a liquid that is sprayed on top of the ESPCM slurry in the reservoir. The diverter valve 60, and consequently the pathways taken by the ESPCM through the valve, is under the control of the electronic control unit 100. Flow of ESPCM 22 through the discharging loop 12, and between the components in the discharging loop 12, is in the direction indicated by the arrows in FIG. 9.

The TESS slurry ESPCM cooling loop 12 is capable of controllably operating in a multi-temperature environment in either an independent cooling mode or a blended VCC/TESS cooling mode. The TES system 10 operates with high efficiency due to the slurry generator producing eutectic slurry of a phase change material. The slurry phase change base material is advantageously a food-safe product and is selected to have the proper temperature characteristics to manage multi-temperature refrigeration applications. One particularly useful application will be in the transport of perishable food. The ESPCM material also may contain additives, such as anti-freeze proteins, propylene glycol, dissolved $CO_2$ or other means to provide rapid and homogenous slurry formation, with the novel heat exchanger design avoiding the need for mechanical ice scraping work and less durable apparatus. Alternately, it can be seen that traditional VCC mechanical slurry designs used for industrial manufacture of ice slurry could be adapted for onboard slurry generation. Non-exclusive examples of food-safe PCM materials which resist icing include propylene glycol, various Dynalene products, and CaCl salt brines. For transport applications the use of ice crystal slurries in dynamic ice systems offer inherent advantages in energy efficiency, capacity, and ESPCM transportation. The ice crystals do not adhere to the WF-to-ESPCM heat exchanger (ESPCM Slurry Generator) surface or are continuously removed from the surface by mechanical means so a heat cycle defrost circuit is not required for the VCC loop. The compressor delivers its full capacity to the load at a consistently high efficiency. Furthermore, the ice slurry can be pumped as a liquid or slurry, so the location of the slurry generator is not restricted to a particular location in the tank, reducing the structural requirements and storage tank costs.

Managing frost buildup in the ESPCM-to-Air exchanger 70 is critical to performance. Ice is formed when moisturized air passes the air cooler (evaporator) or in the present invention ESPCM/Air exchanger of refrigeration machinery. This effect needs to be kept at a minimum, as it has an adverse impact on the cooling performance of the refrigeration machinery. Refrigeration machineries provide different options of ice removal via defrost cycles. The usual defrost cycle is defrost on demand (auto defrost), which minimizes defrosting activity and maximizes performance. For traditional VCC, "defrost on demand" measures the ice formation via pressure drops or cooling performance changes as determined, for instance, by the bulk air temperature or air pressure drop across the evaporator. Heating coils energize to remove the ice. This is a large electrical load, especially for a battery system to provide. Vapor compression cycle refrigeration systems do not usually "reverse" to operate in "heat pump" mode as this is too energy and time consuming compared to electrical coils. The current invention can be flow-limited to prevent ice formation and reversed to melt without resorting to electrical coils, and the large energy consumption associated with electrical coils.

Frost buildup on the ESPCM-to-Air exchanger 70 is managed by a flow management system (defrost system 90), which slows and/or reverses the ESPCM 22 flow through the ESPCM-to-Air exchanger 70 using ECU control of the ESPCM fluid pump 40 flow and/or reversing valve 60 when ice formation is detected or predicted. Ice formation on the airflow path can be detected when air path inlet and outlet pressures, or air path temperatures across the ESPCM-to-Air exchanger 70 exceed established limits for example, or by other traditional or nontraditional means. Traditional means of frost detection are assessment of pressure drops across the air path of the heat exchanger or the change in temperature from one side of the air flow path of heat exchanger to the other side for a given set of conditions. The reverse-flow defrost feature takes advantage of the large heat exchanger design and liquid ESPCM. During certain operating conditions, especially in the temperature range where frost will form, the ESPCM-to-Air exchanger 70 can be controlled by the ESPCM fluid pump 40 to have a much higher ESPCM outlet temperature than ESPCM inlet temperature resulting in an ESPCM temperature gradient from one end of the heat exchanger to the other. This is especially true, for example, when conditioned space temperatures are above freezing and there are large amounts of water in the air of the conditioned space. The ESPCM inlet end of the heat exchanger air path may be frosting up while the ESPCM outlet side is at a higher temperature, which will not support frost. By reversing the flow, the outlet becomes the inlet and the frost is removed or avoided altogether. Alternatively, the defrost system can measure pressure drops across the ESPCM-to-Air exchanger 70. Pressure drops across the ESPCM-to-Air exchanger 70 are a result of ice or frost formation on the air path of the heat exchanger 70. The management and reversal of flow, which is possible with liquid ESPCM and not easily managed with traditional VCC systems, can result in melting of ice formed on the surface of the outlet sections of the ESPCM-to-Air exchanger 70, while still facilitating cooling at the inlet portion of the exchanger. During conditions of minimal or no frost formation, ESPCM fluid pump 40 can be commanded by the electronic control unit 100 to achieve flow rates, which result in optimized cooling. Here the temperature gradient across the ESPCM-to-Air exchanger 70 is minimized. For conventional VCC systems, electric heat is often required to remove frost with considerable energy expended in the provision of the heat. These conventional defrost heaters can be provided in the present invention to expedite the defrost process if needed. However, energy demand can be significantly reduced without those heaters, allowing for a reduction in the size of the battery energy storage system or other defrost energy storage medium. In an advantageous embodiment, the defrost system 90 is under the control of the electronic control unit 100 and under the power of the battery electric system 120.

Figure 14:
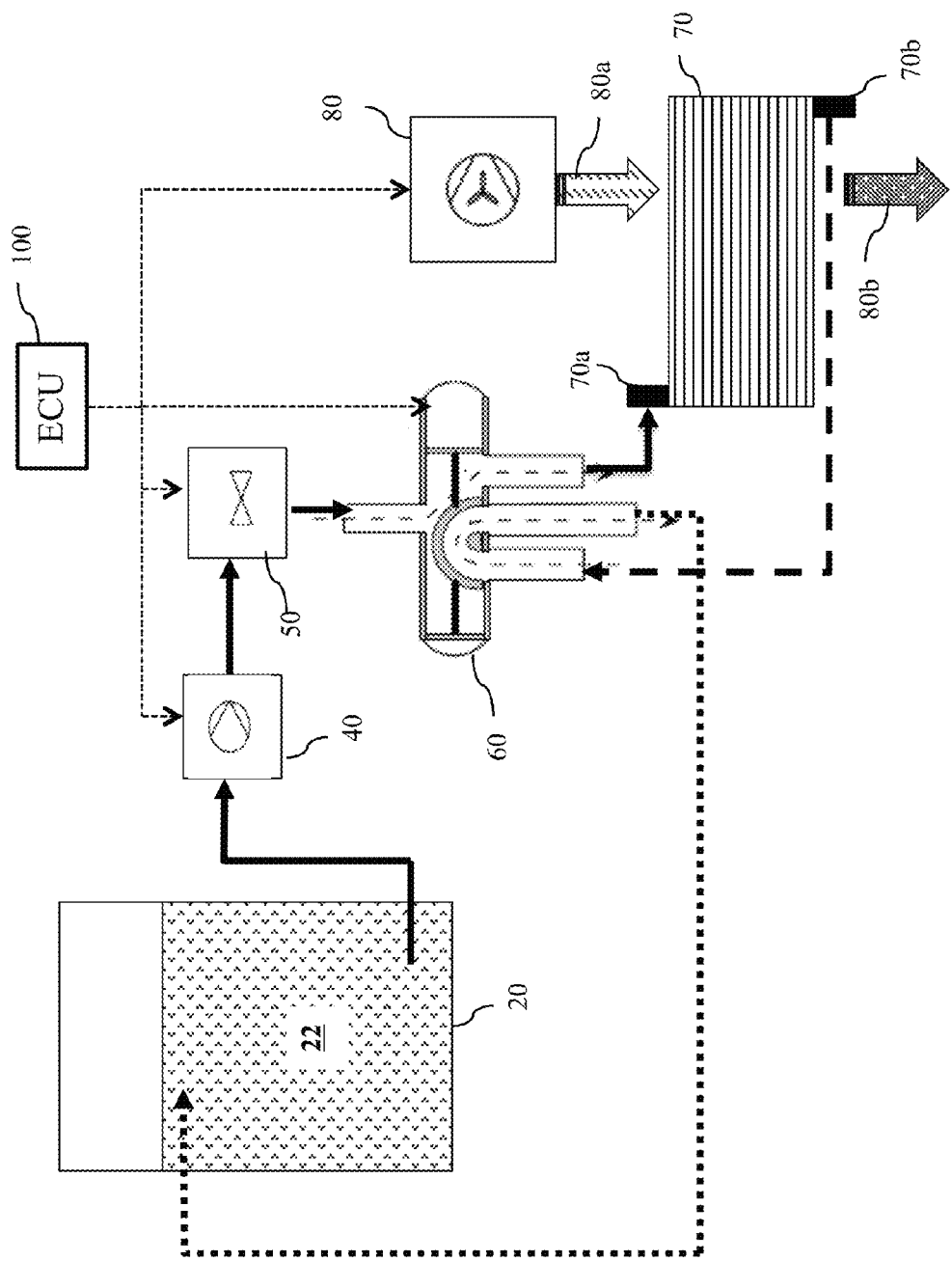
FIG. 14 is a schematic illustration of the subsystem to manage defrost via flow reversal and flow control.
Figure 15:
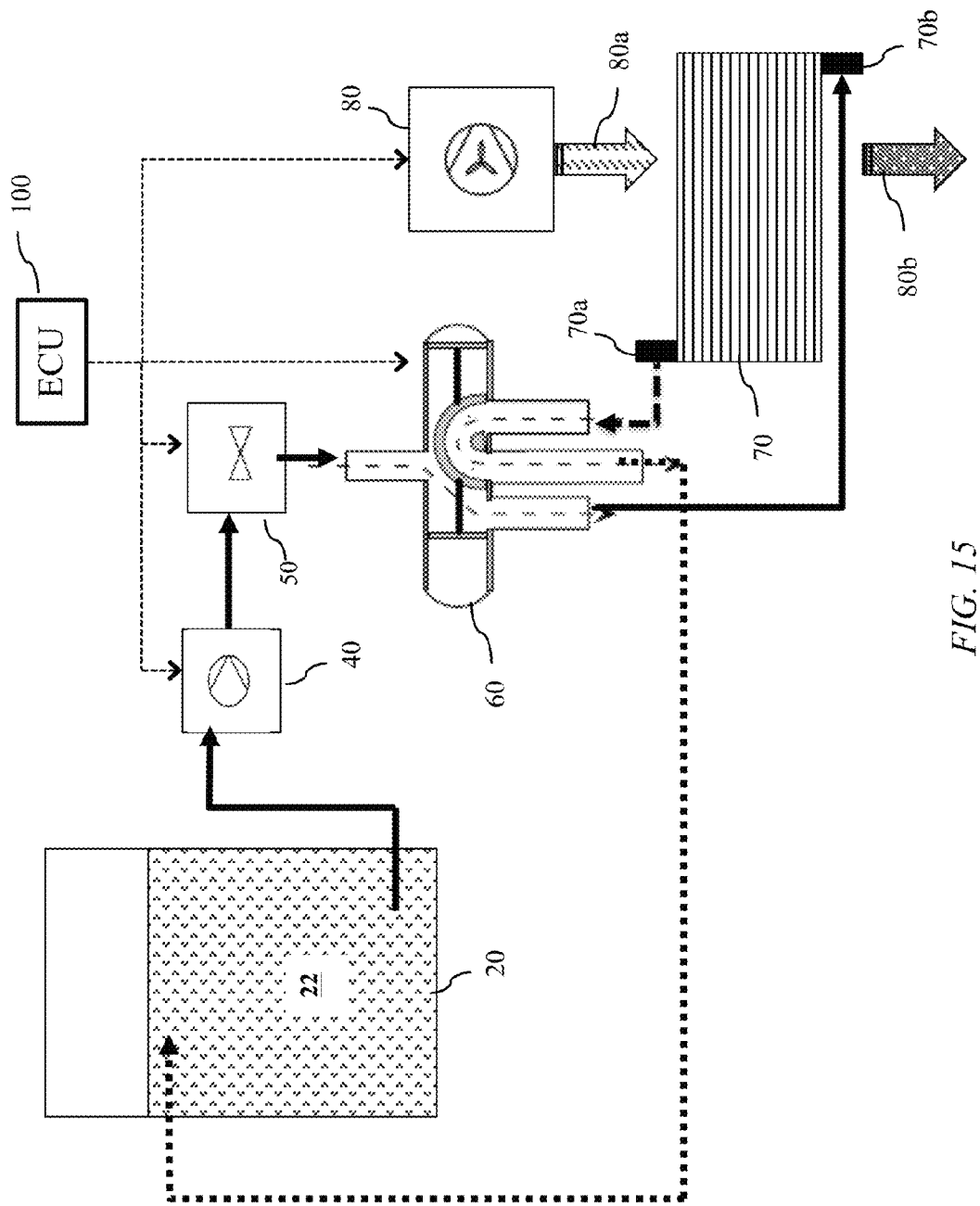
FIG. 15 is a schematic illustration of the subsystem to manage defrost via flow reversal and flow control as shown in FIG. 14.
Figure 16:
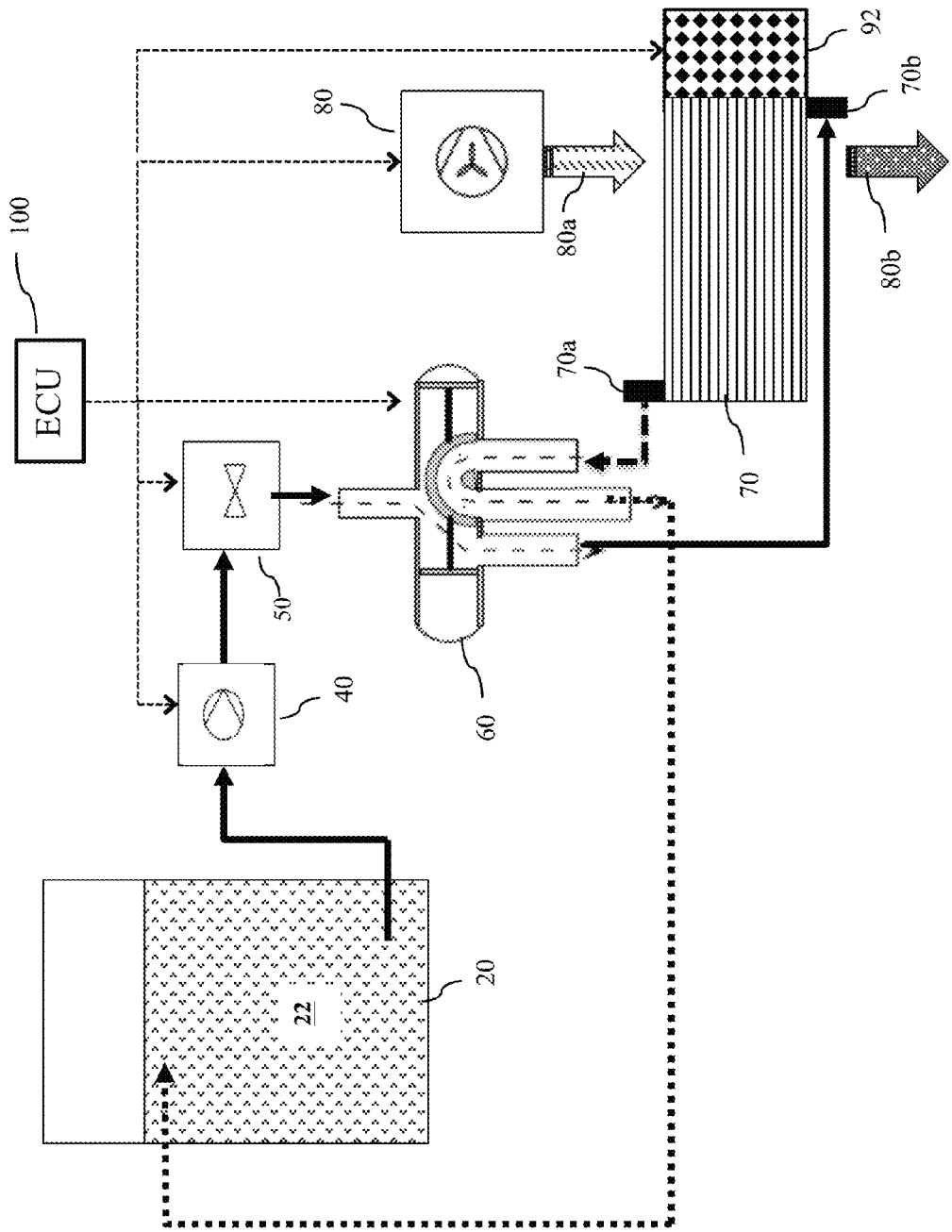
FIG. 16 is a schematic illustration of the subsystem to manage defrost via flow reversal and flow control as shown in FIG. 15.
Figure 17:
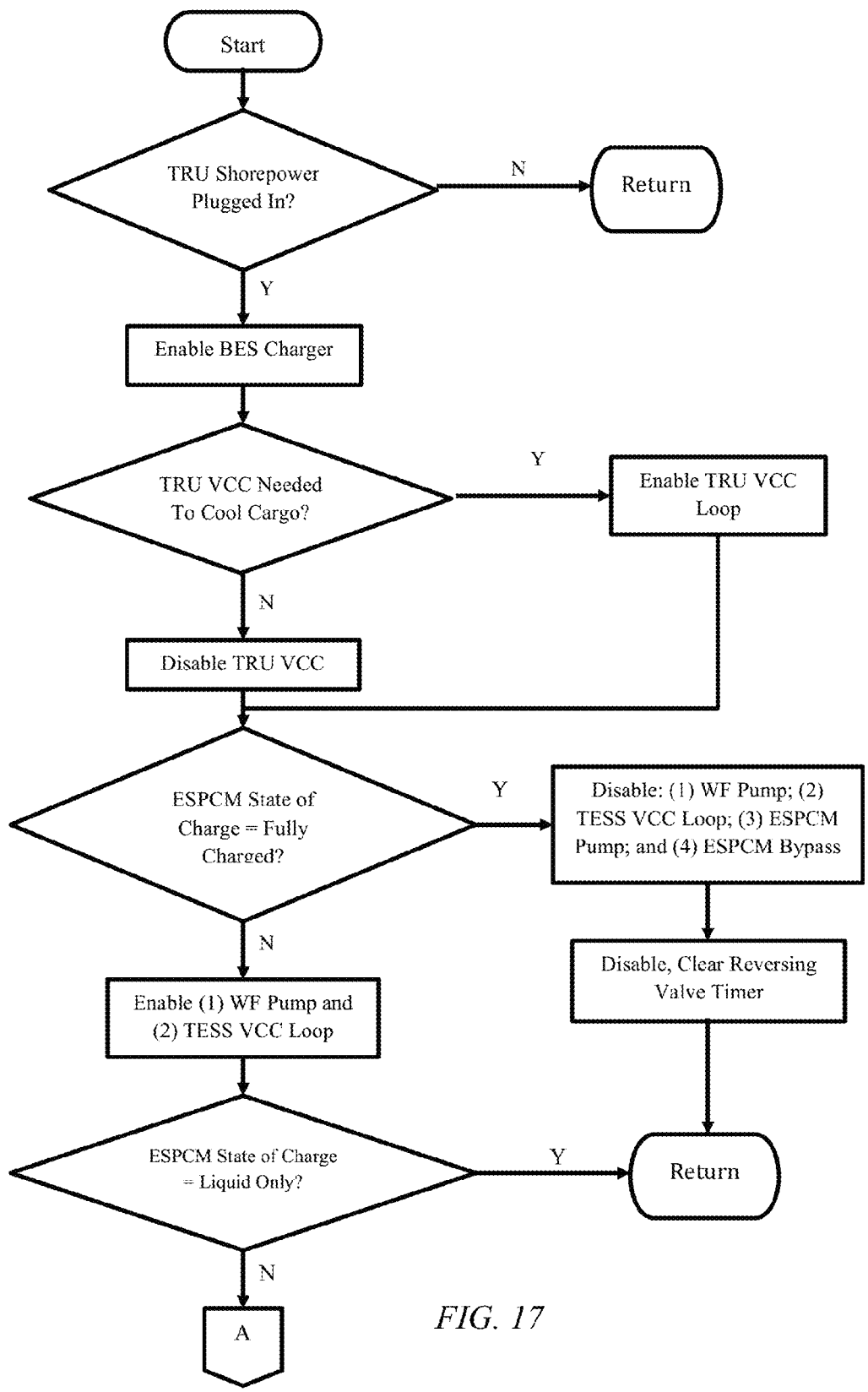
FIG. 17 is a flowchart of a simplified control algorithm for on-board TESS Eutectic Slurry Phase Change Material (ES-PCM) charging.
Figure 18:
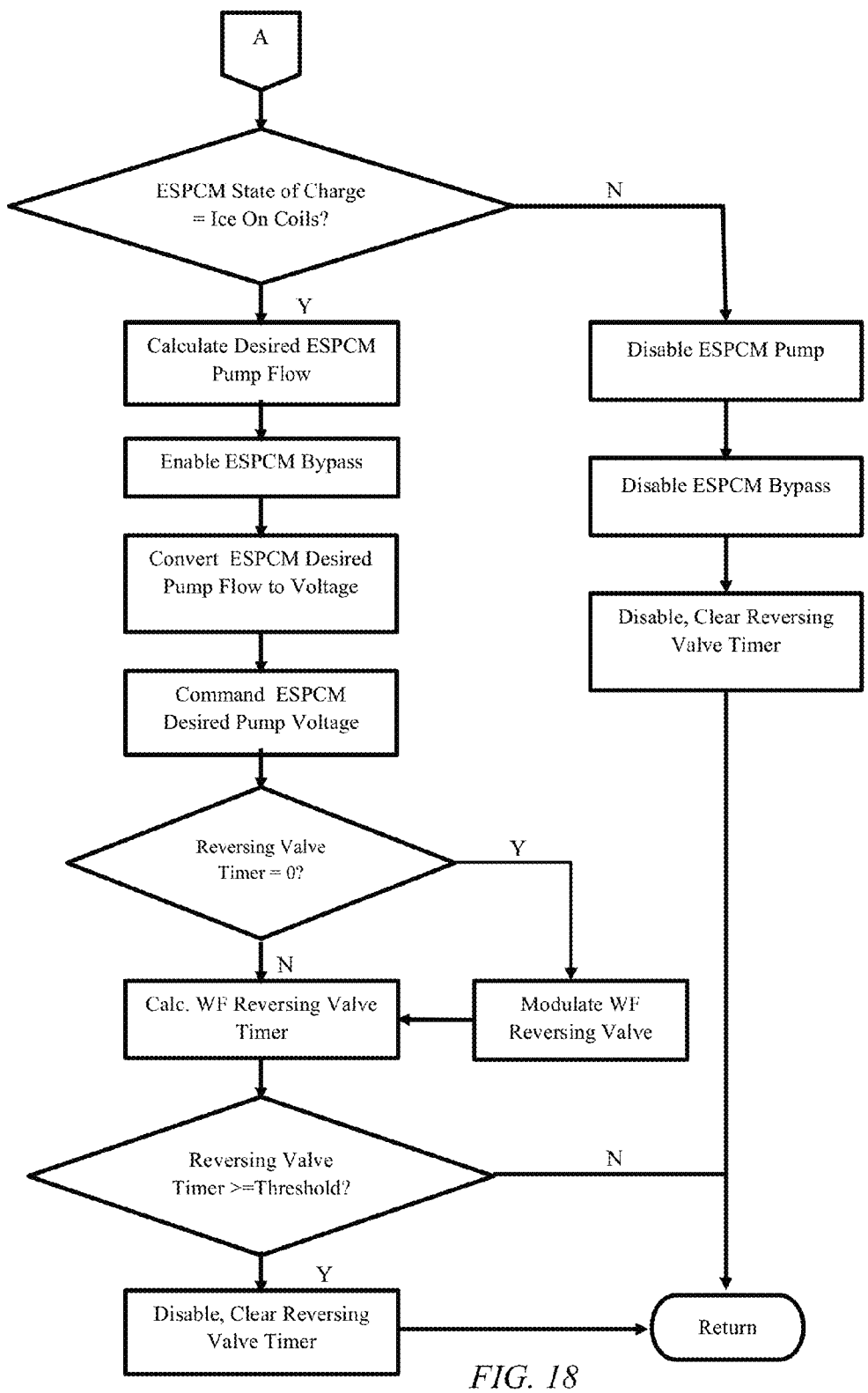
FIG. 18 is a flowchart of a simplified control algorithm for the prevention of solid ice formation during on-board TESS ESPCM charging.
Figure 19:
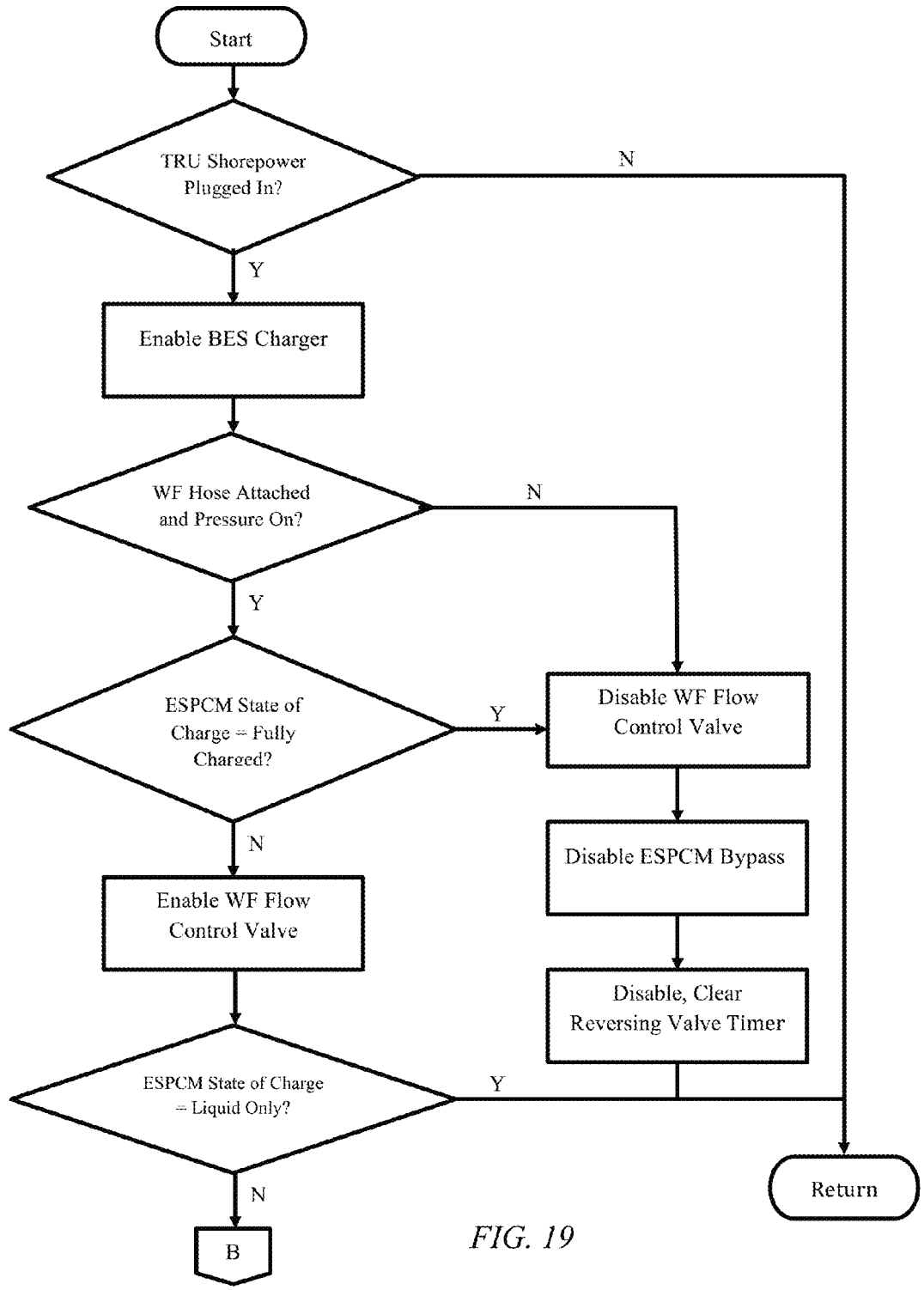
FIG. 19 is a flowchart of a simplified control algorithm for off-board TESS ESPCM charging.
Figure 20:
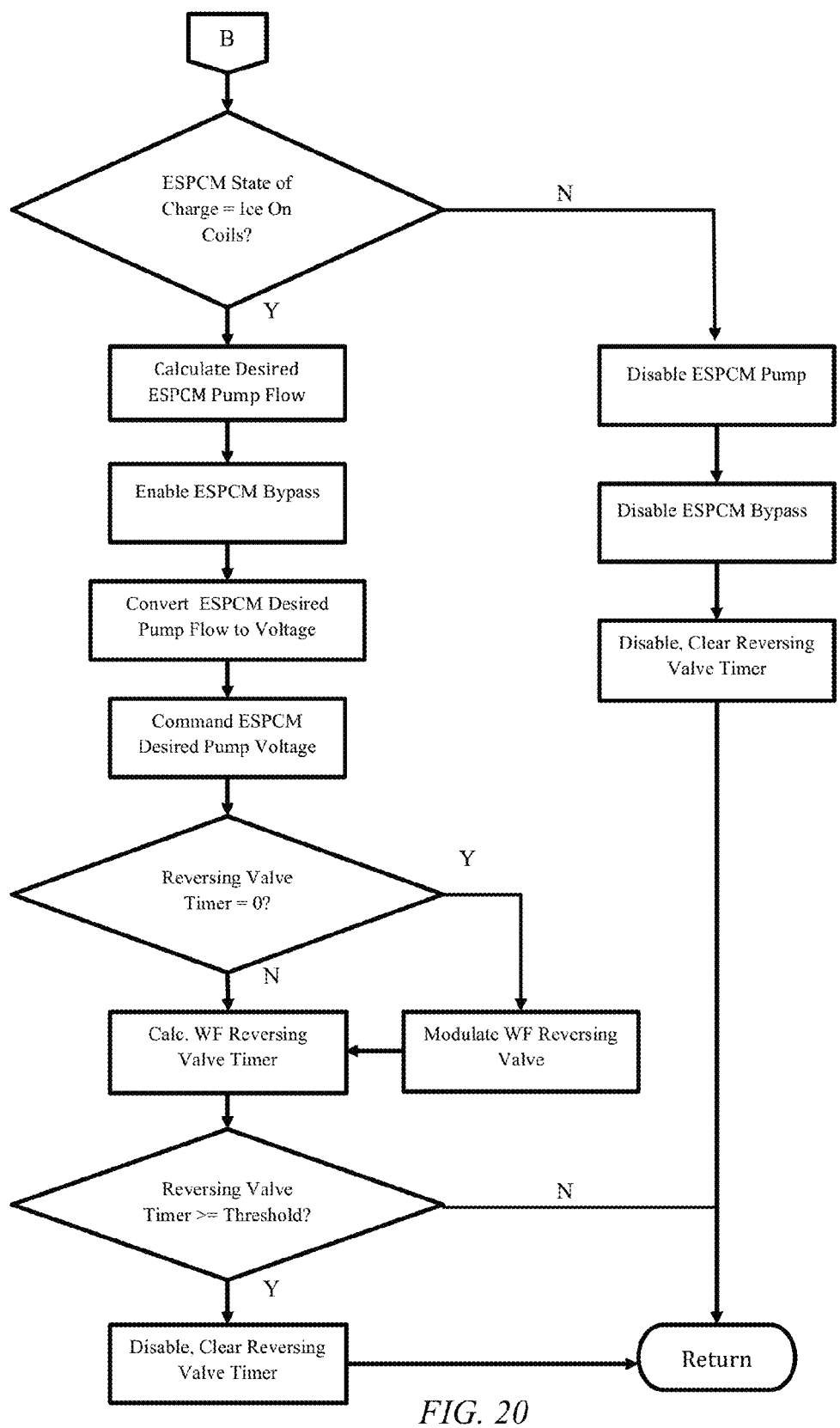
FIG. 20 is a flowchart of a simplified control algorithm for the prevention of solid ice formation during off-board TESS ESPCM charging.
Figure 21:
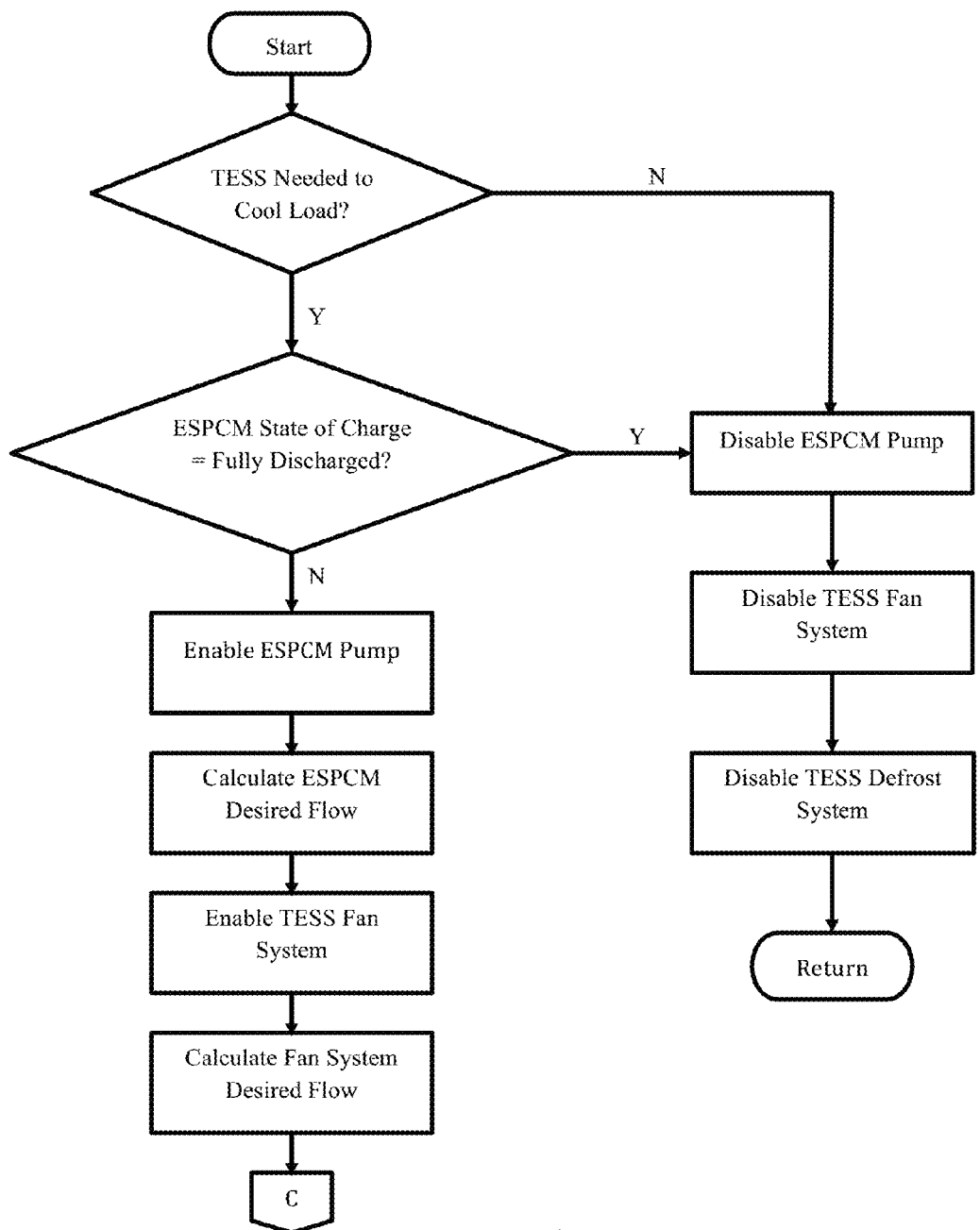
FIG. 21 is a flowchart of a simplified control algorithm for TESS cooling.
Figure 22:
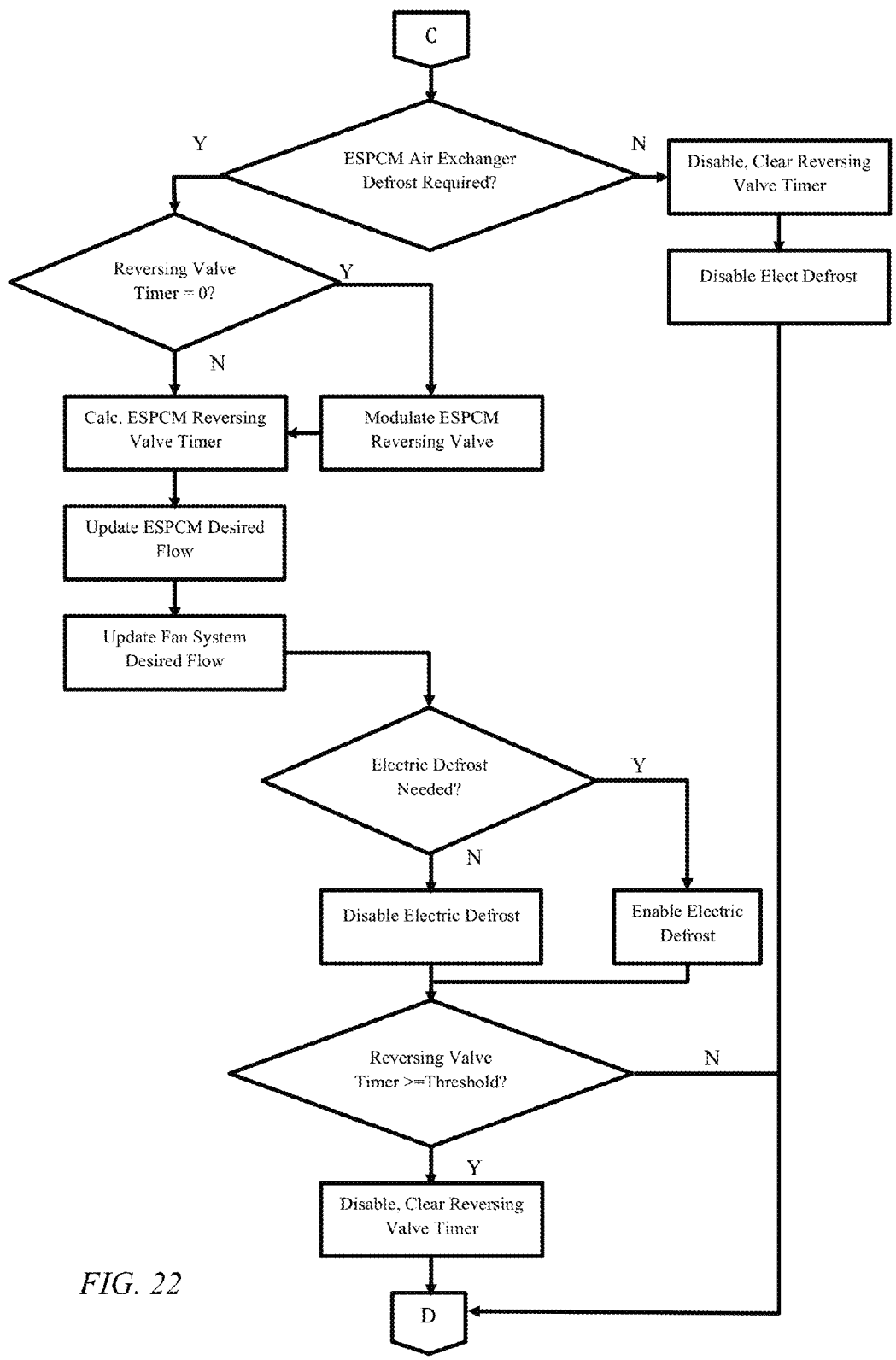
FIG. 22 is a flowchart of a simplified control algorithm for TESS frost prevention during on-board TESS cooling.
Figure 23:
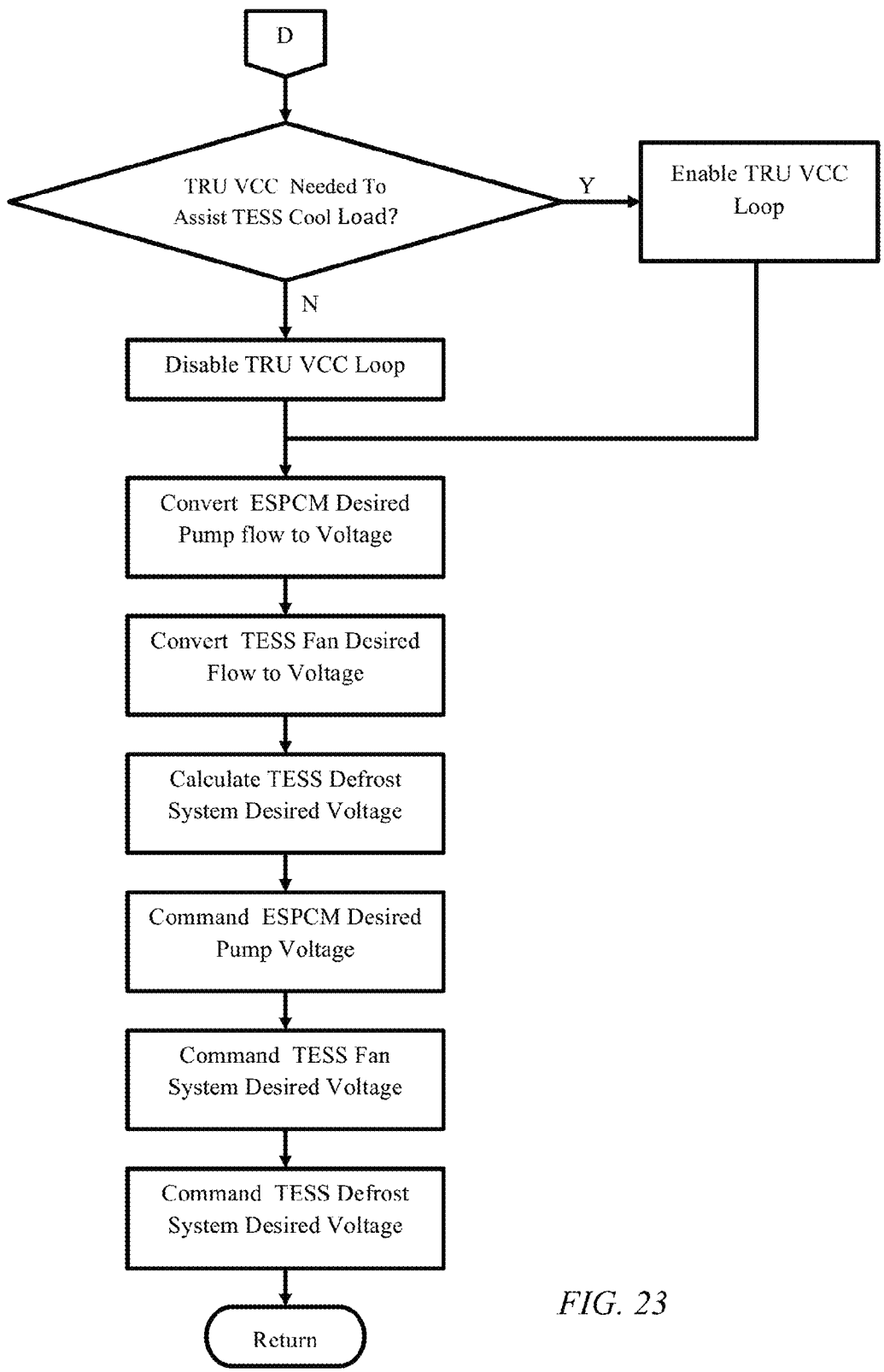
FIG. 23 is a flowchart of a simplified control algorithm for delivering commands to fans, ESPCM pumps, and defrost heaters during on-board TESS cooling.
Figure 24:
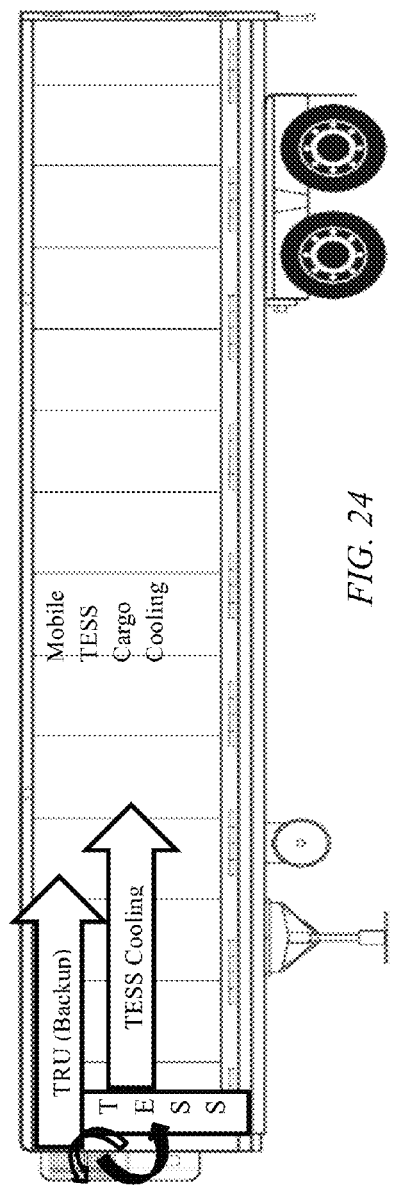
FIG. 24 illustrates a TES system installed at the front of a refrigerated trailer.
Figure 25:
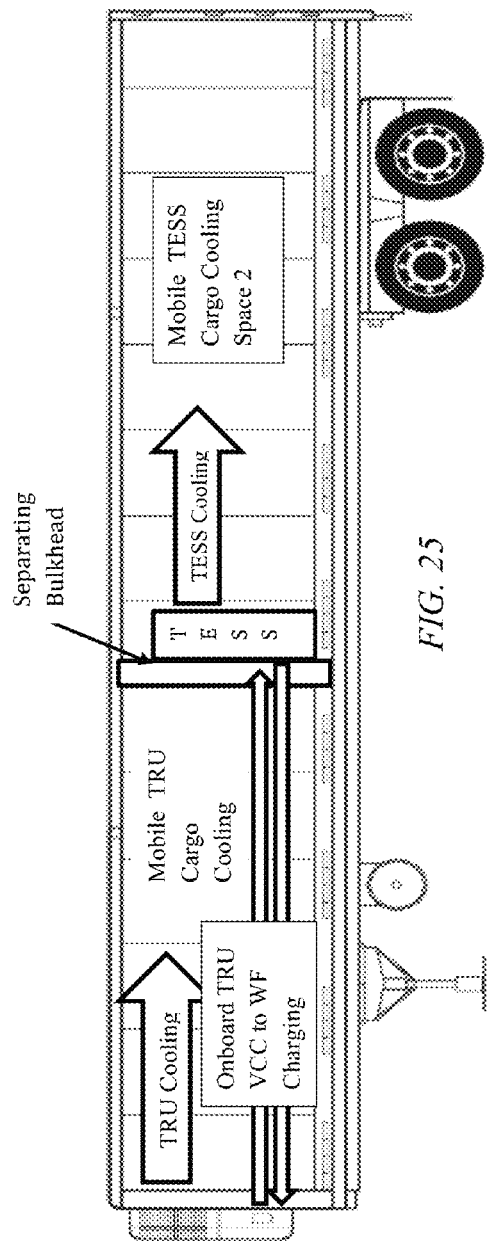
FIG. 25 illustrates a TES system installed at the center of a multi-temperature application, where it is cooling the rear portion of a trailer.
Figure 26:
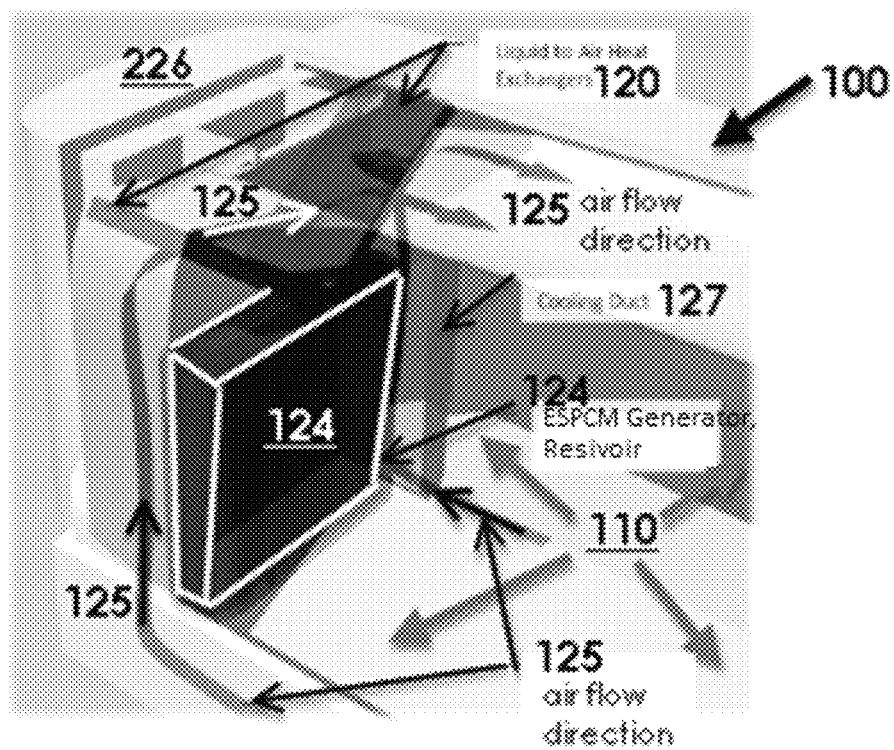
FIG. 26 illustrates a TES system installed at the front of a refrigerated trailer.
Figure 27:
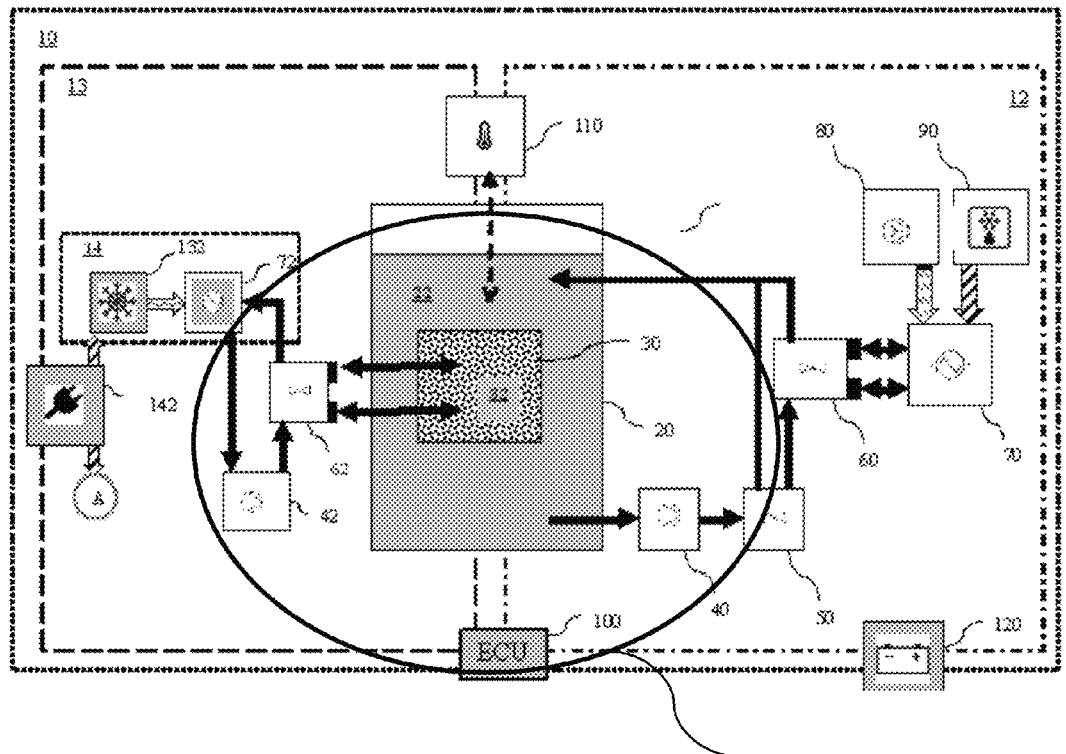
FIG. 27 is a schematic illustration of a slurry generator system.
Figure 28:
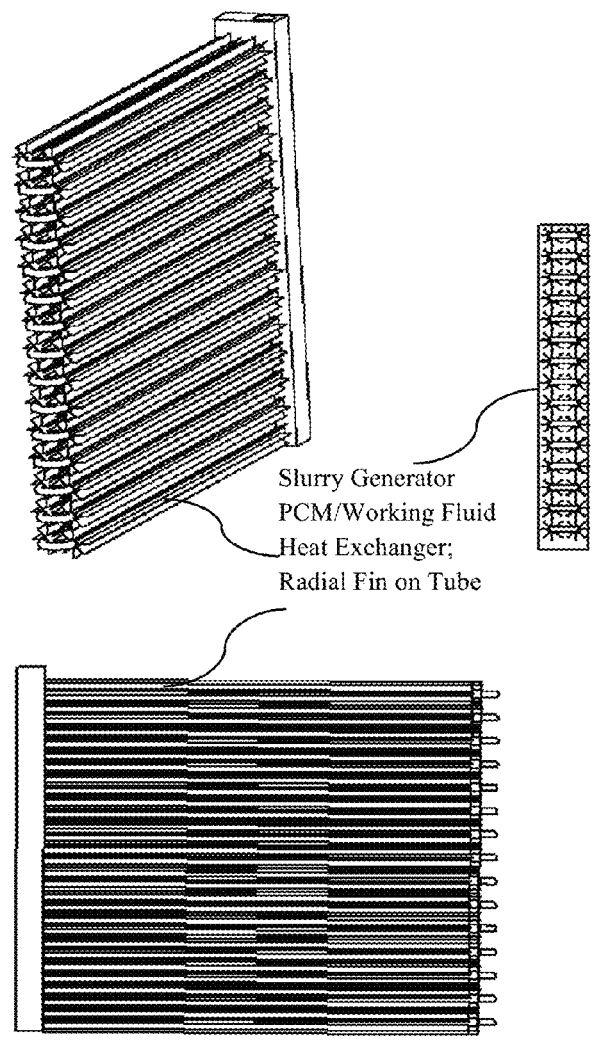
FIG. 28 is a schematic illustration of a PCM/working fluid heat exchanger.
Figure 29:
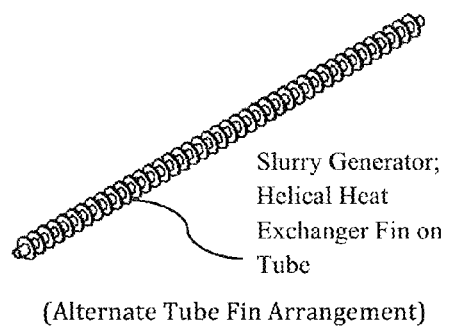
FIG. 29 is a schematic illustration of a helical heat exchanger fin on the tube of a heat exchanger.

FIGS. 14 through 16 illustrate the application of reversing valve 60 to reverse the flow of ESPCM 22 through the ESPCM-to-Air exchanger 70. FIG. 14 illustrates the standard discharge cycle flow through the reversing valve 60 and the ESPCM-to-Air exchanger 70. ESPCM 22 will travel from the bypass valve 50 to reversing valve 60. Once in reversing valve 60, the ESPCM 22 will be routed to inlet 70a of the ESPCM-to-Air exchanger 70. The ESPCM 22 will wind through the ESPCM-to-Air exchanger 70 and exit the ESPCM-to-Air exchanger 70 via outlet 70b. Upon exiting the ESPCM-to-Air exchanger 70, the ESPCM 22 flows back through the reversing valve 60 on its way back to the ESPCM reservoir 20. Flow of the ESPCM 22 is in the direction indicated by the arrows. Additionally, the fan system 80 blows the warmer, ambient air 80a from the compartment across the ESPCM-to-Air exchanger 70, which exits the exchanger as cooler air 80b following the exchange of heat between the ambient air 80a and the ESPCM 22.

Note that the terms inlet 70a and outlet 70b are relative to the normal discharge path through ESPCM-to-Air exchanger 70. During reverse flow defrost the ESPCM 22 will enter through outlet 70b and exit through inlet 70a.

The defrost system 90 monitors the frost buildup on the ESPCM-to-Air exchanger 70 and manages the status in the electronic control unit 100. The reversing valve 60, along with the ESPCM fluid pump 40, the bypass valve 50, and the fan system 80, are under the control of the electronic control unit 100. After the detection of frost build up, electronic control unit 100 signals the reversing valve 60, resulting in a re-routing or diverting of the ESPCM 22 will through the reversing valve 60, as illustrated in FIGS. 15 and 16.

FIG. 15 illustrates the defrost discharge cycle flow through the reversing valve 60 and the ESPCM-to-Air exchanger 70. ESPCM 22 will travel from the bypass valve 50 to reversing valve 60. Once in reversing valve 60, the ESPCM 22 will be diverted to outlet 70b of the ESPCM-to-Air exchanger 70. The ESPCM 22 will wind through the ESPCM-to-Air exchanger 70 and exit the ESPCM-to-Air exchanger 70 via inlet 70a. Upon exiting the ESPCM-to-Air exchanger 70, the ESPCM 22 flows back through the reversing valve 60 on its way back to the ESPCM reservoir 20. Flow of the ESPCM 22 is in the direction indicated by the arrows. Note most importantly that the path taken by the ESPCM 22 through the ESPCM-to-Air exchanger 70 has been reversed from FIG. 14 to FIG. 15 as indicated by the arrows entering and exiting the exchanger. FIG. 16 adds the element of a supplemental electric heat defrost system 92 to the design shown in FIG. 15.

Figure 12:
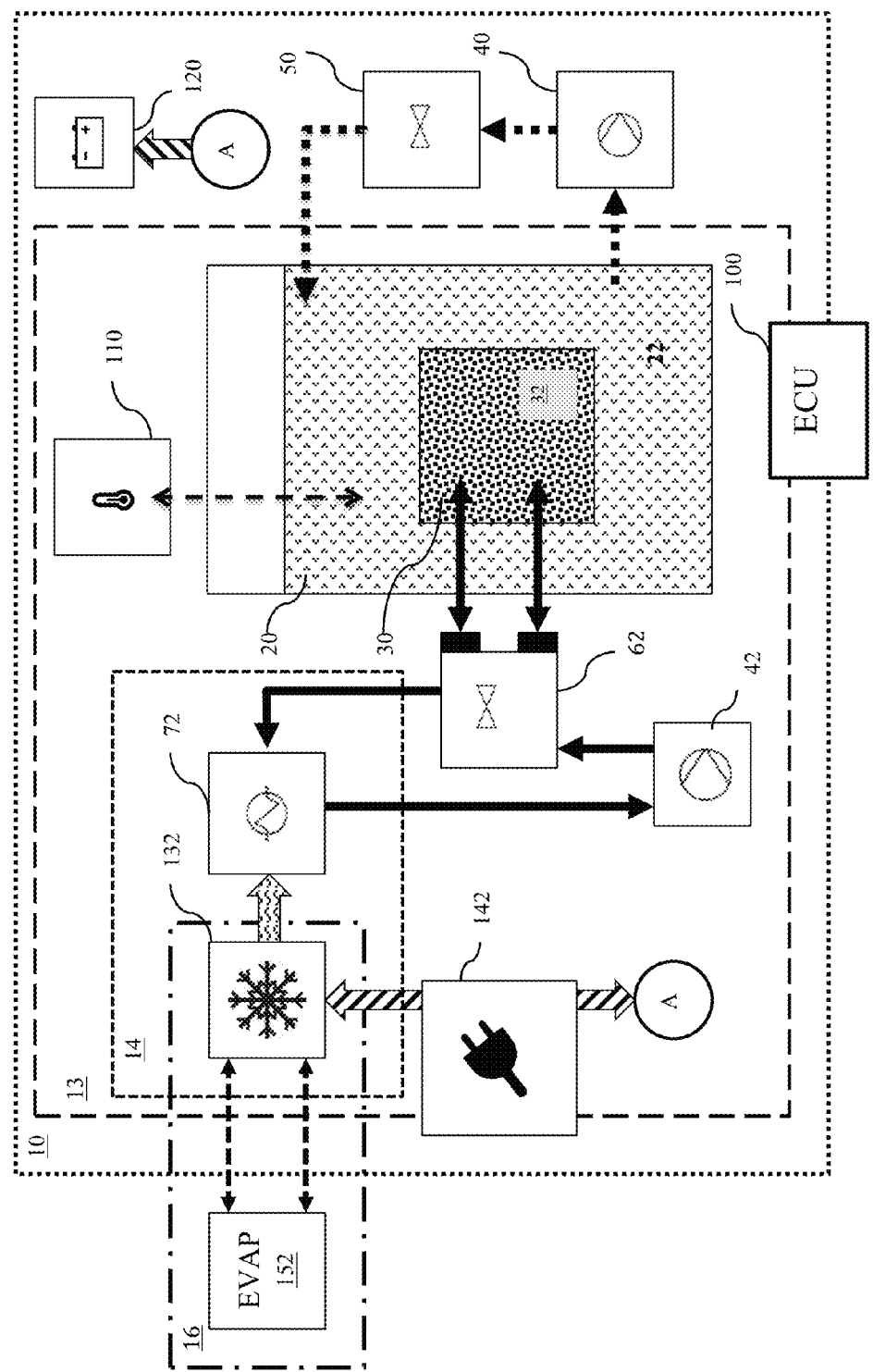
FIG. 12 is a schematic illustration of an alternative embodiment of a mobile thermal energy storage system according to another aspect of the invention. The thermal energy storage system of FIG. 12 employs an evaporator external to the TES system to allow parallel or back-up cooling of cargo. The schematic of FIG. 12 illustrates charging of the mobile TESS system with VCC cooling provided to the cargo in parallel.

FIG. 12 illustrates the charging loop 13 of the TES system 10 of FIG. 1. The charging loop 13 includes ESPCM slurry generator 30 containing a working fluid 32. The ESPCM slurry generator 30 is in fluid communication with reversing valve 62. Reversing valve 62, is, in turn, in fluid communication with a VCC-to-working fluid heat exchanger 72.

The reversing valve 62 on the charging side performs a similar function to the reversing valve on the discharging side; namely the prevention of frost build-up, but in this case the frost buildup to prevent is at the VCC-to-working fluid heat exchanger 72. Solid ice may form at the inlet end of the heat exchanger and is not desirable. By reversing the flow through the VCC-to-working fluid heat exchanger 72, it is possible to limit any icing of the heat exchanger and therefore maximize the state of charge. As ice builds up on the VCC-to-working fluid heat exchanger 72, the charging efficiency decreases due to the insulation of the ice buildup slowing and ultimately limiting the level of charging which is possible.

A conventional on-board VCC system 132 is located in proximity to the VCC-to-working fluid heat exchanger 72, enabling the VCC system to remove heat from the working fluid as it passes through the heat exchanger 72. Here, the VCC represents a traditional vapor compression cycle refrigeration system utilizing a compressor, condenser, throttling valve and evaporator. VCC refrigeration offers two advantageous features. First, the large thermal energy required to change a liquid to a vapor across the throttling valve facilitates the removal of large amounts of heat from, in this case, the TESS working fluid. Second, the isothermal nature of the vaporization allows extraction of heat without raising the temperature of the VCC refrigerant to the temperature of whatever is being cooled. This is a benefit because the closer the refrigerant temperature approaches that of its surroundings, the lower the rate of heat transfer. The isothermal process allows the fastest rate of heat transfer. For the present invention the VCC to working fluid heat exchanger is the evaporator of the VCC System. The TES system of FIG. 12 employs on-board thermal charging by locating the TESS-VCC loop 13 within the TESS unit. A working fluid charging pump 42 is in fluid communication with a VCC-to-working fluid heat exchanger 72. The pump drives the working fluid through the system, and moves the working fluid directly from the pump back to the reversing valve 62. The working fluid is routed from the reversing valve back to the ESPCM slurry generator 30, having completed the complete cycle thorough the charging loop 13 and arriving at the slurry generator colder than when it left. Electrical power for the charging loop 13 is provided by the shore power 142. In particular, the shore power supplies the significant amounts of power consumed by the on-board VCC system 132. Shore power 142, also recharges the battery electric system 120 while the TES system 10 is in charging mode.

The working fluid can also be a PCM, but the system does not require this set-up. The WF selected is generally one that freezes at a temperature lower than the employed ESPCM. Ideally, the WF will have a freezing point about 15° C. or more below the PCM. This results in a WF that can flow more easily through the system and at a higher rate, in turn maximizing heat transfer to the PCM and minimizing the charging time and pump energy. The PCM needs to have a high cooling density (KJ/Kg, KJ/cc) to be practical as a storage medium and will generally be mostly frozen (high % ice) when fully charged. The WF does not have to have the same energy capacity (cooling capacity/volume). Instead, it is more important to have heat transfer optimized, which can be accomplished to a large degree through managing flow rates of the WF.

The discharging loop 12 and the charging loop 13 employ a state of charge detection system 110. The state of charge of the ESPCM 22 can be measured by monitoring pressure changes in the system, viscosity sensing or other means to insure that the slurry is fully charged for maximum cooling time, while not overcharged and frozen solid. The pressure-based state of charge takes advantage of the physical properties of the PCM material when it changes phase. The PCM phase change is accompanied by a defined increase in volume, viscosity, and other parameters. By detecting and measuring these parameters, such as the change in volume or pressure, the state of charge can be determined. Moreover, the thermal storage medium can be charged with the TRU having an on-board system, as in TESS-VCC loop 14, over the road when its state of charge detection indicates it is needed.

FIG. 11 illustrates an alternative embodiment of the TES system illustrated in FIG. 1. In particular, the TES system 10 of FIG. 11 is characterized by off-board charging of the working fluid by employing an external TESS-VCC loop 15. This is accomplished by locating the VCC-to-working fluid heat exchanger 74 and the VCC system 134 external to the TES system 10 in much the same way that shore power would be available when the system is not in transit. Such an arrangement has a number of benefits. First, it greatly simplifies the TES system and reduces the associated cost by not having a VCC unit onboard. It also reduces the weight of the TES system. Locating the VCC-to-working fluid heat exchanger off-board also allows the use of higher efficiency, or coefficient of performance (COP) refrigeration systems, with further possible advantages of electrical demand management through an off-board thermal energy storage system employing the working fluid of the present invention as the thermal energy storage medium in the land based storage tanks. On the other hand, by having only off-board charging, there is no back-up system for the TESS should the system's charge run out.

The TES system can take advantage of the high COPR off-board charging and slurry pumping while maintaining a closed onboard system advantages. For off-board charging of the PCM on-board (closed system—e.g. CaCl with freezing point of −25° F.) can also incorporate a eutectic slurry working fluid (e.g. another PCM with a lower freezing point than the onboard PCM −35° F. which is in slurry form). This facilitates high efficiency thermal storage off-board and heat transfer to on-board ESTESS while maintaining onboard "closed system" features.

For example, the working fluid (WF) and PCM can be in slurry form. Off-board slurry generators form open systems in which are not closed systems which are fixed and sealed like the present invention PCM loop. The closed PCM system provides the advantage of a contained and defined slurry mixture percentage and quantity, which facilitates state of charge measurement and effective temperature control on discharge. To charge the PCM, you would connect the off-board charging system to the trailer's on-board TESS reservoir, and pump the WF through the WF/PCM heat exchanger or slurry generation system, and then disconnect the off-board system components when the desired closed system PCM state of charge was achieved. The off-board WF could be open system slurry or highly chilled liquid.

Figure 10:
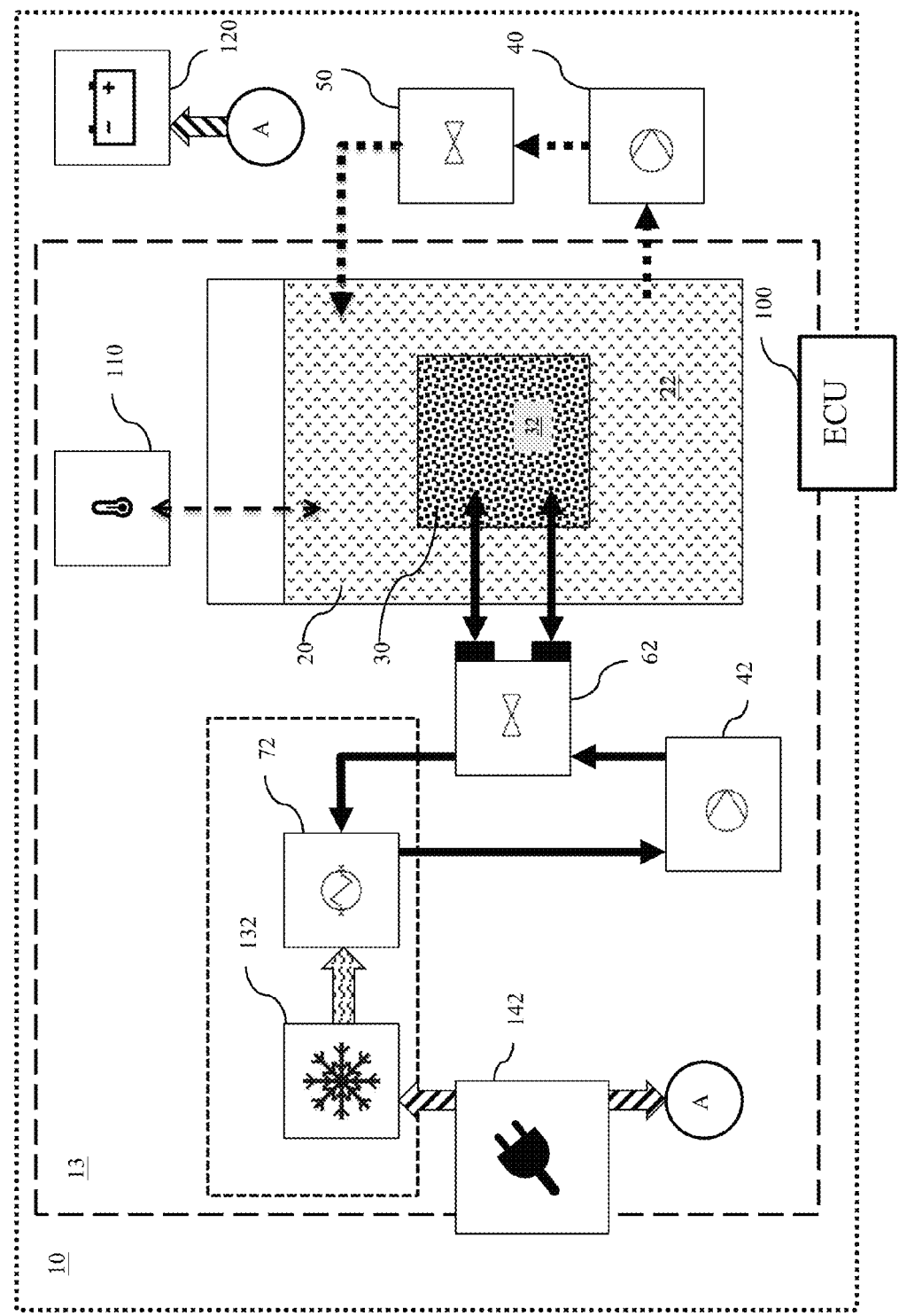
FIG. 10 is a schematic illustration of the charging loop of the mobile thermal energy storage system shown in FIG. 1. The charging loop recharges the phase change material of the discharging loop.
Figure 11:
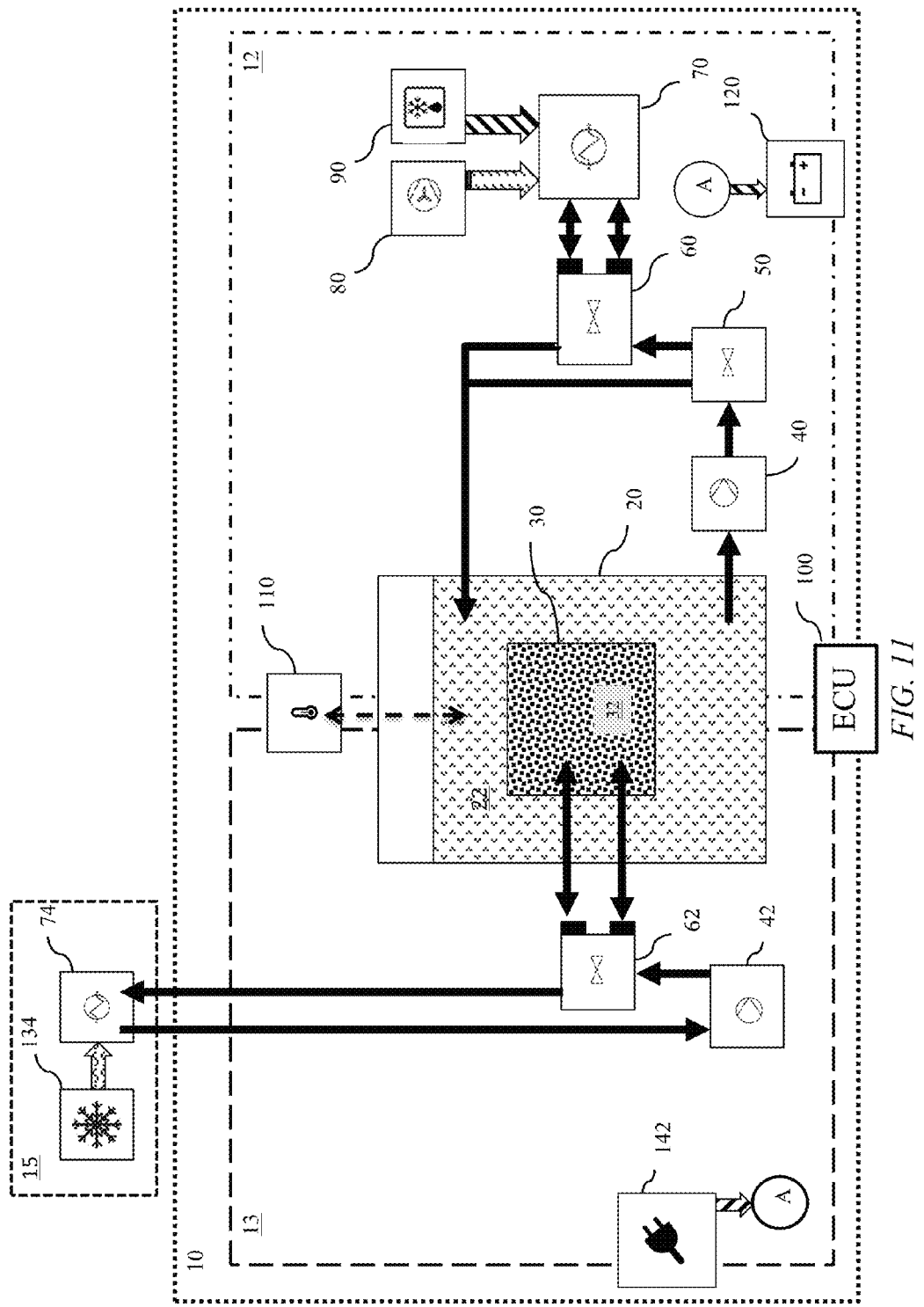
FIG. 11 is a schematic illustration of an alternative embodiment of a mobile thermal energy storage system according to another aspect of the invention. The thermal energy storage system of FIG. 11 employs off-board charging of the working fluid in the charging loop using an external TESS-VCC loop as opposed to the on-board charging of the working fluid using an internal TESS-VCC loop as illustrated in FIG. 1.
Figure 13:
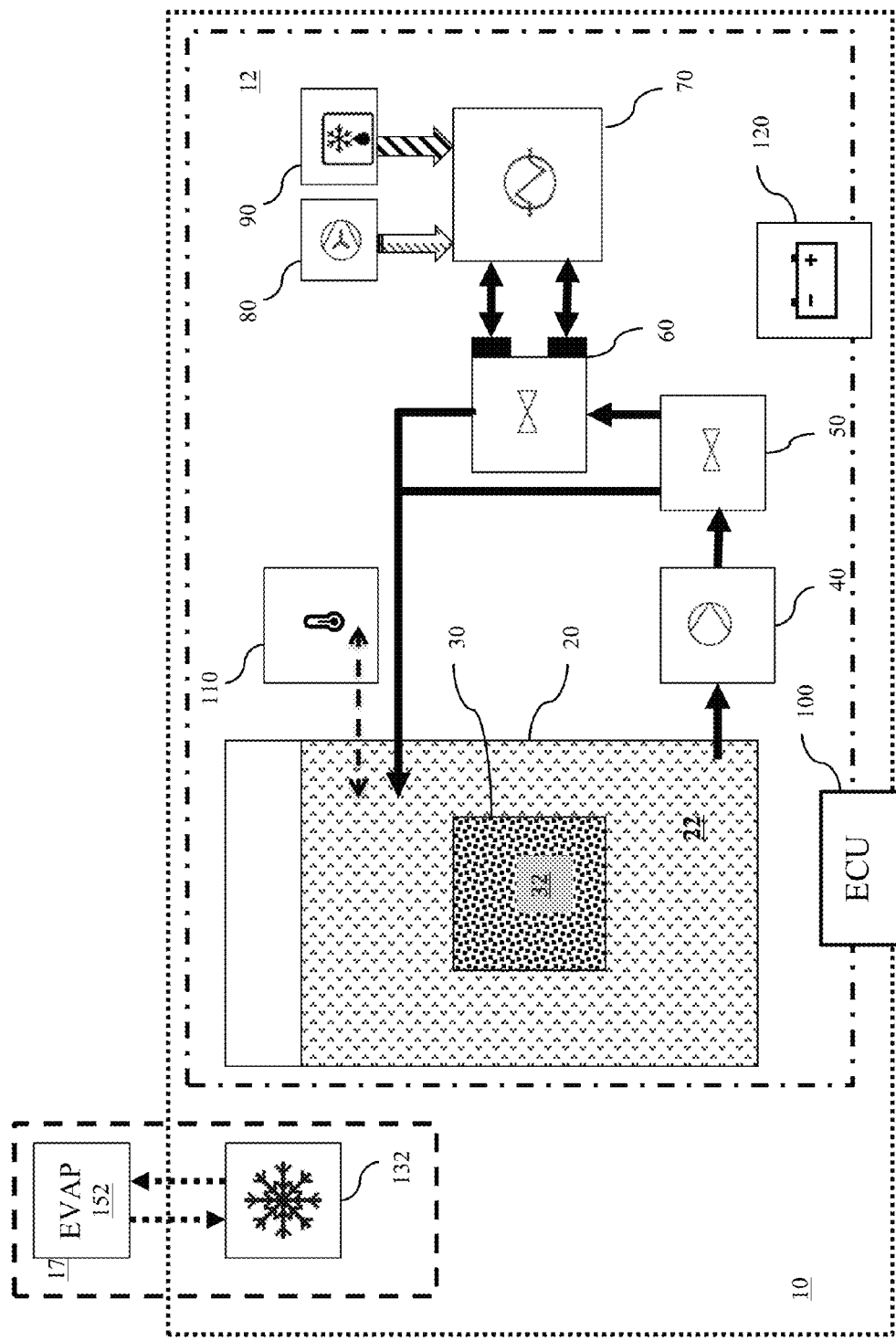
FIG. 13 is a schematic illustration of an alternative embodiment of a mobile thermal energy storage system according to another aspect of the invention.

FIG. 12 presents the charging mode of a TES system as shown in FIG. 10, but adds a conventional on-board TRU VCC evaporator-to-air exchanger 152. The addition of the evaporator allows the system to function as a standard VCC system, thereby offering a complete back-up cooling system 16 for the TES System 10. Additionally, having the standard VCC system with evaporator would allow for the charging of the ESPCM at the same time as cooling of the cargo. FIG. 13 illustrates the cooling loop side of FIG. 12, with the addition of the supplemental VCC system 17.

FIG. 3 illustrates a mobile hybrid thermal energy systems where a mechanical constant output speed drive is used to supply high voltage DC to the TESS system via a DC/DC converter. FIG. 6 shows high voltage AC/DC power used to power the hybrid TESS system. Depending upon the high voltage type, an inverter would invert AC to DC, (e.g. 460 3-phase AC to 24V dc) or a converter would convert high voltage DC to lower voltage DC. (e.g. 300 V DC to 24 V DC). Wheel motors for hybrids produce 200-600 V DC and Gen-sets produce 460 3 phase. Typical TRU units run on 460 3-phase so the gen-set would be the simplest adaptation as it can directly power a conventional electric TRU. The hybrid wheel motor could be implemented with a DC motor on the compressor, such as one adapted from automotive applications.

The mobile hybrid thermal energy systems has been designed to use the over the road high power system at reduced voltage to directly power TESS components at times in most operating situations while moving. However, solar power is also available to power components at reduced voltage. For example, the system design would allow the use of solar power to recharge the BES and power the TESS Fans and pumps directly. In more extreme embodiments, it is possible that a less powerful VCC or other cooling system (thermal electric) could be added to directly provide cooling using power from the solar panels, thus to providing solar-powered cooling to thermally charge the TESS and/or cool the refrigerated space.

Hybrid TESS System:

DEFINITIONS

A phase-change material (PCM) is a substance with a high heat of fusion. Upon melting or solidifying at a fixed temperature, the PCM isothermally stores or releases large amounts of energy. Heat is absorbed or released when the PCM changes from solid to liquid and vice versa. This allows PCMs to function as latent heat storage units. Examples of PCMs relevant to the present TES system include propylene glycol, and salt brines, such as CaCl, paraffins, alphatics and mineral oils, diphenal and diphenyl oxide blends, perphenyls silicones and the various Dynalenes (particularly Dynalene MV, Dynalene HT and Dynalene 600). CaCl brines are a particularly advantageous PCM. A eutectic phase-change material is a material that has the property whereby the isothermal phase change from a solid to a liquid medium can absorb and dissipate large amounts of thermal energy while remaining at a constant temperature . . . .

By "slurry" it is meant a semi-liquid mixture of the phase change material. Slurry ice provides, a phase-changing refrigerant made up of millions of ice "micro-crystals" formed and suspended within a solution of water and a freezing point depressant. Some compounds used in the field as freezing point depressants are salt, ethylene glycol, propylene glycol, various alcohols and sugar.

The term "charge", as used herein, refers not only to the more traditional notion of energizing a battery or other electrical storage device by passing a current through it in the direction opposite to discharge, but also to "charging" the thermal energy storage device through the removal of heat from the PCM, which then allows the PCM to remove heat from the surroundings in "discharge" mode by absorbing heat such as from the compartment of a trailer.

The term "shorepower" refers to the provision of external electrical power to a vehicle at rest while its main and auxiliary engines are not providing power to the vehicle. More specifically, shorepower is grid-based electrical power provided to the refrigeration system while the trailer or other refrigerated container is parked, such as at a dock or staging area.

The term "port", as used herein refers to an opening for intake or exhaust of a fluid. The heat exchangers can have two or more ports functioning as inlets and outlets for the circulation of fluid though the conduits within the heat exchanger. Inlets and exhausts can be reversed on an exchanger by reversing the direction of flow of a liquid passing through the exchanger.

Hardware and Software Infrastructure Examples

The present invention may be employ computing platforms that perform actions responsive to software-based instructions. The following provides an antecedent basis for the information technology that may be utilized to enable the invention.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in particular detail with respect to various possible embodiments, and those of skill in the art will appreciate that the invention may be practiced in other embodiments. First, the (particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions (performed by multiple components may instead (performed by a single component.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

All references cited in the present application are incorporated in their entirety herein by reference to the extent not inconsistent herewith.

The preceding detailed description is of the best currently contemplated modes of carrying out the invention. The description is not to be taken in a limiting sense, but is made merely for the purpose of illustrating the general principles of the invention, since the scope of the invention is best defined by the appended claims.

It is also to be understood that the following claims are intended to cover all of the generic and specific features of the invention herein described, and all statements of the scope of the invention which, as a matter of language, might be said to fall there between. Now that the invention has been described, What is claimed is:

1. An integrated power generation, energy storage and refrigeration system comprising:
   a plurality of wheels;
   an axle affixed to at least one of the plurality of wheels;
   an electric power generator that converts the rotational motion of the wheels into electric power;
   a thermal energy storage unit having a heat exchanging fluid and a cooling unit to thermally charge the fluid, the cooling unit powered by the electric power generator; and
   a control logic and control unit to manage state of charge of the thermal energy storage or battery energy storage systems based on operational parameters of the vehicle provided from an on-board diagnostics or general controller area network link or other available vehicle data device, wherein deceleration energy use is managed to address charging of the thermal energy storage system over the road to maintain a base state of charge such that the thermal energy storage unit is charged during deceleration events and partially discharged during normal road use to manage energy conservation.

2. The integrated power generation, energy storage and refrigeration system according to claim 1 further comprising a constant output velocity device coupled at a first end to the axle and at a second end to the generator, wherein the constant output velocity device maintains the rotational power delivered to the generator within a prescribed rotational velocity range according to the efficient operating parameters of the generator.

3. The integrated power generation, energy storage and refrigeration system according to claim 2 wherein the constant output velocity mechanical device is selected from the group consisting of a constant velocity continuously variable transmission and a hydraulic pump and motor set.

4. The integrated power generation, energy storage and refrigeration system according to claim 1 further comprising a DC-DC converter or an AC-DC inverter and a thermal energy storage low power battery electric system, the converter or inverter adapted to facilitate powering of thermal energy storage components and charging of the thermal energy storage low power battery electric system by the electric power generator and the thermal energy storage low power battery electric system adapted to supply auxiliary power to components of the thermal energy storage unit or an auxiliary low voltage cooling unit to charge the thermal energy storage system.

5. The integrated power generation, energy storage and refrigeration system according to claim 4 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo or passenger space, one or more pumps adapted to circulate the heat exchanging fluid and diverters adapted to route the flow of the heat exchanging fluid through a heat exchanger, wherein the components are powered by the thermal energy storage low power battery electric system.

6. The integrated power generation, energy storage and refrigeration system according to claim 1 further comprising a solar energy collecting unit adapted to supply auxiliary power to the thermal energy storage unit or to supply auxiliary power to an auxiliary low voltage cooling unit configured to charge the thermal energy storage system or cool a conditioned space.

7. The integrated power generation, energy storage and refrigeration system according to claim 6 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

8. The integrated power generation, energy storage and refrigeration system according to claim 6 further comprising a controller module adapted to manage the supply of power between to the solar energy collecting unit and the electric power generator.

9. The integrated power generation, energy storage and refrigeration system according to claim 1 further comprising resistive heating coils powered by the electric power generator adapted to heat an enclosed cargo or passenger space or to defrost the thermal energy storage unit.

10. The integrated power generation, energy storage and refrigeration system according to claim 1 further comprising:
    a high temperature battery;
    an high temperature battery heat exchanger; and
    a fan, the fan adapted to circulate air from a cargo or passenger space across the high temperature battery heat exchanger.

11. The integrated power generation, energy storage and refrigeration system according to claim 10 wherein the high temperature battery is a sodium nickel chloride battery.

12. The integrated power generation, energy storage and refrigeration system according to claim 1 wherein the thermal energy storage unit comprises:
    a phase change material reservoir containing a phase change material, a working fluid and a working fluid-to-phase change material heat exchanger, the working fluid-to-phase change material heat exchanger in contact with the phase change material and the working fluid, wherein the phase change material is the heat exchanging fluid;
    a cooling unit-to-working fluid heat exchanger adapted to remove heat from the working fluid, the cooling unit-to-working fluid heat exchanger in fluid communication with the phase change material reservoir, wherein the WF circulates between the phase change material reservoir and the cooling unit-to-working fluid heat exchanger forming a charging loop; and
    a phase change material-to-target heat exchanger in fluid communication with the phase change material reservoir, wherein the phase change material circulates between the phase change material reservoir and the phase change material-to-air heat exchanger forming a discharging loop.

13. The integrated power generation, energy storage and refrigeration system according to claim 1 wherein the thermal energy storage unit comprises:
    a phase change material reservoir containing a phase change material, wherein the phase change material is the heat exchanging fluid;
    a cooling unit-to-phase change material heat exchanger adapted to remove heat from the phase change material, the cooling system-to-phase change material heat exchanger in fluid communication with the phase change material reservoir, wherein the phase change material circulates between the phase change material reservoir and the cooling system-to-phase change material heat exchanger forming a charging loop; and
    a phase change material-to-target heat exchanger in fluid communication with the phase change material reservoir, wherein the phase change material circulates between the phase change material reservoir and the phase change material-to-air heat exchanger forming a discharging loop.

14. An integrated power generation, energy storage and refrigeration system comprising:
    a chassis;
    a wheel rotatably coupled to the chassis and adapted for contact with a road surface;
    a constant output velocity unit in rotational communication with the wheel;
    an electric power generator in rotational communication with the constant output speed drive unit, wherein the constant output velocity unit supplies rotational power to the electric power generator within a prescribed range of rotational velocity and whereby the generator converts the rotational motion of the wheels into electric power;
    a thermal energy storage unit having a heat exchanging fluid and a cooling unit to charge the fluid, the cooling unit powered by the electric power generator, and
    a phase change material reservoir containing a phase change material, a working fluid and a working fluid-to-phase change material heat exchanger, the working fluid-to-phase change material heat exchanger in contact with the phase change material and the working fluid;
    a phase change material-to-target heat exchanger in fluid communication with the phase change material reservoir, wherein the phase change material circulates between the phase change material reservoir and the phase change material-to-air heat exchanger;
    a first pump to circulate the phase change material between the phase change material reservoir and the phase change material-to-target heat exchanger;
    a vapor compression cycle system;
    a vapor compression cycle-to-working fluid heat exchanger adapted to remove heat from the working fluid and in fluid communication with the phase change material reservoir, wherein the working fluid circulates between the phase change material reservoir and the vapor compression cycle-to-working fluid heat exchanger;
    a second pump to circulate the working fluid between the phase change material reservoir and the vapor compression cycle-to-WF heat exchanger; and
    a state of charge detection system to monitor the charge of the phase change material.

15. The integrated power generation, energy storage and refrigeration system according to claim 14 wherein the chassis is a trailer chassis adapted to be pulled by a tractor.

16. The thermal energy storage system according to claim 14 wherein the heat exchanging fluid is a phase change material.

17. The integrated power generation, energy storage and refrigeration system according to claim 14 further comprising a solar energy collecting unit adapted to supply auxiliary power to the thermal energy storage unit or to supply auxiliary power to an auxiliary low voltage cooling unit configured to charge the thermal energy storage system or provide cooling to a conditioned space.

18. The integrated power generation, energy storage and refrigeration system according to claim 17 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

19. The integrated power generation, energy storage and refrigeration system according to claim 14 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo space, one or more pumps adapted to circulate the heat exchanging fluid and diverters adapted to route the flow of the heat exchanging fluid through a heat exchanger, wherein the components are powered by the thermal energy storage low power battery electric system.

20. The integrated power generation, energy storage and refrigeration system according to claim 14 further comprising resistive heating coils powered by the electric power generator adapted to heat an enclosed cargo or passenger space or to defrost the thermal energy storage unit.

21. An integrated power generation, energy storage and temperature control system comprising:
a chassis;
a wheel rotatably coupled to the chassis and adapted for contact with a road surface;
a constant output velocity unit in rotational communication with the wheel, wherein the constant output velocity adjusts the rotational velocity delivered from the wheel to a prescribed rotational velocity range;
an electric power generator in rotational communication with the constant output speed drive unit, wherein the constant output speed drive unit supplies rotational power to the electric power generator within a prescribed range of rotational velocity and whereby the generator converts the rotational motion of the wheels into electric power;
a high temperature battery; and
an high temperature battery heat exchanger; and
a fan, the fan adapted to circulate air from a cargo or passenger space across the high temperature battery heat exchanger.

22. The integrated power generation, energy storage and temperature control system according to claim 21 wherein the high temperature battery is a sodium nickel chloride battery.

23. The integrated power generation, energy storage and temperature control system according to claim 21 further comprising a battery heater to warm up the high temperature battery.

24. The integrated power generation, energy storage and temperature control system according to claim 21 further comprising a high temperature battery resistance heater adapted to heat a conditioned space.

25. The integrated power generation, energy storage and temperature control system according to claim 21 further comprising a thermal energy storage unit having a heat exchanging fluid and a cooling unit to charge the fluid, the cooling unit powered by the electric power generator.

26. An integrated power generation, energy storage and refrigeration system comprising:
a plurality of wheels;
an axle affixed to at least one of the plurality of wheels;
an electric power generator that converts the rotational motion of the wheels into electric power;
a thermal energy storage unit having a heat exchanging fluid and a cooling unit to thermally charge the fluid, the cooling unit powered by the electric power generator; and
resistive heating coils powered by the electric power generator adapted to heat an enclosed cargo or passenger space or to defrost the thermal energy storage unit.

27. The integrated power generation, energy storage and refrigeration system according to claim 26 further comprising a constant output velocity device coupled at a first end to the axle and at a second end to the generator, wherein the constant output velocity device maintains the rotational power delivered to the generator within a prescribed rotational velocity range according to the efficient operating parameters of the generator.

28. The integrated power generation, energy storage and refrigeration system according to claim 27 wherein the constant output velocity mechanical device is selected from the group consisting of a constant velocity continuously variable transmission and a hydraulic pump and motor set.

29. The integrated power generation, energy storage and refrigeration system according to claim 26 further comprising a DC-DC converter or an AC-DC inverter and a thermal energy storage low power battery electric system, the converter or inverter adapted to facilitate powering of thermal energy storage components and charging of the thermal energy storage low power battery electric system by the electric power generator and the thermal energy storage low power battery electric system adapted to supply auxiliary power to components of the thermal energy storage unit or an auxiliary low voltage cooling unit to charge the thermal energy storage system.

30. The integrated power generation, energy storage and refrigeration system according to claim 29 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo or passenger space, one or more pumps adapted to circulate the heat exchanging fluid and diverters adapted to route the flow of the heat exchanging fluid through a heat exchanger, wherein the components are powered by the thermal energy storage low power battery electric system.

31. The integrated power generation, energy storage and refrigeration system according to claim 26 further comprising a solar energy collecting unit adapted to supply auxiliary power to the thermal energy storage unit or to supply auxiliary power to an auxiliary low voltage cooling unit configured to charge the thermal energy storage system or cool a conditioned space.

32. The integrated power generation, energy storage and refrigeration system according to claim 31 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

33. The integrated power generation, energy storage and refrigeration system according to claim 31 further comprising a controller module adapted to manage the supply of power between to the solar energy collecting unit and the electric power generator.

34. The integrated power generation, energy storage and refrigeration system according to claim 26 further comprising:
- a high temperature battery;
- an high temperature battery heat exchanger; and
- a fan, the fan adapted to circulate air from a cargo or passenger space across the high temperature battery heat exchanger.

35. The integrated power generation, energy storage and refrigeration system according to claim 34 wherein the high temperature battery is a sodium nickel chloride battery.

36. The integrated power generation, energy storage and refrigeration system according to claim 26 wherein the thermal energy storage unit comprises:
- a phase change material reservoir containing a phase change material, a working fluid and a working fluid-to-phase change material heat exchanger, the working fluid-to-phase change material heat exchanger in contact with the phase change material and the working fluid, wherein the phase change material is the heat exchanging fluid;
- a cooling unit-to-working fluid heat exchanger adapted to remove heat from the working fluid, the cooling unit-to-working fluid heat exchanger in fluid communication with the phase change material reservoir, wherein the WF circulates between the phase change material reservoir and the cooling unit-to-working fluid heat exchanger forming a charging loop; and
- a phase change material-to-target heat exchanger in fluid communication with the phase change material reservoir, wherein the phase change material circulates between the phase change material reservoir and the phase change material-to-air heat exchanger forming a discharging loop.

37. The integrated power generation, energy storage and refrigeration system according to claim 26 wherein the thermal energy storage unit comprises:
- a phase change material reservoir containing a phase change material, wherein the phase change material is the heat exchanging fluid;
- a cooling unit-to-phase change material heat exchanger adapted to remove heat from the phase change material, the cooling system-to-phase change material heat exchanger in fluid communication with the phase change material reservoir, wherein the phase change material circulates between the phase change material reservoir and the cooling system-to-phase change material heat exchanger forming a charging loop; and
- a phase change material-to-target heat exchanger in fluid communication with the phase change material reservoir, wherein the phase change material circulates between the phase change material reservoir and the phase change material-to-air heat exchanger forming a discharging loop.

38. An integrated power generation, energy storage and refrigeration system comprising:
- a plurality of wheels;
- an axle affixed to at least one of the plurality of wheels;
- an electric power generator that converts the rotational motion of the wheels into electric power;
- a thermal energy storage unit having a heat exchanging fluid and a cooling unit to thermally charge the fluid, the cooling unit powered by the electric power generator;
- a high temperature battery;
- an high temperature battery heat exchanger; and
- a fan, the fan adapted to circulate air from a cargo or passenger space across the high temperature battery heat exchanger.

39. The integrated power generation, energy storage and refrigeration system according to claim 38 further comprising a constant output velocity device coupled at a first end to the axle and at a second end to the generator, wherein the constant output velocity device maintains the rotational power delivered to the generator within a prescribed rotational velocity range according to the efficient operating parameters of the generator.

40. The integrated power generation, energy storage and refrigeration system according to claim 39 wherein the constant output velocity mechanical device is selected from the group consisting of a constant velocity continuously variable transmission and a hydraulic pump and motor set.

41. The integrated power generation, energy storage and refrigeration system according to claim 38 further comprising a DC-DC converter or an AC-DC inverter and a thermal energy storage low power battery electric system, the converter or inverter adapted to facilitate powering of thermal energy storage components and charging of the thermal energy storage low power battery electric system by the electric power generator and the thermal energy storage low power battery electric system adapted to supply auxiliary power to components of the thermal energy storage unit or an auxiliary low voltage cooling unit to charge the thermal energy storage system.

42. The integrated power generation, energy storage and refrigeration system according to claim 41 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo or passenger space, one or more pumps adapted to circulate the heat exchanging fluid and diverters adapted to route the flow of the heat exchanging fluid through a heat exchanger, wherein the components are powered by the thermal energy storage low power battery electric system.

43. The integrated power generation, energy storage and refrigeration system according to claim 38 further comprising a solar energy collecting unit adapted to supply auxiliary power to the thermal energy storage unit or to supply auxiliary power to an auxiliary low voltage cooling unit configured to charge the thermal energy storage system or cool a conditioned space.

44. The integrated power generation, energy storage and refrigeration system according to claim 43 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

45. The integrated power generation, energy storage and refrigeration system according to claim 43 further comprising a controller module adapted to manage the supply of power between to the solar energy collecting unit and the electric power generator.

46. The integrated power generation, energy storage and refrigeration system according to claim 38 wherein the high temperature battery is a sodium nickel chloride battery.

47. The integrated power generation, energy storage and refrigeration system according to claim 38 wherein the thermal energy storage unit comprises:

a phase change material reservoir containing a phase change material, a working fluid and a working fluid-to-phase change material heat exchanger, the working fluid-to-phase change material heat exchanger in contact with the phase change material and the working fluid, wherein the phase change material is the heat exchanging fluid;

a cooling unit-to-working fluid heat exchanger adapted to remove heat from the working fluid, the cooling unit-to-working fluid heat exchanger in fluid communication with the phase change material reservoir, wherein the WF circulates between the phase change material reservoir and the cooling unit-to-working fluid heat exchanger forming a charging loop; and a phase change material-to-target heat exchanger in fluid communication with the phase change material reservoir, wherein the phase change material circulates between the phase change material reservoir and the phase change material-to-air heat exchanger forming a discharging loop.

48. The integrated power generation, energy storage and refrigeration system according to claim 38 wherein the thermal energy storage unit comprises:
a phase change material reservoir containing a phase change material, wherein the phase change material is the heat exchanging fluid;
a cooling unit-to-phase change material heat exchanger adapted to remove heat from the phase change material, the cooling system-to-phase change material heat exchanger in fluid communication with the phase change material reservoir, wherein the phase change material circulates between the phase change material reservoir and the cooling system-to-phase change material heat exchanger forming a charging loop; and
a phase change material-to-target heat exchanger in fluid communication with the phase change material reservoir, wherein the phase change material circulates between the phase change material reservoir and the phase change material-to-air heat exchanger forming a discharging loop.

49. An integrated power generation, energy storage and refrigeration system comprising:
a plurality of wheels;
an axle affixed to at least one of the plurality of wheels;
an electric power generator that converts the rotational motion of the wheels into electric power;
a thermal energy storage unit having a heat exchanging fluid and a cooling unit to thermally charge the fluid, the cooling unit powered by the electric power generator;
a phase change material reservoir containing a phase change material, a working fluid and a working fluid-to-phase change material heat exchanger, the working fluid-to-phase change material heat exchanger in contact with the phase change material and the working fluid, wherein the phase change material is the heat exchanging fluid;
a cooling unit-to-working fluid heat exchanger adapted to remove heat from the working fluid, the cooling unit-to-working fluid heat exchanger in fluid communication with the phase change material reservoir, wherein the WF circulates between the phase change material reservoir and the cooling unit-to-working fluid heat exchanger forming a charging loop; and
a phase change material-to-target heat exchanger in fluid communication with the phase change material reservoir, wherein the phase change material circulates between the phase change material reservoir and the phase change material-to-air heat exchanger forming a discharging loop.

50. The integrated power generation, energy storage and refrigeration system according to claim 49 further comprising a constant output velocity device coupled at a first end to the axle and at a second end to the generator, wherein the constant output velocity device maintains the rotational power delivered to the generator within a prescribed rotational velocity range according to the efficient operating parameters of the generator.

51. The integrated power generation, energy storage and refrigeration system according to claim 50 wherein the constant output velocity mechanical device is selected from the group consisting of a constant velocity continuously variable transmission and a hydraulic pump and motor set.

52. The integrated power generation, energy storage and refrigeration system according to claim 49 further comprising a DC-DC converter or an AC-DC inverter and a thermal energy storage low power battery electric system, the converter or inverter adapted to facilitate powering of thermal energy storage components and charging of the thermal energy storage low power battery electric system by the electric power generator and the thermal energy storage low power battery electric system adapted to supply auxiliary power to components of the thermal energy storage unit or an auxiliary low voltage cooling unit to charge the thermal energy storage system.

53. The integrated power generation, energy storage and refrigeration system according to claim 52 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo or passenger space, one or more pumps adapted to circulate the heat exchanging fluid and diverters adapted to route the flow of the heat exchanging fluid through a heat exchanger, wherein the components are powered by the thermal energy storage low power battery electric system.

54. The integrated power generation, energy storage and refrigeration system according to claim 49 further comprising a solar energy collecting unit adapted to supply auxiliary power to the thermal energy storage unit or to supply auxiliary power to an auxiliary low voltage cooling unit configured to charge the thermal energy storage system or cool a conditioned space.

55. The integrated power generation, energy storage and refrigeration system according to claim 54 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

56. The integrated power generation, energy storage and refrigeration system according to claim 54 further comprising a controller module adapted to manage the supply of power between to the solar energy collecting unit and the electric power generator.

57. The integrated power generation, energy storage and refrigeration system according to claim 49 wherein the high temperature battery is a sodium nickel chloride battery.

58. An integrated power generation, energy storage and refrigeration system comprising:
a plurality of wheels;
an axle affixed to at least one of the plurality of wheels;

an electric power generator that converts the rotational motion of the wheels into electric power;

a thermal energy storage unit having a heat exchanging fluid and a cooling unit to thermally charge the fluid, the cooling unit powered by the electric power generator;

a phase change material reservoir containing a phase change material, wherein the phase change material is the heat exchanging fluid;

a cooling unit-to-phase change material heat exchanger adapted to remove heat from the phase change material, the cooling system-to-phase change material heat exchanger in fluid communication with the phase change material reservoir, wherein the phase change material circulates between the phase change material reservoir and the cooling system-to-phase change material heat exchanger forming a charging loop; and a phase change material-to-target heat exchanger in fluid communication with the phase change material reservoir, wherein the phase change material circulates between the phase change material reservoir and the phase change material-to-air heat exchanger forming a discharging loop.

59. The integrated power generation, energy storage and refrigeration system according to claim 58 further comprising a constant output velocity device coupled at a first end to the axle and at a second end to the generator, wherein the constant output velocity device maintains the rotational power delivered to the generator within a prescribed rotational velocity range according to the efficient operating parameters of the generator.

60. The integrated power generation, energy storage and refrigeration system according to claim 59 wherein the constant output velocity mechanical device is selected from the group consisting of a constant velocity continuously variable transmission and a hydraulic pump and motor set.

61. The integrated power generation, energy storage and refrigeration system according to claim 58 further comprising a DC-DC converter or an AC-DC inverter and a thermal energy storage low power battery electric system, the converter or inverter adapted to facilitate powering of thermal energy storage components and charging of the thermal energy storage low power battery electric system by the electric power generator and the thermal energy storage low power battery electric system adapted to supply auxiliary power to components of the thermal energy storage unit or an auxiliary low voltage cooling unit to charge the thermal energy storage system.

62. The integrated power generation, energy storage and refrigeration system according to claim 61 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo or passenger space, one or more pumps adapted to circulate the heat exchanging fluid and diverters adapted to route the flow of the heat exchanging fluid through a heat exchanger, wherein the components are powered by the thermal energy storage low power battery electric system.

63. The integrated power generation, energy storage and refrigeration system according to claim 58 further comprising a solar energy collecting unit adapted to supply auxiliary power to the thermal energy storage unit or to supply auxiliary power to an auxiliary low voltage cooling unit configured to charge the thermal energy storage system or cool a conditioned space.

64. The integrated power generation, energy storage and refrigeration system according to claim 63 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

65. The integrated power generation, energy storage and refrigeration system according to claim 63 further comprising a controller module adapted to manage the supply of power between to the solar energy collecting unit and the electric power generator.

66. The integrated power generation, energy storage and refrigeration system according to claim 58 wherein the high temperature battery is a sodium nickel chloride battery.

67. An integrated power generation, energy storage and refrigeration system comprising:

a chassis;

a wheel rotatably coupled to the chassis and adapted for contact with a road surface;

a constant output velocity unit in rotational communication with the wheel;

an electric power generator in rotational communication with the constant output speed drive unit, wherein the constant output velocity unit supplies rotational power to the electric power generator within a prescribed range of rotational velocity and whereby the generator converts the rotational motion of the wheels into electric power;

a thermal energy storage unit having a heat exchanging fluid and a cooling unit to charge the fluid, the cooling unit powered by the electric power generator; and resistive heating coils powered by the electric power generator adapted to heat an enclosed cargo or passenger space or to defrost the thermal energy storage unit.

68. The integrated power generation, energy storage and refrigeration system according to claim 67 wherein the thermal energy storage unit comprises:

a phase change material reservoir containing a phase change material, a working fluid and a working fluid-to-phase change material heat exchanger, the working fluid-to-phase change material heat exchanger in contact with the phase change material and the working fluid;

a phase change material-to-target heat exchanger in fluid communication with the phase change material reservoir, wherein the phase change material circulates between the phase change material reservoir and the phase change material-to-air heat exchanger;

a first pump to circulate the phase change material between the phase change material reservoir and the phase change material-to-target heat exchanger;

a vapor compression cycle system;

a vapor compression cycle-to-working fluid heat exchanger adapted to remove heat from the working fluid and in fluid communication with the phase change material reservoir, wherein the working fluid circulates between the phase change material reservoir and the vapor compression cycle-to-working fluid heat exchanger;

a second pump to circulate the working fluid between the phase change material reservoir and the vapor compression cycle-to-WF heat exchanger; and a state of charge detection system to monitor the charge of the phase change material.

69. The integrated power generation, energy storage and refrigeration system according to claim 67 wherein the chassis is a trailer chassis adapted to be pulled by a tractor.

70. The thermal energy storage system according to claim 67 wherein the heat exchanging fluid is a phase change material.

71. The integrated power generation, energy storage and refrigeration system according to claim 67 further comprising a solar energy collecting unit adapted to supply auxiliary power to the thermal energy storage unit or to supply auxiliary power to an auxiliary low voltage cooling unit configured to charge the thermal energy storage system or provide cooling to a conditioned space.

72. The integrated power generation, energy storage and refrigeration system according to claim 71 further comprising a thermal energy storage low power battery electric system adapted to be selectively charged by the solar energy collecting unit and the electric power generator, the thermal energy storage low power battery electric system adapted to supply auxiliary power to components of the a thermal energy storage unit.

73. The integrated power generation, energy storage and refrigeration system according to claim 67 wherein the thermal energy storage unit further comprises components selected from the group consisting of an electronic control unit adapted to regulate the thermal energy storage unit, a temperature sensor adapted to monitor the temperature of the heat exchanging fluid, a fan adapted to circulate air in a cargo space, one or more pumps adapted to circulate the heat exchanging fluid and diverters adapted to route the flow of the heat exchanging fluid through a heat exchanger, wherein the components are powered by the thermal energy storage low power battery electric system.

74. An integrated power generation, energy storage and temperature control system comprising:
   a chassis;
   a wheel rotatably coupled to the chassis and adapted for contact with a road surface;
   a constant output velocity unit in rotational communication with the wheel, wherein the constant output velocity adjusts the rotational velocity delivered from the wheel to a prescribed rotational velocity range;
   an electric power generator in rotational communication with the constant output speed drive unit, wherein the constant output speed drive unit supplies rotational power to the electric power generator within a prescribed range of rotational velocity and whereby the generator converts the rotational motion of the wheels into electric power;
   a high temperature battery; and
   a high temperature battery resistance heater adapted to heat a conditioned space.

75. The integrated power generation, energy storage and temperature control system according to claim 74 wherein the high temperature battery is a sodium nickel chloride battery.

76. The integrated power generation, energy storage and temperature control system according to claim 74 further comprising a battery heater to warm up the high temperature battery.

77. The integrated power generation, energy storage and temperature control system according to claim 74 further comprising a thermal energy storage unit having a heat exchanging fluid and a cooling unit to charge the fluid, the cooling unit powered by the electric power generator.

* * * * *